United States Patent
Yahashi et al.

(10) Patent No.: US 6,529,280 B1
(45) Date of Patent: *Mar. 4, 2003

(54) THREE-DIMENSIONAL MEASURING DEVICE AND THREE-DIMENSIONAL MEASURING METHOD

(75) Inventors: Akira Yahashi, Kobe (JP); Toshio Norita, Osaka (JP); Eiro Fujii, Takatsuki (JP); Fumiya Yagi, Toyonaka (JP); Satoru Hirose, Kyoto (JP); Takuto Joko, Kyoto (JP); Makoto Miyazaki, Ibaraki (JP); Tadashi Fukumoto, Ibaraki (JP); Hideki Tanabe, Ibaraki (JP); Yoshiko Sakagawa, Ibaraki (JP)

(73) Assignee: Minolta Co., Ltd., Osaka (JP)

( * ) Notice: Subject to any disclaimer, the term of this patent is extended or adjusted under 35 U.S.C. 154(b) by 26 days.

This patent is subject to a terminal disclaimer.

(21) Appl. No.: 09/676,767

(22) Filed: Oct. 2, 2000

Related U.S. Application Data

(62) Division of application No. 08/748,325, filed on Nov. 13, 1996, now Pat. No. 6,141,105.

(51) Int. Cl.$^7$ ................................................ G01B 11/24
(52) U.S. Cl. ........................................ 356/602; 356/606
(58) Field of Search ................................. 356/602, 603, 356/604, 606, 607, 608

(56) References Cited

U.S. PATENT DOCUMENTS

| | | | |
|---|---|---|---|
| 4,752,964 A | * 6/1988 | Okada et al. | ............... 356/608 |
| 4,758,093 A | 7/1988 | Stern et al. | |
| 4,764,016 A | * 8/1988 | Johansson | ................... 356/602 |
| 4,794,262 A | 12/1988 | Sato et al. | |
| 4,798,964 A | * 1/1989 | Schmalfuss et al. | ........ 356/606 |
| 4,882,490 A | 11/1989 | Takasaki et al. | |
| 4,895,448 A | * 1/1990 | Laird | ......................... 356/603 |
| 4,935,810 A | 6/1990 | Nonami et al. | |
| 4,939,379 A | 7/1990 | Horn | |
| 5,024,529 A | 6/1991 | Svetkoff et al. | |
| 5,076,698 A | * 12/1991 | Smith et al. | ................. 356/602 |
| 5,102,223 A | 4/1992 | Uesugi et al. | |
| 5,175,595 A | 12/1992 | Fukase | |
| 5,362,958 A | 11/1994 | Ando | |
| 5,414,517 A | * 5/1995 | Furuhashi | .................... 356/602 |
| 5,430,547 A | 7/1995 | Takagi et al. | |
| 5,668,631 A | 9/1997 | Norita et al. | |
| 6,141,105 A | * 10/2000 | Yahashi et al. | ............. 356/623 |
| 6,151,118 A | * 11/2000 | Norita et al. | ................ 356/602 |

FOREIGN PATENT DOCUMENTS

| | | |
|---|---|---|
| JP | 4-83133 | 3/1992 |
| JP | 6-195447 | 12/1992 |
| JP | 5-196432 | 8/1993 |
| JP | 7-174536 | 7/1995 |
| JP | 7-174537 | 7/1995 |
| JP | 7-174538 | 7/1995 |

\* cited by examiner

*Primary Examiner*—Richard A. Rosenberger
(74) *Attorney, Agent, or Firm*—McDermott, Will & Emery

(57) ABSTRACT

This invention is related to a three-dimensional measuring device for measuring three-dimensional positions of an objects. The three-dimensional measuring device comprises an optical projection system and an optical reception system. In a preliminary measurement prior to an actual measurement, the optical projection system projects slit light beam on the object with varying projection angle with in a narrow range, and the optical reception system receives the slit light beam reflected by the object and generates image signals corresponding to an amount of the received light synchronously with variation of the projection angle. Measurement conditions including intensity of the light beam and the projection angle for the actual measurement are set in accordance with the image signals of the actual measurement. Under the measurement conditions, the actual measurement is executed by projection the light beam on the object with varying the projection angle within a wide range.

13 Claims, 47 Drawing Sheets

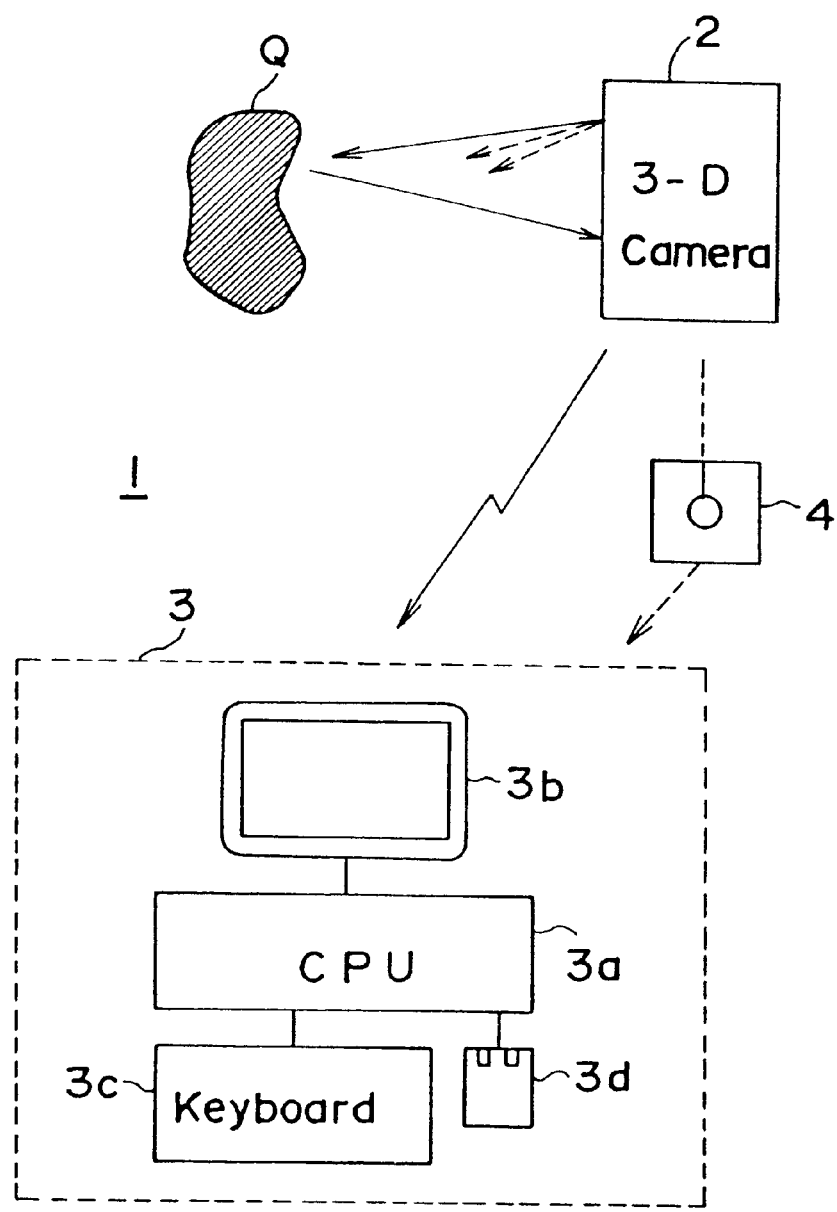

Fig.18

| Inputs | | | Outputs | | | |
|---|---|---|---|---|---|---|
| Low Luminance SL | Overflow S13 | Distance Condition | Display Color | Proximal S11 | Distal S12 |
| OFF | OFF | FN-sc+16≤0 | Blue | OFF | ON |
| | | 0<FN-sc+16≤15 | Grayscale | OFF | OFF |
| | | FN-sc+16=16 | Cyan | OFF | OFF |
| | | 16<FN-sc+16≤30 | Grayscale | ON | OFF |
| | | 30<FN-sc+16 | Green | OFF | OFF |
| | ON | (Overflow) | Red | OFF | OFF |
| ON | — | (Low Luminance) | Black | OFF | OFF |

Fig. 25

| T5 Preliminary Measurement Table | | | | | |
|---|---|---|---|---|---|
| | Sampling Lines | | | | |
| | v1 | v2 | v3 | v4 | v5 |
| Position of Slit Image | | | | | |
| Light Reception Data (Dg,J) — Intensity A | | | | | |
| Intensity B | | | | | |
| Intensity C | | | | | |

THREE-DIMENSIONAL MEASURING DEVICE AND THREE-DIMENSIONAL MEASURING METHOD

This application is a Divisional of Application Ser. No. 08/748,325 filed Nov. 13, 1996 now U.S. Pat. No. 6,141,105.

BACKGROUND OF THE INVENTION

1. Field of the Invention

The present invention relates to a three-dimensional measuring device and three-dimensional measuring method for non-contact measuring of an object shape by illuminating an object with light.

2. Description of the Related Art

Three-dimensional measuring devices of the non-contact type commonly referred to as rangefinders are used for data input to CG systems and CAD systems, somatometry, robot visual recognition and the like because it is possible to measure at high speed compared to contact type devices. The optical slit projection method (also referred to as the light section method) is known as suitable measuring method for rangefinders. This method produces a three-dimensional image (distance image) by optically scanning an object, and is one type of active measuring method for imaging an object illuminated by a specific light. The three-dimensional image is a collection of pixels representing the three-dimensional positions of a plurality of parts on an object. In the optical slit projection method the section of a linear slit light is used as the detection light.

FIGS. 46a, 46b, 46c, and 46d briefly show the optical slit projection method, and FIGS. 47a, 47b, and 47c illustrate the principles of measurement via the optical slit projection method.

A section of object Q serving as a measurement subject is illuminated by a thin band-like slit light U, and, the light reflected from the object Q impinges, for example, the imaging surface S2 of a two-dimensional image sensor (FIG. 46a). If the illuminated portion of object Q is flat, the sensed image (slit image) is a straight line (FIG. 46b). If the illuminated portion is uneven, the straight line becomes curved and step-like (FIG. 46c). That is, the magnitude of the distance between the measuring device and the object Q is reflected at the incident position of the reflected light on imaging surface S2 (FIG. 46d). Three-dimensional position sampling can be accomplished by scanning the object surface on a range viewed from the light reception side by deflecting the slit light U perpendicular to the length direction. The number of points of this sampling is dependent on the number of pixels of the image sensor.

In FIGS. 47a, 47b, and 47c, the light emitting system and light receiving system are positioned such that the base line AO connecting the origin A of the projection light and the principal point of the light reception lens is perpendicular to the optical axis of received light. The principal point of the lens is a point on the receiving optical; axis separated from the sensing surface S2 only by the so-called image distance b when the image of an object at infinite distance is formed on imaging surface S2. The image distance b is the sum of the focal length f of the light receiving system and the amount of lens extension for focusing adjustment.

The principal point O is the origin of the three-dimensional orthogonal coordinates. The light reception axis is the Z axis, the base AO is the Y axis, and the slit light length direction is the X axis. When the slit light U illuminates point P (X,Y,Z) on the object, and the angle of the projection axis and projection reference plane (projection plane parallel to the light reception axis) is designated $\theta a$, and the light reception angle is designated $\theta p$, the coordinates Z of point P are expressed by the equation below.

Base line length $L = L1 + L2 = Z \tan\theta a + Z \tan\theta p$ $\therefore Z = L/(\tan\theta a + \tan\theta p)$ The light receiving angle $\theta p$ is the angle formed by a line connecting point P and principal point O, and the plane including the light reception axis (i.e., light reception axis plane).

Since the imaging magnification $\beta = b/Z$, when the distance between the center of imaging surface S2 and the light reception pixels in the x direction is designated xp and the distance in the Y direction is designated yp (refer to FIG. 47a), the coordinates X,Y of point P are expressed by the equations below.

$X = xp/\beta$ $Y = yp/\beta$

The angle $\theta a$ is unconditionally determined by the angular speed of deflection of slight light U. The light reception angle $\theta p$ is calculated from the relationship: $\tan\theta p = b/yp$. That is, the three-dimensional position of point P can be determined based on the angle $\theta a$ by measuring the position (xp,yp) on the imaging surface S2

When the light reception system is provided with a zoom lens unit as shown in FIG. 47c, the principal point O becomes the posterior side principal point H'. When the distance between the posterior side principal point H' and the anterior side principal point H is designated M, the Z coordinate of point P is expressed by the equation below.

$L = L1 + L2 = Z \tan\theta a + (Z-M)\tan\theta p$ $\therefore Z = (L + M\tan\theta p)/(\tan\theta a + \tan\theta p)$ When an image sensing means is used which comprises an imaging surface S2 having a finite number of pixels as in, for example, a CCD sensor, in the measurement performed via the previously described slit light projection method, the measurement resolving power is dependent on the pixel pitch of the image sensing means. That is, the resolving power can be increased by setting the slit light U so that the width of said slit light U in the Y direction (scanning direction) impinges a plurality f pixels on the imaging surface S2.

FIG. 48 illustrates the principles of this measurement method.

When the reflectivity of the illuminated portion of the object is assumed to be uniform, the intensity of the received light is a normal distribution expanding on the Y direction. If the effective intensity range of this normal distribution is a plurality of pixels, the maximum intensity position (i.e., barycenter) can be measured in units under the pixel pitch by interpolation of the amount of light received by each pixel g. This interpolation fits the normal distribution to the amount of light received by each pixel. The X, Y, and Z coordinates are determined based on the barycenter determined by the aforesaid calculation. If this method is used, the actual resolving power is 1/8 to 1/10 pixels.

When measuring via the slit light projection method, the person doing the measurement determine the position and direction of the rangefinder, and sets the scanning range (image sensing range) of the object Q via a zoom operation as necessary. It is useful to display a monitor image of the sensed object Q at the same field angle as the scanning range to easily accomplish the aforesaid framing operation. In three-dimensional CG, for example, color information of the object Q as well as measurement data expressing the shape of the object Q are often required.

Conventional rangefinders have a spectral means (e.g., dichroic mirror) for separating the light transmitted through the light-receiving lens system into slit light and environmental light, and are constructed so as to produce a color monitor image at the same field angle as the distance information by directing the environmental light to a color image sensing means separate from the image sensing means used for measurement (refer to Japanese Unexamined Patent Application No. SHO 7-74536).

If a dichroic mirror is used as the aforesaid spectral means, the entering light can be separated by wavelength virtually without decreasing the amount of light.

In practice, however, there are no dichroic mirrors which have ideal wavelength selectivity for reflection or transmission of only the slit light. Therefore, conventionally a disadvantage exists insofar as the environmental light greatly affects measurements because light of a comparatively broad wavelength range including the slit light wavelength enters the image sensing means.

In order to increase the resolving power, the width (i.e., length in the scanning direction) of the slit light may be increased by stages of projection light by setting the width of the slit light of the image imaging surface S2 to a plurality of pixels. In so doing, the distribution of the intensity of the received light doe snot form a normal distribution when the illuminated portion (point P) is the border of an object color because the width in the Y direction of the slit light broadens on the object Q, thereby increasing measurement error.

In conventional devices, the projection light conditions are set such that the slit width is as narrow as possible on the object Q, and the width of the slit light U is broadened then impinges the imaging surface S2 by means of a filter or the like in the light reception system.

The narrowing of the width of slit light U is optically limited, however. The illumination range (slit width) on object Q broadens as the distance increases from the starting point A of the projection light. Accordingly, conventional devices are disadvantageous inasmuch as the measurement distance (distance between the measuring device and the object Q) at which measurement of a specific precision is possible is short regardless of the distribution of the reflectivity of the object Q.

In conventional devices, the mutual positional relationship between the light projecting device comprising the projection system and the device comprising the light receiving system is fixed, such that the constructions do not allow adjustment of the respective optical axes, not center axis line and scan direction.

Therefore, in conventional three-dimensional input cameras, twisting occurs among the mutual optical axes, center line axes, and scanning direction of the light projection device and light receiving device, such that said axes are not in the same plane and errors arise in the mutual positional relationships. These errors also occur in three-dimensional input cameras using a zoom lens, but these errors can be corrected with relatively easily based on calculations using correction data obtained by imaging.

When a three-dimensional input camera is provided with a zoom lens, however, correction data differ in accordance with the amount of operation and movement of the zoom lens, such that there are extremely large amounts of correction data and individual parameters which make it impossible to perform simple calculations due to the extreme complexity of error correction, and require a great deal of time for the calculation process. Thus, a further disadvantage is the inclusion of many errors in the input data, which make it impossible to perform accurate calculations.

Although the framing which determines the scanning range of the object Q can be performed with a high degree of freedom by providing a zooming mechanism in the rangefinder as in conventional devices, disadvantages arise inasmuch as when zooming the principal point of the light receiving system is moved on the optical axis and causes errors to occur in the triangular measurement.

Furthermore, when the light receiving system is provided with w zooming function, the imaging field angle changes due to said zooming. Therefore, the width of the slit light on the projection side must be adjusted in accordance with the zooming performed on the light receiving side so as to introduce the maximum width slit light U onto the imaging surface S2.

Conventional devices are provided with a passive type distance sensor as a rangefinder which allows variable imaging distances depending on mode of use. The range measurement result is used in autofocusing (AF), and setting the projection light intensity.

The aforesaid passive type distance sensor produce large errors due to lens focal length, subject contrast distribution and the like. In contrast, rangefinders are capable of active type precision range measurement using a measurement-specific optical system. Measurement conditions including the autofocus lens position, and detection light projection angle range can be finely adjusted to increase measurement precision and improve measurement resolving power. Furthermore, in the actual projection of the detection light and measurement of the received light, passive type optical distance measurement and ultrasonic distance measurement differ such that distance information and reflectivity information of the object surface can be obtained as measurement environmental information. If reflectivity information is used, it is possible to set more suitable light receiving conditions (e.g., amount of projection light, light reception sensitivity and the like) compared to simply changing set values in accordance with distance.

When optical scanning identical to the measurement time is accomplished as a preliminary measurement before the main measurement, however, the specific time of the operation combining the preliminary measurement and the measurement following thereafter, i.e., the measurement time of one cycle, becomes longer. When the calculation of the preliminary measurement is performed relative to the sampling points of the entirety of the image sensing range, the amount of said calculation is extensive, such that the specific time of the preliminary measurement becomes longer.

In conventional devices, a passive type distance sensor is provided in a rangefinder capable of variable imaging distances according to the mode of use. The distance measurement result is used to set the autofocus (AF) and projection light intensity.

Even when the projection light intensity is adjusted in accordance with the distance measurement result, the amount of received light of the detection light is reduced to less than a lower limit when the reflectivity of the object surface is too low, such that suitable measurement results cannot be obtained. Thus, suitable final measurement results cannot be obtained when the amount of received light exceeds a lower limit due to positive reflectivity of the object surface and the introduction of environmental light.

Furthermore, the measurement error increases when measurement distance range set based on the measurement result is outside possible measurement.

Conventionally, when measurement parameters such as reflectivity, distance-to-object, measurement range and the like are unsuitably set, a user will invariably judge that suitable measurement has been accomplished the measurement operation is completed regardless of whether or not a suitable measurement result can actually be obtained.

SUMMARY OF THE INVENTION

An object of the present invention is to provide an improved three-dimensional measuring device and three-dimensional measuring method.

Another object of the present invention i to provide a spectral device capable of producing a monitor image having the same field angle as the distance image and capable of realizing three-dimensional measurement only slightly influenced by environmental light, and a three-dimensional measuring device for use in said spectral device.

Another object of the present invention is to realize a three-dimensional measuring device which allows a great degree of freedom in setting measurement distances, and is capable of high precision measurement at high resolving power when the reflectivity of an object is nonuniform with effectiveness similar to when said reflectivity is uniform.

Yet another object of the present invention is to provide a three-dimensional input camera capable of eliminating error in the positional relationship between the light projecting device and the light receiving device, and capable of accurate measurement with minimal error when a zoom lens is installed.

A further object of the present invention is to provide a measuring device having excellent practicality with minimal measurement error and minimal restrictions on imaging position setting.

A still further object of the present invention is to provide a compact light projection device capable of emitting distortionless slit light and which allows adjustment of the slit width, and a three-dimensional measuring device utilizing said light projection device.

An even further object of the present invention is to realize high-speed and high-precision three-dimensional measurement by effectively measuring the measurement environment relating to the measurement parameter settings.

Yet another object of the present invention is to provide a three-dimensional measuring device capable of performing suitable operation by allowing a user to confirm the unsuitability of measurement conditions before and after measurement.

These objects and other objects are achieved by providing a three-dimensional measuring device comprising:
  an optical projection system which illuminates an object with light or specific wavelength; and
  an optical reception system which receives light reflected by the object, said optical reception system including;
    a spectral means for separating the light of a predetermined wavelength range including said specific wavelength into light of another wavelength range, and
    a filtering means provided on the optical path of the light of said predetermined wavelength range separated by said spectral means, said filtering means blocking from among the light within said predetermined wavelength range, light which is of a wavelength longer than said specific wavelength and light which is of a wavelength shorter than said specific wavelength.

These objects and other objects are achieved by providing a three-dimensional measuring method comprising steps of:
  illuminating an object with light of specific wavelength;
  dividing the light reflected by the object into a first light of a wavelength range including said specific wavelength and a second light of another wavelength range;
  cutting from the divided first light, light which is of a wavelength longer than said specific wavelength and light which is of a wavelength shorter than said specific wavelength, to obtain the light of the specific wavelength; and
  sensing said obtained light of the specific wavelength for three-dimensional measuring.

These objects and other objects are achieved by providing a three-dimensional measuring device comprising:
  an optical projection system which sequentially illuminates an object with light at variable illumination angles;
  an image sensor which periodically samples the light reflected by the object synchronously with the variation of illumination angle of said optical projection system; and
  a first calculation means for calculating the illumination timing of maximum light reception by said image sensor based on a maximum sampling value obtained by said image sensor, and the sampling values of the sampling cycles one cycle before and one cycle after the sampling cycle which obtained said maximum value for measuring a three-dimensional position of the object.

These objects and other objects are achieved by providing a three-dimensional measuring method comprising steps of:
  sequentially illuminating an object with light at variable illumination angles;
  receiving the light reflected by the object on an image sensor;
  periodically sampling the received light synchronously with the variation of illumination angle by the image sensor; and
  calculating the illumination timing of maximum light reception by said image sensor based on a maximum sampling value obtained by said image sensor, and the sampling values of the sampling cycles one cycle before and one cycle after the sampling cycle which obtained said maximum value for measuring a three-dimensional position of the object.

These objects and other objects are achieved by providing a three-dimensional measuring device comprising:
  an optical projection system which illuminates an object;
  an optical reception system which receives light reflected by the object illuminated by said optical projection system; and
  an adjustment mechanism for adjusting the relative positions of said optical projection system and said optical reception system, said adjustment mechanism maintaining said projection system and said reception system so as to be relatively rotatable on a first rotational axis along the optical axis of said reception system and a second rotational axis perpendicular to said first rotational axis.

These objects and other objects are achieved by providing a three-dimensional measuring device comprising:

an optical projection system which illuminates an object with light beam;

an image sensor which outputs image signals corresponding to the amount of light impinging the image sensing surface;

an optical reception system which forms an optical image of the object on the image sensing surface of said image sensor;

a detection means for detecting the principal point position of said optical reception means; and a calculation means for calculating a three-dimensional position of the object based on the principal point position detected by said detection means and the image signals of the object obtained by said image sensor.

These objects and other objects are achieved by providing a three-dimensional measuring method comprising steps of:

illuminating an object with light beam;

forming an optical image of the object on an image sensing surface of an image sensor by an optical reception system;

outputting image signals corresponding to the amount of light impinging the image sensing surface;

detecting the principal point position of said optical reception system; and calculating a three-dimensional position of the object based on the detected principal point position and the image signals.

These objects and other objects are achieved by providing a three-dimensional measuring device comprising:

an optical projection system which illuminates an object with light;

an image sensor which outputs image signals corresponding to the amount of light impinging the image sensing surface;

an optical reception system for forming an optical image of the object on the image sensing surface of said image sensor via light emitted said optical projection system and reflected by the object;

a preliminary measurement control means for executing a preliminary measurement by making said optical projection system and said image sensor operate prior to an actual three-dimensional measurement to obtain information on the distance to the object based on the image signals of the object imaged by said image sensor; and a actual measurement control means for setting a measurement condition in accordance with the distance information obtained by said preliminary measurement and for executing the actual measurement by making said optical projection system and said image sensor operate under the set measurement condition to actually measure the three-dimensional position of the object.

These objects and other objects are achieved by providing a three-dimensional measuring method comprising steps of:

illuminating an object with light;

forming an optical image of the illuminated object on an image sensing surface of an image sensor;

outputting image signals corresponding to the amount of light impinging the image sensing surface;

obtaining information on the distance to the object based on the reflection light from said object imaged by said image sensor prior to an actual measurement of the three-dimensional position of the object;

setting a measurement condition in accordance with the obtained distance information; and executing the actual measurement of the three-dimensional position of the object under said set measurement condition.

These objects and other objects are achieved by providing a three-dimensional measuring device comprising:

an optical projection system which projects light on an object with varying the projection angle within a predetermined range of projection angles;

an image sensor which receives light reflected from the object illuminated by said projection system and generating image signals of the object;

a preliminary measurement control means for executing a preliminary measurement by making said optical projection system operate within only a part of the predetermined projection angle range prior to actual three-dimensional position measurement and by driving said image sensor to generate the image signals; and a actual measurement control means for setting a measurement condition in accordance with the image signals obtained by said preliminary measurement and for controlling said optical projection system and said image sensor to execute the actual measurement under the set measurement condition.

These objects and other objects are achieved by providing a three-dimensional measuring method comprising steps of:

executing a preliminary measurement which includes steps of projecting light on an object with varying the projection angle within a narrow predetermined range of projection angles, sensing the light reflected from the illuminated object, and generating image signals of the object;

setting a measurement condition in accordance with the image signals obtained by said sensing step; and executing, under said measurement condition set by said setting step, an actual three-dimensional measurement which includes steps of projecting light on the object with varying the projection angle within a wide predetermined range of projection angles, sensing the light reflected from the illuminated object, and generating image signals of the object.

These objects and other objects are achieved by providing a three-dimensional measuring device comprising:

an optical projection system which projects light on an object with varying the projection angle;

an image sensor which receives light reflected from the object illuminated by said projection system and generating image signals of the object;

a preliminary measurement control means for executing a preliminary measurement prior to an actual measurement by making said optical projection system and said image sensor operate;

a setting means for setting a measurement condition for the actual measurement in accordance with a part of the image signals obtained by said preliminary measurement;

an actual measurement control means for executing the actual measurement under said set measurement condition by making said optical projection system and said image sensor operate; and a calculating means for calculating three-dimensional positions of the object in accordance with entire image signals obtained by said actual measurement.

These objects and other objects are achieved by providing a three-dimensional measuring device which projects light on an object and senses the light reflected by said object under variable measurement conditions to obtain three-dimensional positions of the object, said three-dimensional measuring method comprising;

a judging means for judging whether said measurement conditions are acceptable or not; and a warning means for warning if said judging means judges that said measurement conditions are not acceptable.

These objects and other objects are achieved by providing a three-dimensional measuring device which projects light on an object and senses the light reflected by said object under variable measurement conditions to obtain information related to three-dimensional positions of the object, said three-dimensional measuring method comprising;

a display on which displays the obtained information;

a judging means for judging the obtained information are acceptable or not; and a control means which displays the unacceptable information in different shape from the acceptable information on said display.

These objects and other objects are achieved by providing a optical system used in three-dimensional measurement apparatus which measures three-dimensional positions of an object, said optical system comprising an optical projection device which includes:

a light source which emits light beam therefrom;

a variator which is provided on a path of said light beam emitted by light source and varies diameter of the light beam;

an expander which is provided on a path of the light beam varied by said variator and expand the light beam in one direction to form a slit light beam; and a deflector which deflects said slit light beam formed by said expander.

these and other objects, advantages and features of the invention will become apparent from the following description thereof taken in conjunction with the accompanying drawings which illustrate specific embodiments of the invention.

BRIEF DESCRIPTION OF THE DRAWINGS

FIG. 1 shows the construction of the measurement system of the present invention;

FIG. 18 shows the relationship between input and output of the warning discrimination circuit;

FIG. 25 shows the data content of a preliminary measurement table;

In the following description, like parts are designated by like reference numbers throughout the several drawings.

DETAILED DESCRIPTION OF THE PREFERRED EMBODIMENTS

Figure 2A:
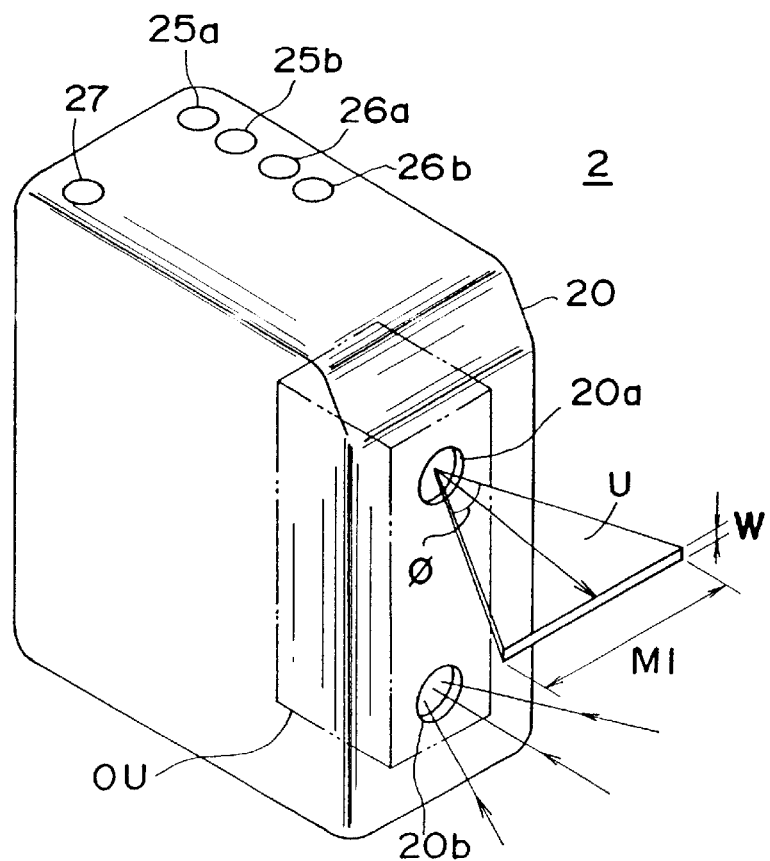
FIGS. 2a and 2b show exterior views of the three-dimensional camera.

1. Overall Construction of Measurement System 1

FIG. 1 shows the construction of measuring system 1 of the present invention.

Measuring system 1 comprises a three-dimensional camera (rangefinder) 2 for accomplishing stereoscopic measurement by a slit projection method, and host 3 for processing data output from said three-dimensional camera 2.

Three-dimensional camera 2 outputs measurement data (slit image data) specifying the three-dimensional positions of a plurality of sampling points on object Q, as well as two-dimensional image data expressing color information of object Q and data required for calibration. The calculation process for determining coordinates of sampling points using a triangulation method is accomplished by host 3.

Host 3 is a computer system comprising a central processing unit (CPU) 3a, display 3b, keyboard 3c, and mouse 3d. software for processing measurement data is included in CPU 3a. Data transfers between host 3 and three-dimensional camera 2 are possible in both online mode and offline mode by portable recording media. These recording media include magneto-optic disk (MO), mini disk (MD), memory card and the like.

2. Construction of Three-dimensional Camera 2

2-1. Three-dimensional Camera 2 Exterior View

Figure 2B:
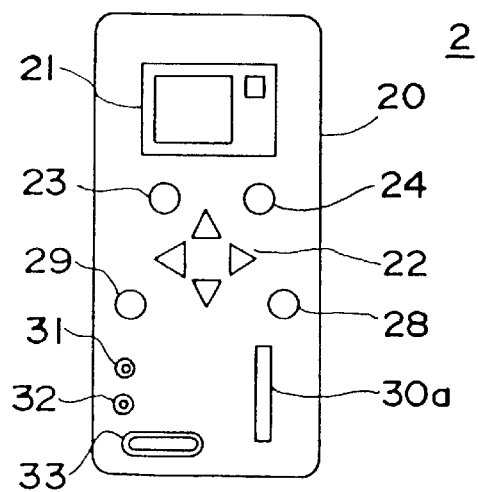

FIG. 2a is a perspective view showing the exterior of three-dimensional camera 2, and FIG. 2b is a plan view of the operational panel provided at the back of three-dimensional camera 2.

A projection window 20a and reception window 20b are provided on the front surface of housing 20. Projection window 20a is positioned above the reception window 20b. Slit light (band-like laser beam of predetermined width w) U is emitted from an internal optical unit OU through projection window 20a toward an object which is the subject of measurement. The radiation angle φ of slit light U in the width direction M1 is fixed. A portion of the slit light U reflected by the object surface passes through reception window 20b and enters optical unit OU. Optical unit OU is provided with a dual axis adjustment mechanism to optimize the relative position relationship between the projection light axis and the reception light axis. This mechanism is described in detail later.

On the top panel of housing 20 are provided zoom buttons 25a and 25b, manual focus buttons 26a and 26b, and release button 27. As shown in FIG. 2b, on the back panel of housing 20 are provided a liquid crystal display 21, cursor button 22, selection button 23, cancel button 24, record button 28, undo button 29, analog output pins 31 and 32, digital output pin 33, and removable recording media installation slot 30a. Record button 28 also functions as a focus locking button.

Liquid crystal display 21 is used as an operation screen display means and as an electronic finder. An operator can set the image sensing mode via the various buttons on the back panel. Measurement data are output from analog output pin 31; the two-dimensional image signals output from analog output pin 32 may be, for example, NTSC type (National Television System Committee) signals. Digital output pin 33 is, for example, an SCSI (Small Computer System Interface) pin.

2-2. Three-dimensional Camera 2 Control Circuit

Figure 3:
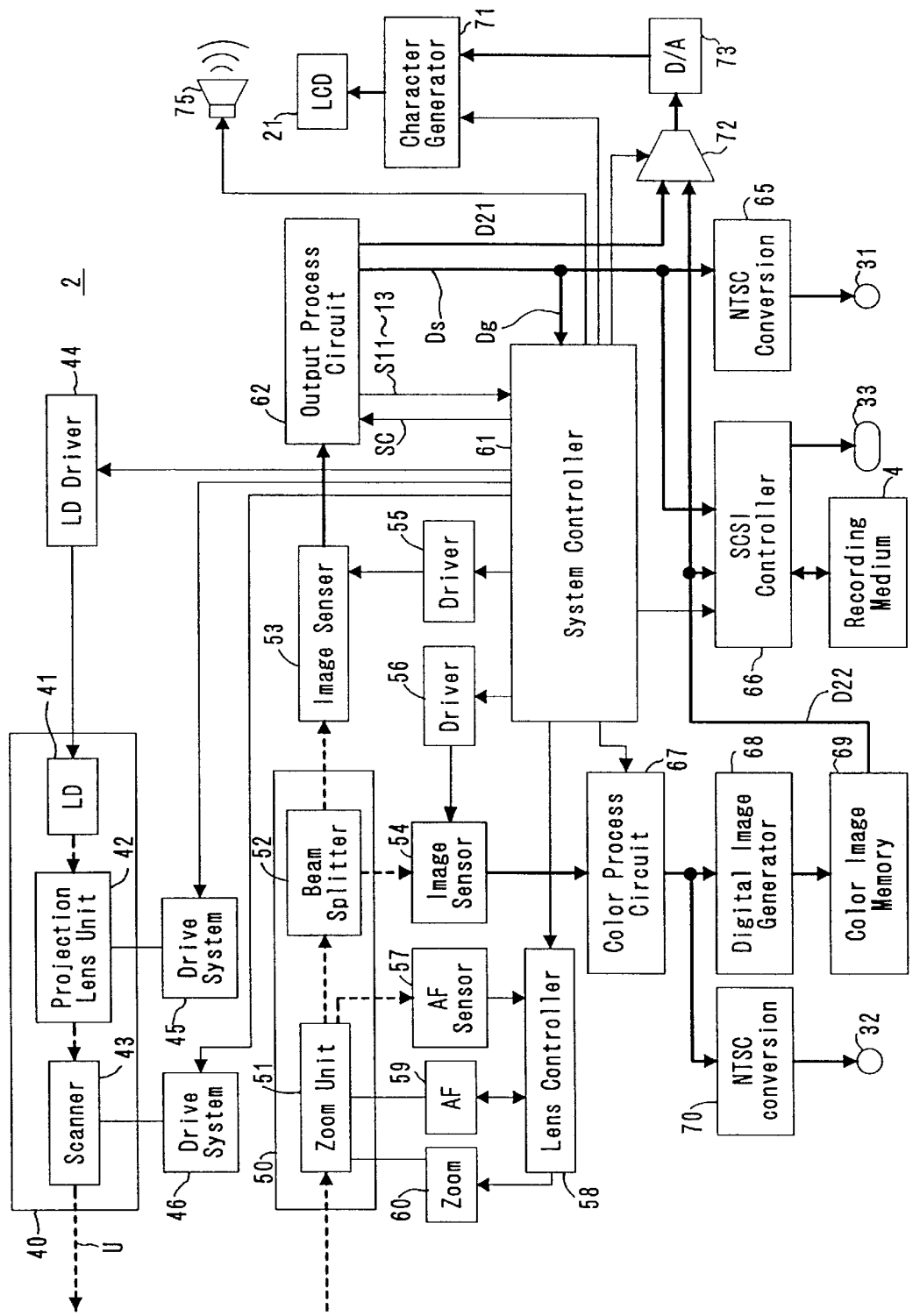
FIG. 3 is a block diagram showing the functional construction of the three-dimensional camera.

FIG. 3 is a block diagram showing the functional construction of three-dimensional camera 2. In the drawing, the solid arrow represents the flow of electric signals, and the dashed arrow represents the flow of light.

Three-dimensional camera 2 is provided with two optical units 40 and 50 disposed on the projection side and reception side, respectively, and which together comprise the previously mentioned optical unit OU. In projection optical unit 40 a semiconductor laser (LD) 41 emits a laser beam having a wavelength of 690 nm which becomes slit light U after passing through the projection lens unit 42, and is then deflected in a direction perpendicular to the length direction of the slit via galvano mirror (scanner) 43. The driver 44 for semiconductor laser 41, drive system 45 for projection lens unit 42, and drive system 46 for galvano mirror 43 are all controlled by a system controller 61.

In reception optical unit 50, light condensed by zoom unit 51 is split by beam splitter 52. The light in the oscillation wavelength range of semiconductor laser 41 enters the image sensor 53 used for measurement. Light in the visible range enters the color image sensor 54 used for monitoring. Either or both the image sensor 53 and color image sensor 54 may be a charge-coupled device (CCD) area sensor. Zoom unit 51 is an internal focus type, and a part of the incident light is used for autofocusing (AF). The autofocus function is realized by AF sensor 57, lens controller 58, and focusing drive system 59. The zoom drive system 60 is provided for electric zooming.

Imaging information obtained by image sensor 53 is synchronized by clock signals from driver 55, and transmitted to output process circuit 62. Measurement data Ds corresponding to each pixel output by image sensor 53 are generated by the output process circuit 62, and temporarily stored in memory within said output process circuit 62. On the other hand, imaging information obtained by color image sensor 54 is synchronized by clock signals from driver 56 and transmitted to color process circuit 67. The imaging information subjected to color processing is output online through NTSC conversion circuit 70 and analog output pin 32, or quantized by digital image generator 68 and stored in color image memory 69.

Output process circuit 62 generates distance image data representing the measurement result based on the measurement data Ds, and outputs said data to multiplexor 72. Multiplexor 72 selects as output one of the two input color image data, i.e., distance image data D21 or color image data D22 from color image memory 69, in accordance with the instructions from system controller 61. The data selected by multiplexor 72 is transmitted via digital-to-analog (D/A) converter 73 to the character generator 71 as analog monitor display signals. Character generator 71 combines the image expressed by the monitor display signals and text and symbols specified by system controller 61, and outputs the composite image to liquid crystal display 21.

When a user operates the record button 28 to specify data output (image recording), the measurement data Ds within the output process circuit 62 are either output online in predetermined format by either SCSI controller 66 or NTSC conversion circuit 65, or stored on recording medium 4. The analog output pin 31 or digital output pin 33 is used for online output of measurement data Ds. The color image data D22 is transmitted from color image memory 69 to SCSI controller 66, and output online from digital output pin 33, or stored on recording medium 4 associated with measurement data Ds. The color image is an image having the same field angle as the distance image obtained by image sensor 53, and is used as reference information for the application processing performed by host 3. Processes using the color information include, for example, a process for incorporating a plurality of pairs of measurement data of different camera perspectives to generate three-dimensional models, and a process for culling unnecessary items from three-dimensional models.

System controller 61 generates audible warning signals and operation verification signals by actuating a buzzer 75. A scale value sc for the monitor display is supplied to output process circuit 62. Output process circuit 62 outputs three types of warning signals S11, S12, and S13 (described later), and light reception signals Dg which are a part of the measurement data Ds, and transmit said signals to system controller 61.

2-3. Construction of Optical Projection Unit 40 of Three-dimensional Camera 2

Figure 4A:
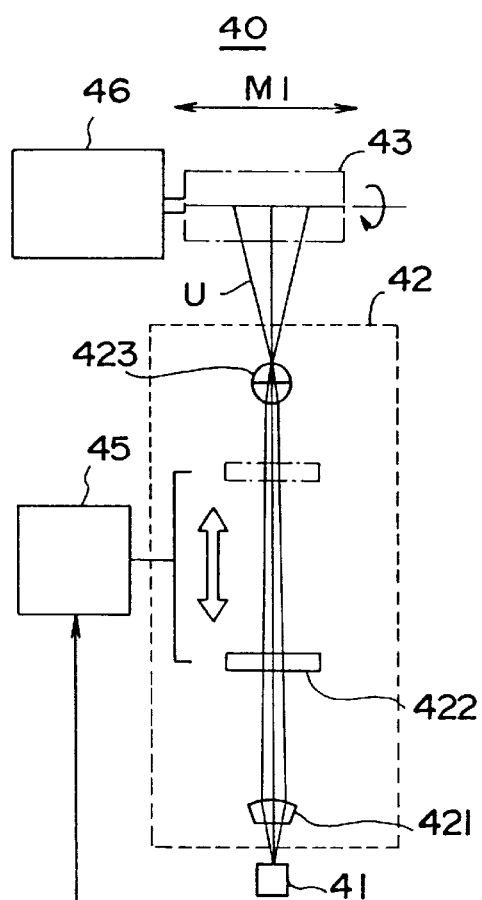
FIGS. 4a and 4b show the construction of the optical projection system.
Figure 4B:
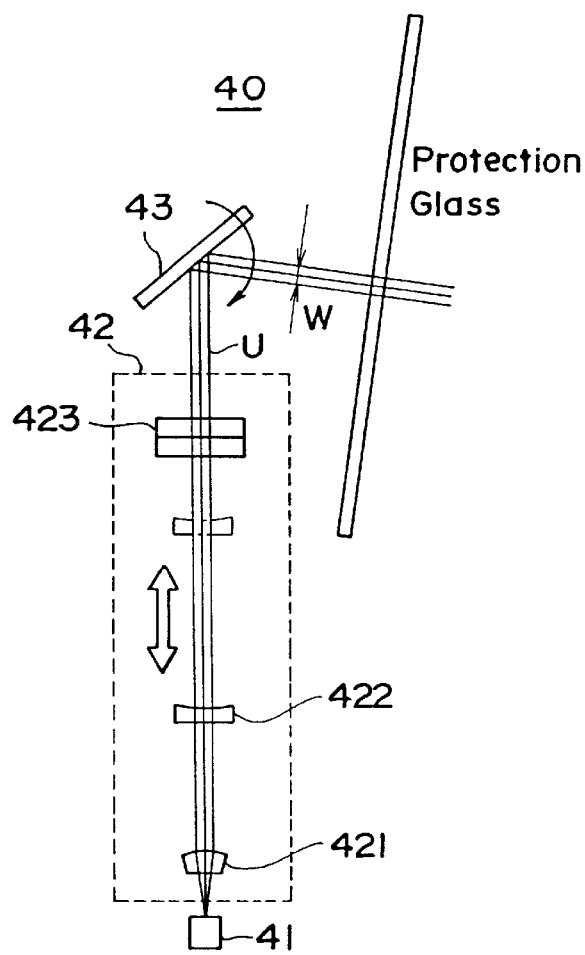

FIGS. 4a and 4b show the construction of optical projection unit 40. FIG. 4a is a front view, and FIG. 4b is a side view.

Projection lens 42 comprises three lenses which include collimator lens 421, variator lens 422, and expander lens 423. Optical processing to obtain a suitable slit light U is performed in the sequence described below on the laser beam emitted from semiconductor laser 41. First, the mean is collimated by collimator lens 421. Then, the laser beam diameter is adjusted by variator lens 422. Finally, the beam is expanded in the slit length direction M1 via expander lens 423.

Variator lens 422 is provided to direct the slit light U having a width of three or more pixels (five pixels in the present embodiment) onto image sensor 53. Drive system 45 moves variator lens 422 so as to maintain a constant width w of slit light U on image sensor 53 in accordance with instructions from system controller 61. Variator lens 422 and the reception side zoom unit 51 are connected.

Expanding the slit length prior to deflection by galvano mirror 43 reduces distortion of slit light U compared to said expansion after deflection. The galvano mirror 43 can be rendered in a more compact form factor by disposing the expander lens 423 in the final stage of the projection lens system 42, i.e., nearer to galvano mirror 43.

2-4. Construction of the Optical Reception System 50 of Three-dimensional Camera 2

Figure 5:
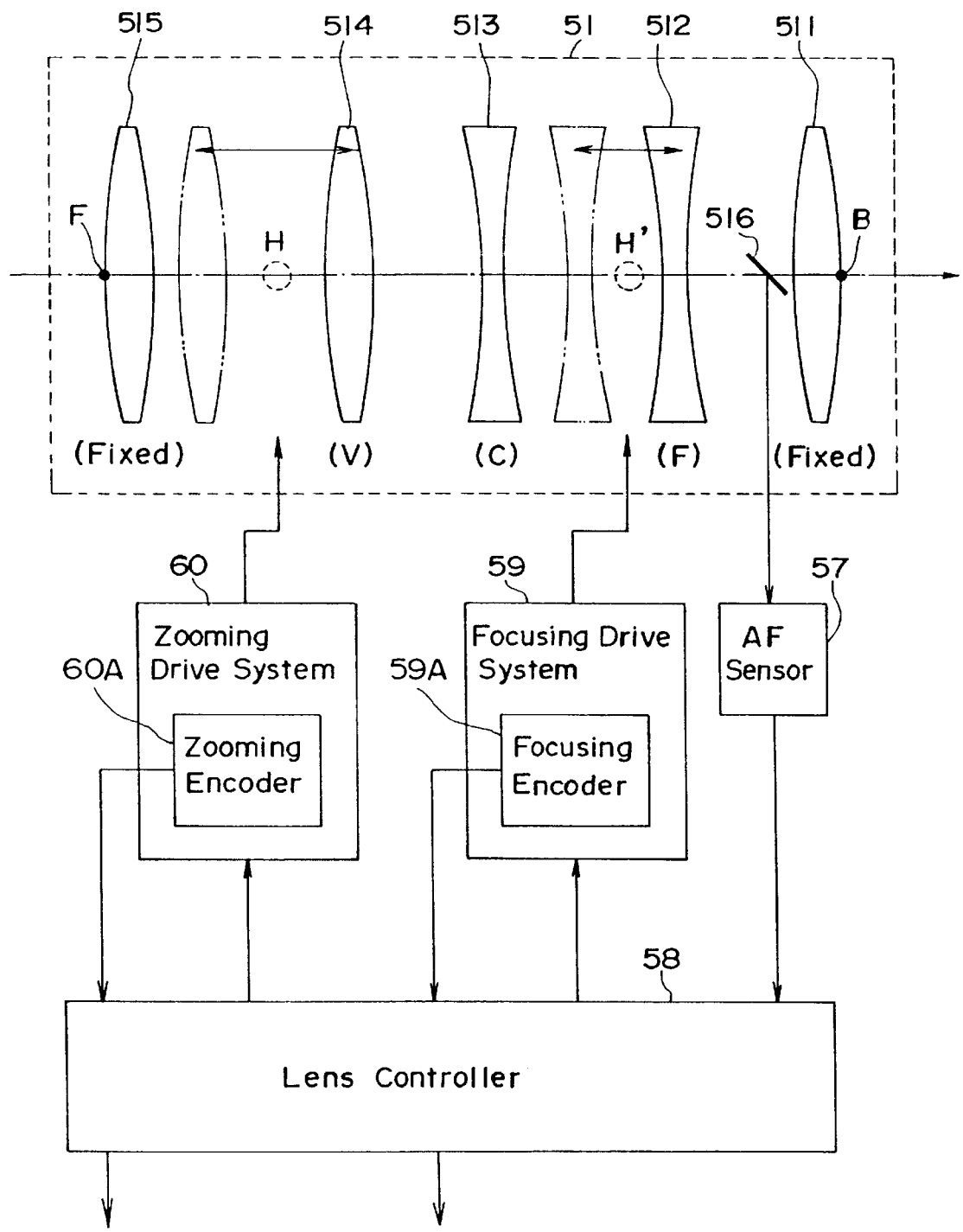
FIG. 5 shows the zoom unit of the light receiving system.

FIG. 5 shows the zoom unit 51 of the optical reception system 50.

Zoom unit 51 comprises front image forming lens 515, variator lens 514, compensator lens 513, focusing lens 512, rear image forming lens 511, and beam splitter 516 for guiding a part of the incident light to AF sensor 57. The front image forming lens 515 and rear image forming lens 511 are fixed relative to the optical axis.

The movement of focusing lens 512 is accomplished by focusing drive system 59, and the movement of variator lens 514 is accomplished by zooming drive system 60. The focusing drive system 59 is provided with a focusing encoder 59A for specifying the travel distance (feed amount) of focusing lens 512. Zooming drive system 60 is provided with a zooming encoder 60A for specifying the movement distance (zoom value) of variator lens 514.

Figure 6:
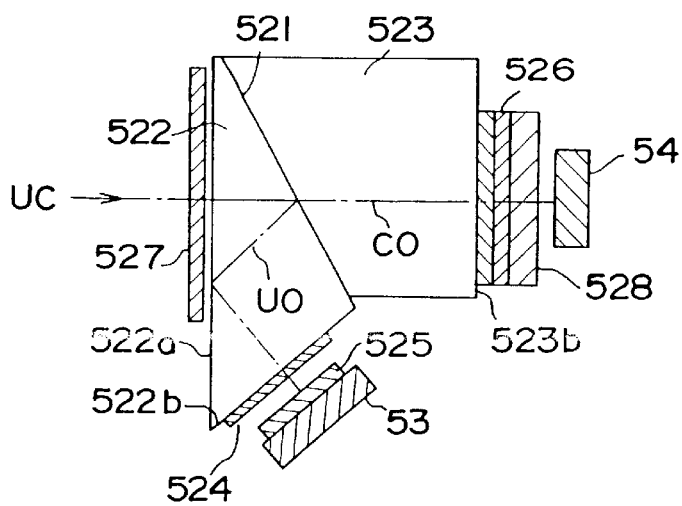
FIG. 6 shows a beam splitter.
Figure 7:
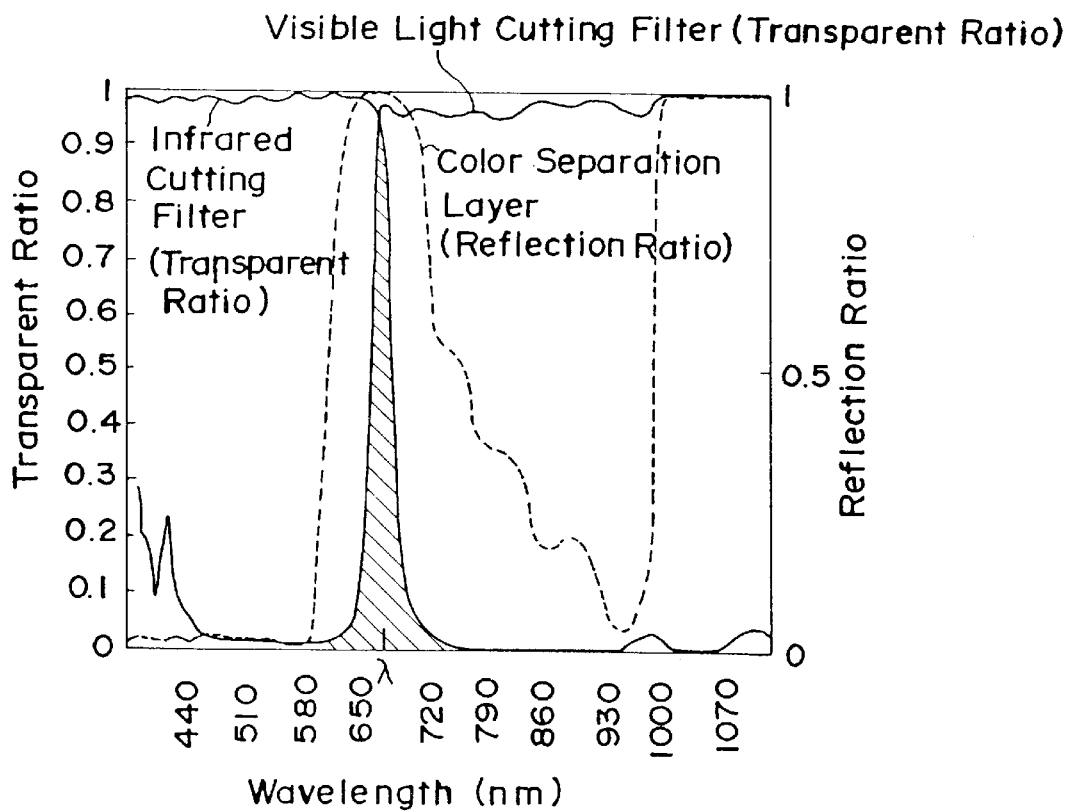
FIG. 7 is a graph showing the wavelength of the light received by the image sensor used for measurement.
Figure 8:
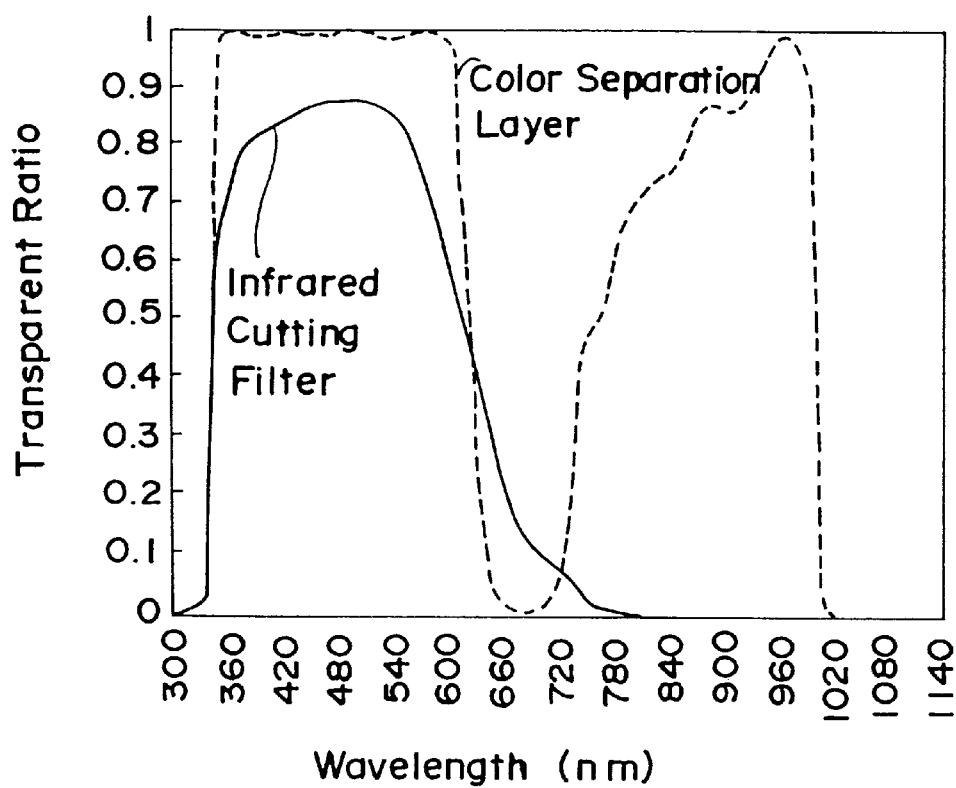
FIG. 8 is a graph showing the wavelength of the light received by color sensor of the monitor.

FIG. 6 shows beam splitter 52 of the optical reception system 50. FIG. 7 is a graph showing the reception light wavelength of the image sensor 53 used for measurement. FIG. 8 is a graph showing the reception light wavelength of the color sensor 54 used for monitoring.

Beam splitter 52 comprises a color separation film (dichroic mirror) 521, two prisms 522 and 523 circumscribing color separation layer 521 therebetween, infrared cutting filter 524 provided on the emission face 522b of prism 522, visible light cutting filter 525 provided on the anterior face of image sensor 53, infrared cutting filter 526 provided on emission face 523b of prism 523, and low-pass filters 527 and 528.

The incident light UC from zoom lens 51 passes through low-pass filter 527 and prism 522, and impinges color separation layer 521. The light OU at the oscillation wavelength of semiconductor laser 41 is reflected by the color separation layer 521, and after reflection by the incident surface 522a of prism 522, is emitted toward image sensor 53. Within the light OU emitted from prism 522, the light passing through infrared cutting filter 524 and visible light cutting filter is received by image sensor 53. On the other hand, the light CO that has passed through color separation layer 521 passes through prism 523, and is emitted from the emission panel 523b toward color sensor 54. Within the light CO emitted from prism 523, the light passing through infrared cutting filter 526 and low-pass filter 528 is received by color sensor 54.

In FIG. 7, the color separation layer 521 indicated by the dashed line reflects light within a relatively broad wavelength range which includes the slit light wavelength ($\lambda$: 690 nm). That is, The wavelength selectability of the color separation layer 521 is inadequate when only the slit light is selectively incident to the image sensor 53. Since the beam splitter 52 is provided with the infrared cutting filter 524 having the characteristics indicated by the dashed line, and visible light cutting filter 525 having the characteristics indicated by the solid line, the light ultimately incident to image sensor 53 is light of a wavelength within a narrow range indicated by the shaded area in FIG. 7. Therefore, measurement can be realized with scant influence of environmental light, i.e., with a large optical SN ratio.

On the other hand, only visible light enters color sensor 54 because light in the infrared range passing through the color separation filter 521 having the characteristics indicated by the dashed line is blocked by infrared cutting filter 528 having the characteristics indicated by the solid line in FIG. 8. Thus, color reproducibility of the monitor image is increased.

A single filter having characteristics for blocking both infrared and visible light may be used instead of the two filters of infrared cutting filter 524 and visible light cutting filter 525. Both infrared cutting filter 524 and visible light cutting filter 525 may be disposed on the prism 522 side, or, conversely, both said filters may be disposed on the image sensor 53 side. Conversely to the example shown in FIG. 6, the visible light cutting filter 525 may be disposed on the prism 522 side, and infrared cutting filter 524 may be disposed on the image sensor 53 side.

2-5. Dual axis Adjustment Mechanism of Optical Unit OU of Three-dimensional Camera 2

The dual axis adjustment mechanism of optical unit OU is described below.

Figure 9:
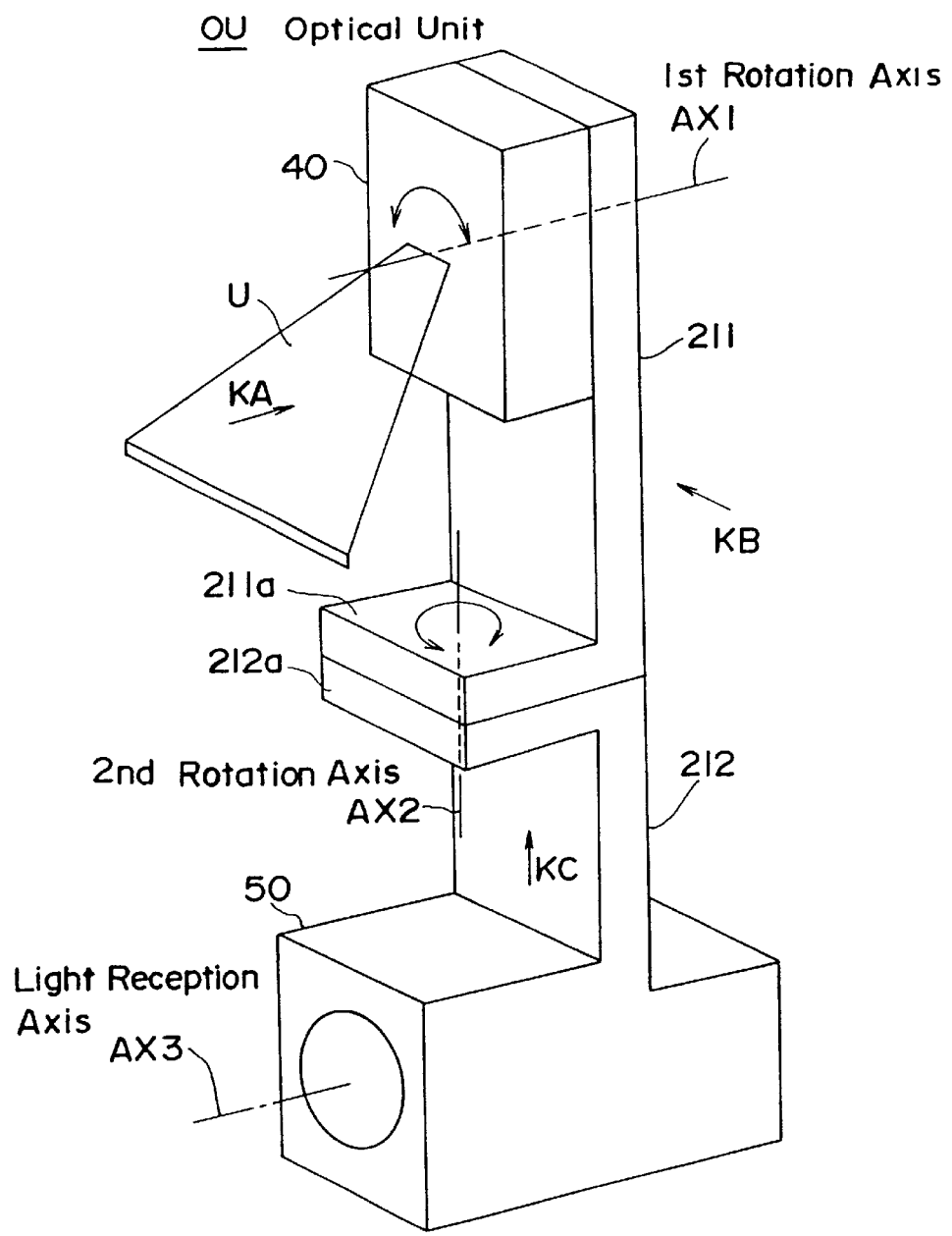
FIG. 9 is a perspective view of the dual axis adjustment mechanism of the optical unit.
Figure 10:
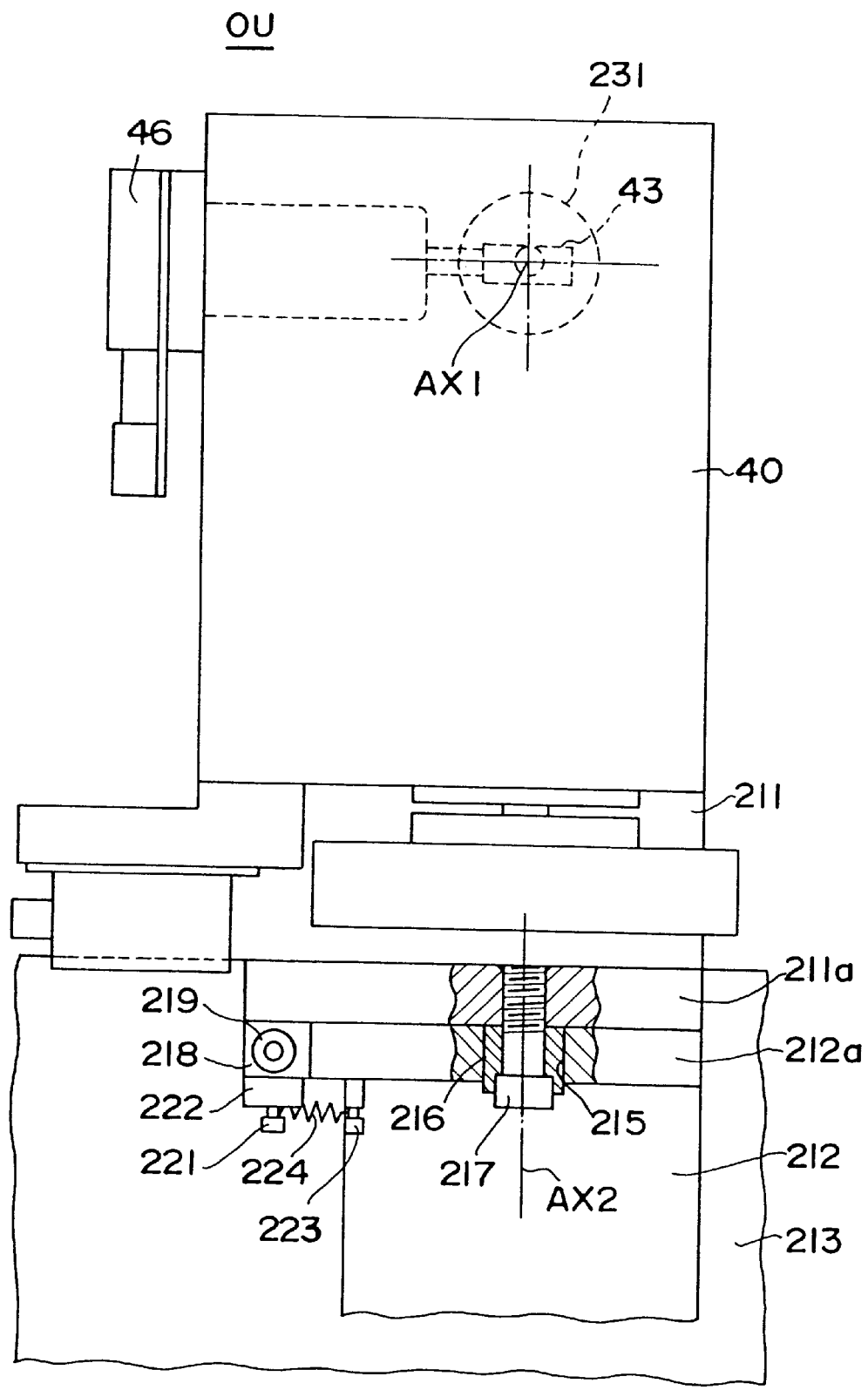
FIG. 10 is an elevation view of the top portion of the optical unit of FIG. 9.
Figure 11:
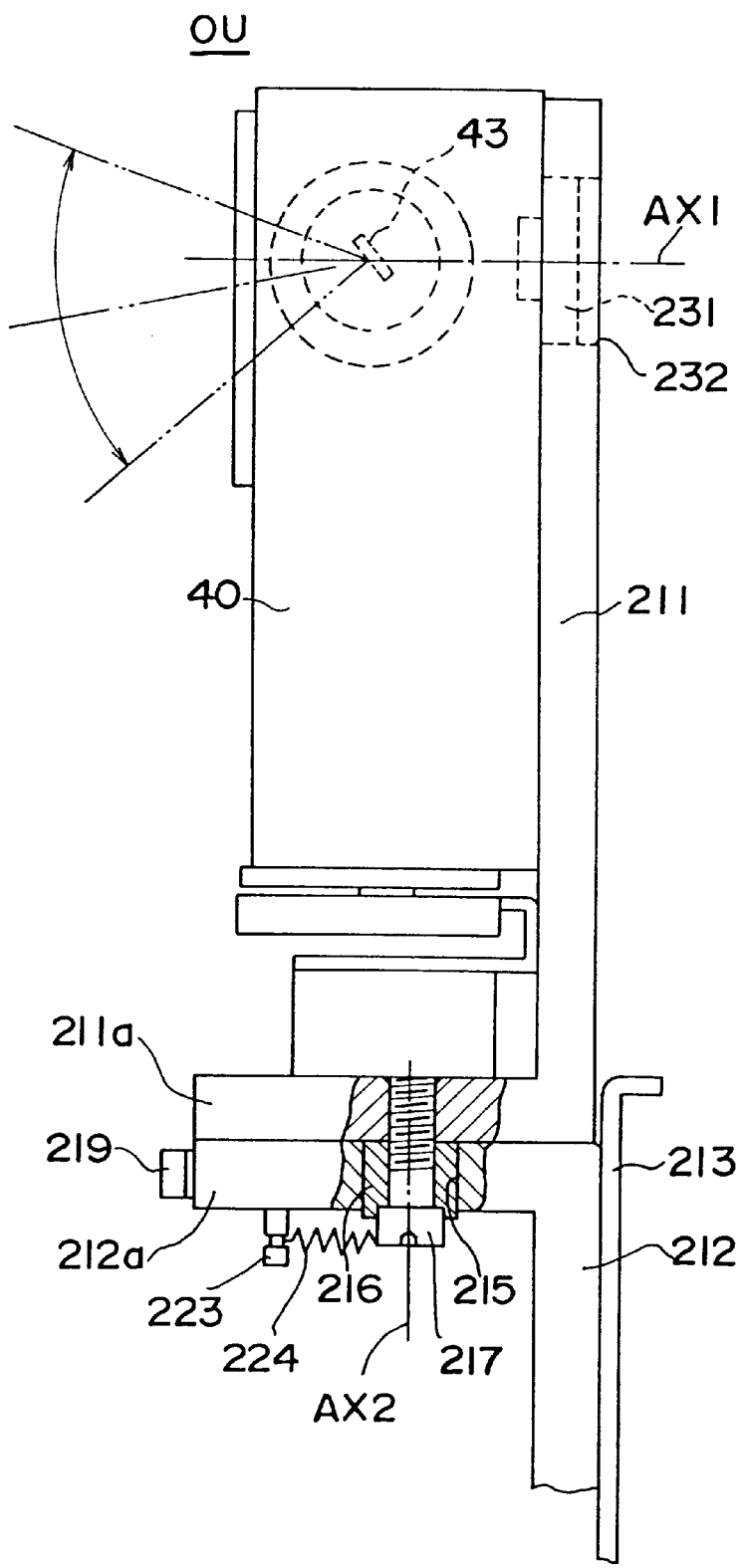
FIG. 11 is a side view of the top portion of the optical unit of FIG. 9.
Figure 12:
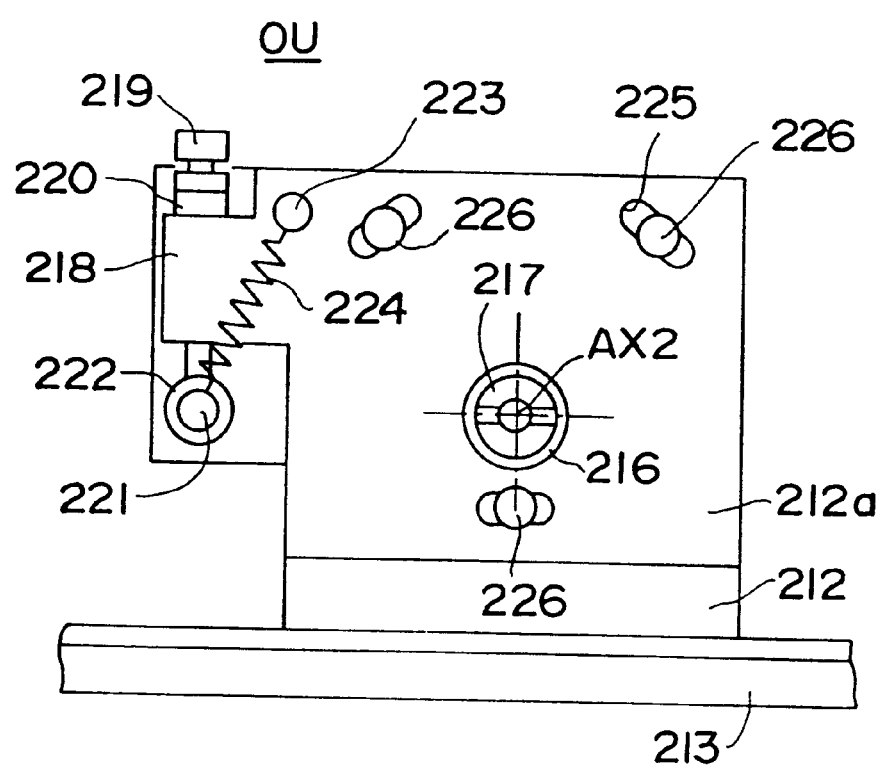
FIG. 12 is a bottom view of the optical unit of FIG. 9.
Figure 13A:
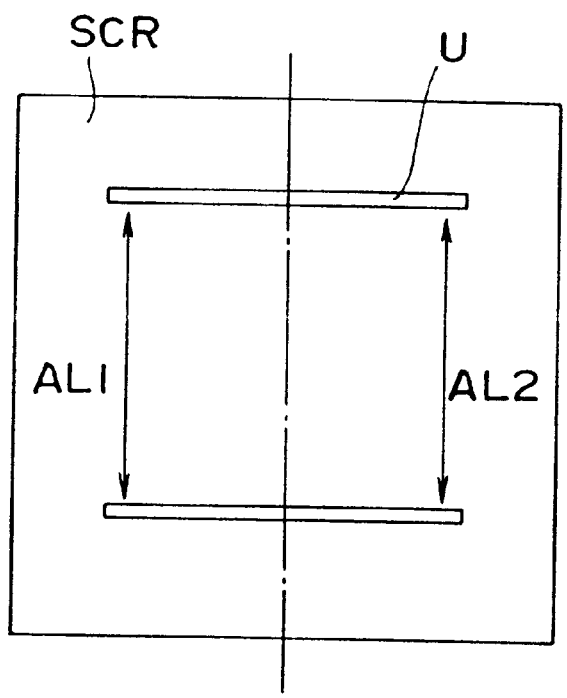
FIGS. 13a and 13b illustrate the adjustment method of the dual axis adjustment mechanism of the optical unit.
Figure 13B:
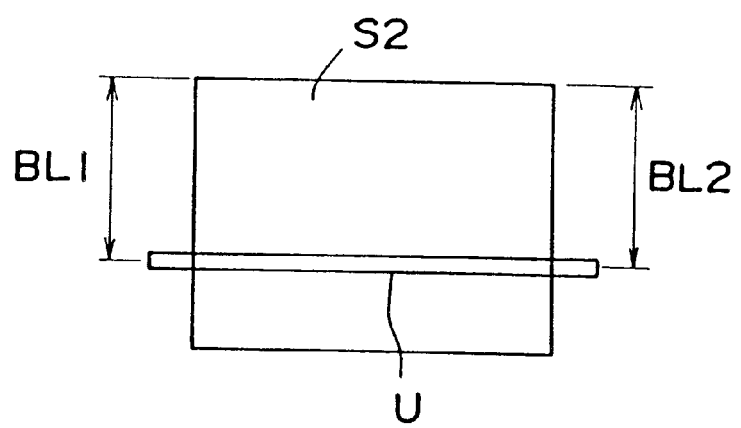

FIG. 9 is a perspective view briefly describing the dual axis adjustment mechanism of optical unit OU. FIG. 10 is a frontal perspective of the top part of the optical unit OU of FIG. 9 as viewed from the arrow KA direction. FIG. 11 is a right side view of the top part of the optical unit OU of FIG. 9 as viewed from the arrow KB direction. FIG. 12 is a bottom view of the optical unit OU of FIG. 9 as viewed from the arrow KC direction. FIGS. 13a and 13b illustrate the adjustment method of the dual axis adjustment mechanism of optical unit OU.

As shown in FIG. 9, optical unit OU comprises optical projection system 40 as a projection device, and optical reception system 50 as a light receiving device, mounted on brackets 211 and 212. These two brackets 211 and 212 are connected so as to be mutually rotatable about a second rotation axis AX2 on the Y direction axis. Optical projection system 40 is mounted on bracket 211 so as to be rotatable about a first rotation axis AX1 on the Z axis. Optical reception system 50 is fixedly mounted on bracket 212. The first rotation axis AX1 is adjusted so as to be parallel to the light reception axis AX3 of optical reception system 50.

As shown in FIGS. 9 through 12, brackets 211 and 212 form an L-shaped conFiguration when viewed from the side, and are rotatable when in mutual contact when the exterior surface of horizontal panels 211a and 212a. That is, a collar 216 is inserted in hole 215 provided on horizontal panel 212a, and said collar 216 is fixedly attached to horizontal panel 211a via bolt 217. The head of bolt 217 is provided with a tapped hole, and after the head of bolt 217 is covered with a closed ended cap (not shown in the drawing), which is attached to bolt 217 by the bolt screwed into the tapped hole on the head of the bolt through a hole provided in the center of the cap, thereby protecting the head of bolt 217. A channel used for a rotating connection is provided on the head of bolt 217.

An adjustment bolt 219 for adjusting the rotation angle position is screwed into the threaded hole provided on the protruding endpiece 219 of horizontal panel 212a. The tip of adjustment bolt 219 abuts the exterior surface of collar 222 mounted on horizontal panel 211a via bolt 221. A tension spring 224 is installed between bolt 221 and bolt 223 mounted on horizontal panel 212a, thereby mutually exerting force between horizontal panels 211a and 212a in the direction in which the tip of adjustment bolt 210 abuts collar 222. Accordingly, the relative rotation angle position is adjusted between bracket 211 and bracket 212 about the second rotation axis by adjusting the axial direction position by rotating the adjustment bolt 219. After the adjustment is made by adjustment bolt 219, the adjustment bolt 219 is locked in place with a lock nut 220, and both horizontal panels 211a and 212a are anchored by tightening three bolts 226 inserted through three slots 225 provided in horizontal panel 212a and screwed into threaded holes in horizontal panel 211a.

A shaft member 231 is mounted on the back panel of the housing of the optical projection system 40, and this shaft member 231 is inserted, so as to be rotatable, in the center of first rotation axis AX1 in the perpendicular portion of bracket 211. After adjusting the rotation angle position of optical projection system 40 to center first rotation axis AX1, the optical projection system 40 is fixed to bracket 211 by tightening a plurality of bolts (not illustrated) passing through holes provided in the housing of projection system 40 and screwed into threaded holes provided in bracket 211. A mounting plate 213 is attached to bracket 212 by bolts, and a mounting plate 213 is attached to the casing of optical unit OU.

The base line AO connecting the origin point A of the projection light in the optical projection system 40 and the principal point O (posterior side principal point H') of the lens of optical reception system 50 is perpendicular to the light receiving axis AX3. The imaging surface S2 is perpendicular to the refracted light receiving axis AX3.

The adjustment method for adjusting the first rotation axis AX1 and second rotation axis AX2 is described hereinafter.

The screen SCR shown in FIG. 13a is arranged perpendicular to the light receiving axis AX3 in the front of receiving axis AX3. First, in regard to the slit light U projected onto screen SCR from the projection system 40, when the slit light U is scanning, the relative positions of bracket 211 and bracket 212 are adjusted relative to second rotation axis AX2 so as to mutually align the right and left travel distances AL1 and AL2 of slit light U so as to be mutually identical before and after the scan. Then, in regard to the slit light U received on imaging surface S2 shown in FIG. 13b, the position of projection system 40 is adjusted relative to the first rotation axis AX1 so as to mutually align the right and left positions BL1 and BL2 so as to be mutually identical, i.e., so as to render slit light U parallel to the X axis of imaging surface S2. These adjustments are repeated a number of times.

The first rotation axis AX1 is rendered parallel to the reception axis AX3 via the aforesaid adjustments, such that the scanning direction (deflection direction) of slit light U matches the direction of the second rotation axis AX2. Therefore, there are no errors in the positional relationship between projection system 40 and reception system 50, and precise measurement can be accomplished without correction of errors in said positional relationship. Even when performing correction to obtain even higher precision, changing the correction value when zooming by the zoom unit 51 is unnecessary. Accordingly, calculation processes to achieve such correction is unnecessary or minimal with an extremely short processing time.

3. Measurement of Three-dimensional Position by Measuring System 1

3-1. Principles for Calculating Three-dimensional Position

Figure 14A:
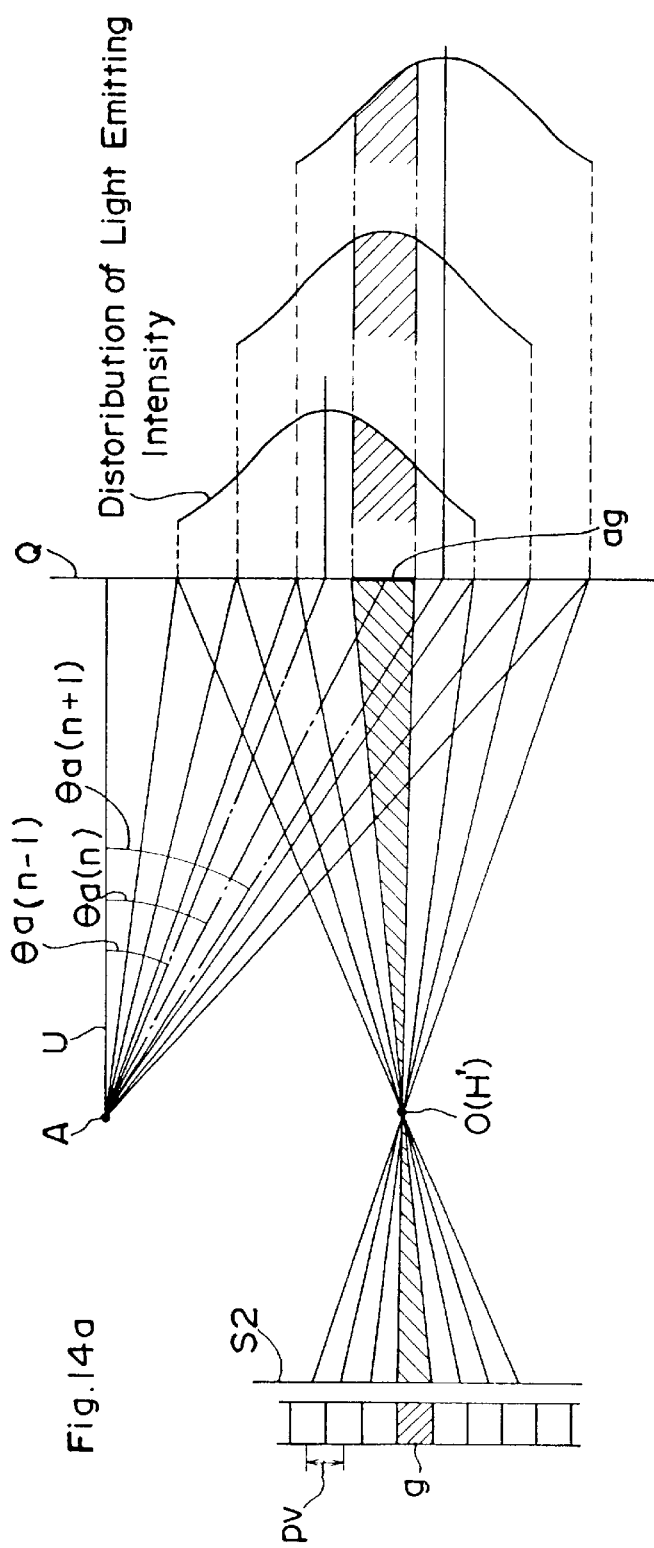
FIGS. 14a and 14b illustrate the principle of detecting three-dimensional positions in the measurement system.
Figure 14B:
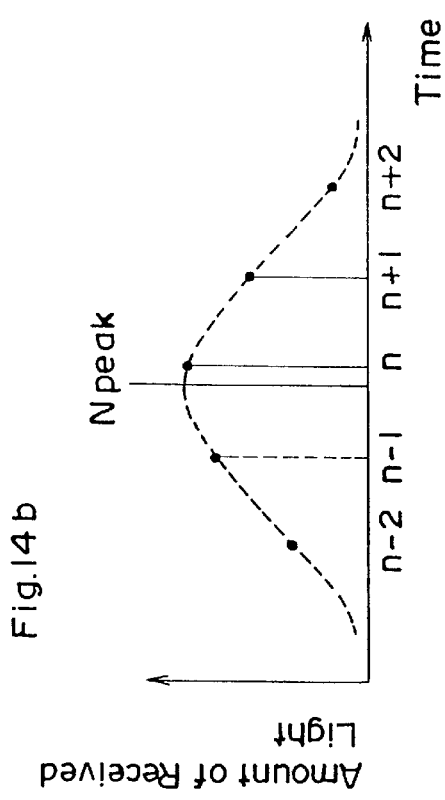

FIGS. 14a and 14b illustrate the principle of calculating a three-dimensional position by measuring system 1.

The object Q is illuminated by a slit light U having a relatively broad width of a plurality of pixels on the imaging surface S2 of image sensor 53. Specifically, the width of slit light U is set at five pixels. Slit light U is deflected from top to bottom so as to move only the pitch pv of a single pixel on the imaging surface S2 each sampling cycle, and thereby scan object Q. Photoelectric conversion information of 1-frame is output from image sensor 53 each sampling cycle.

When targeting a single pixel g on imaging surface S2, effective reception data are obtain in five sampling cycles among the N sampling cycles performed during scanning. The timing (time center Npeak: moment of the maximum amount of received light of target pixel g) wherein the object surface ag in the influence range of target pixel g passes the optical axis of slit light U is determined via interpolation of light reception data of the aforesaid five cycles. In the example of FIG. 14b, the amount of received light is greatest at a timing between the nth cycle and one cycle previous (n−1). The position (coordinates) of object Q is calculated based on the relationship between the incident direction of the slit light relative to the target pixel g and the projection direction of the slit light by the determined timing. Thus, it is possible to measure at higher resolving power than the resolving power specified by the pixel pitch pv of the imaging surface.

The amount of reception light by target pixel g is dependent on the reflectivity of object Q. The relative percentage of each quantity of reception light of the five sampling cycles is constant regardless of the absolute value of the amount of reception light. That is, the variable density of the object colors does not influence the measurement accuracy.

In the measurement system 1 of the present embodiment, light reception data of five cycles for each pixel g of image sensor 53 of three-dimensional camera 2 are output to host 3, and said host 3 calculates the coordinates of object Q based on said measurement data. The generation of measurement data relative to each pixel g in three-dimensional camera 2 is accomplished by output process circuit 62.

Figure 15:
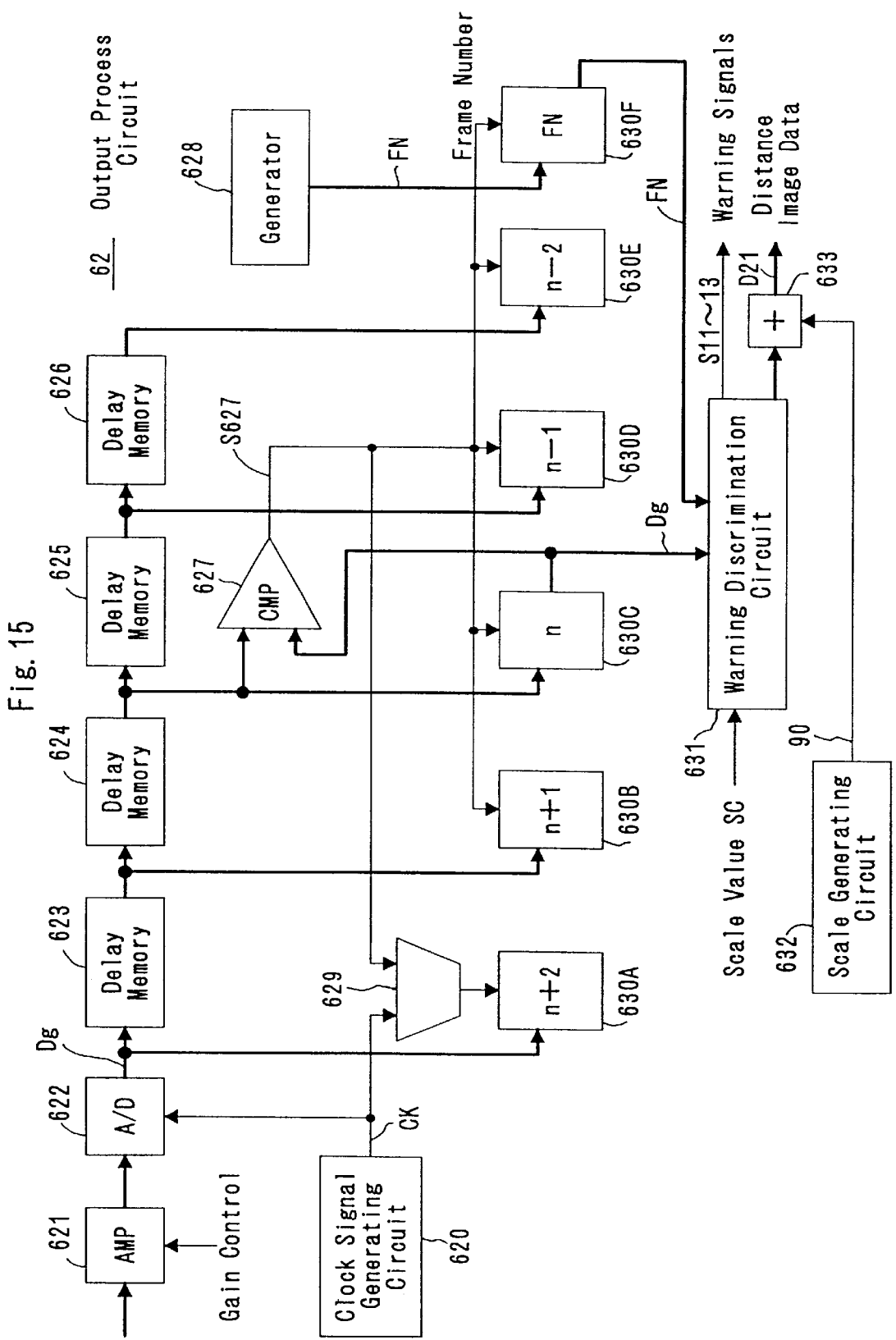
FIG. 15 is a block diagram of the output process circuit.
Figure 16:
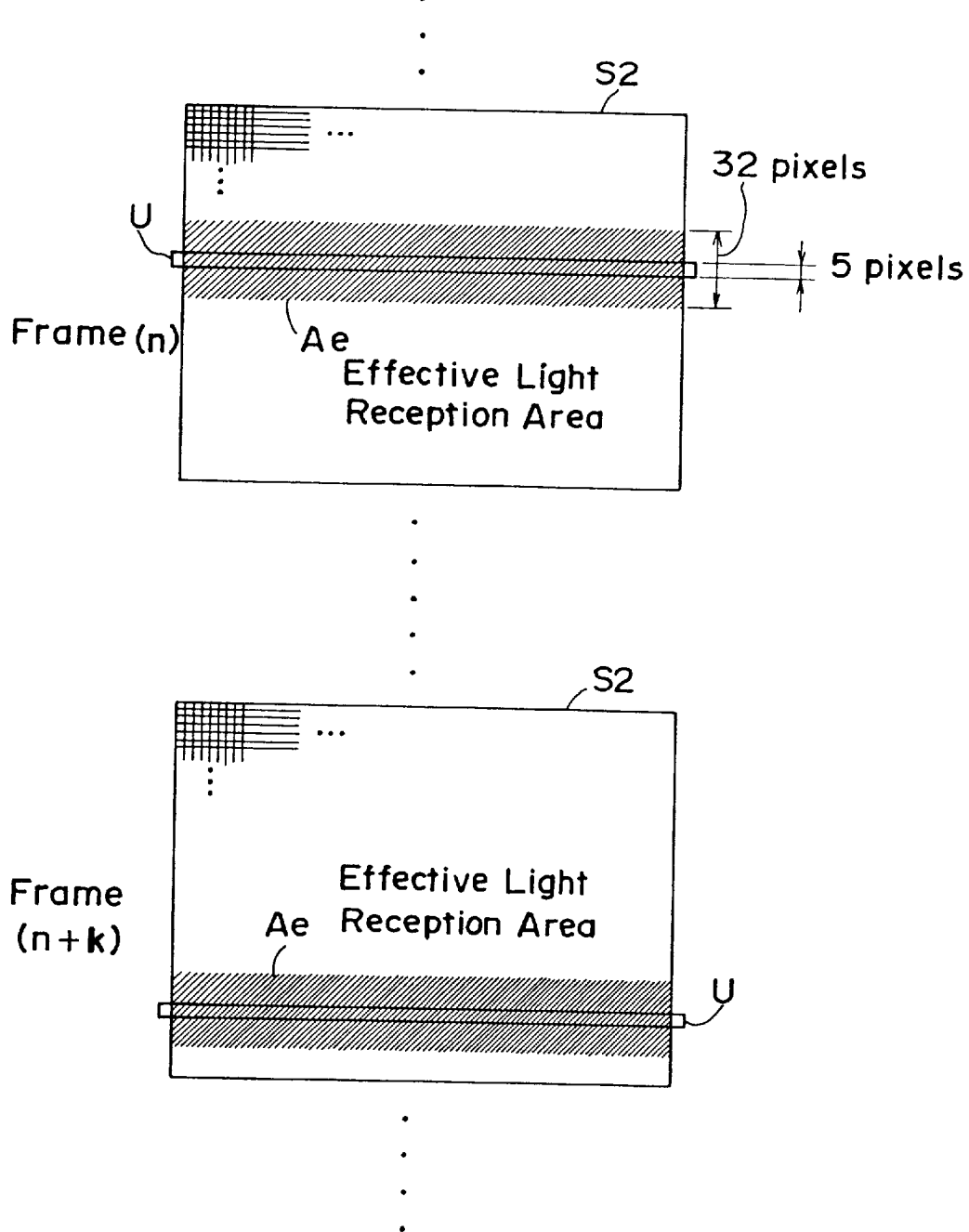
FIG. 16 shows the reading range of the image sensor.

3-2. Construction of Output Process Circuit 62 for Calculating Three-dimensional Position FIG. 15 is a block diagram of output process circuit 62. FIG. 16 shows the reading range of image sensor 53.

Output process circuit 62 comprises a clock signal generating circuit 620 which outputs clock signal CK, amplifier 621 for optimizing the level of the photoelectric conversion signal output from image sensor 53, AD converter 622 for converting the photoelectric conversion signal of each pixel g to 8-bit reception data Dg synchronously with clock signal CK, four frame delay memories 623 through 626 connected in series, comparator 627, generator 528 for specifying frame number (sampling number) FN, multiplexor 629, six individual memories 630A through 630F, Warning discrimination circuit 631, scale generating circuit 632, and image combining circuit 633. Amplifier 621 has a variable gain, which is set at a suitable value by system controller 61. The four frame delay memories 623 through 626 are provided to output light reception data Dg of five frames simultaneously to memories 630A and 630F.

Memories 630A through 630F are provided to store light reception data Dg of five effective cycles, and respectively have capacities sufficient to store a number of light reception data Dg identical to the number of measurement sampling points (i.e., number of effective pixels of image sensor 53). Memory 630F is provided to store the specific frame number FN of each pixel g, and has a capacity sufficient to store a number of individual frame numbers FN identical to the number of sample points. Memories 630B through 630F receive common output signals S627 from comparator 627 as write signals. In contrast, one signal selected by multiplexor 629 from among the two signals comprising output signal S627 and clock signal CK is input as a write signal to memory 630A. The clock signal CK is selected as a write signal in the preliminary measurement. That is, in the preliminary measurement, writing to memory 630A is accomplished simultaneously with the conversion operation of AD converter 622.

In the measurement following the preliminary measurement (referred to as "main measurement" in the present discussion), the reading of 1-frame in image sensor 53 does not target the entirety of imaging surface S2, but rather only the effective light reception area (band-like image) Ae of part of the imaging surface S2 as shown in FIG. 16 to increase speed. The effective light reception area Ae shifts only 1-pixel each frame in conjunction with the deflection of slit light U. In the present embodiment, the number of pixels of effective reception area Ae in the shift direction is fixed at 32. The width of these 32 pixels corresponds to the distance range (measurable range) of a measurement subject. The method of reading only part of the image sensed by the CCD area sensor is disclosed in U.S. patent application Ser. No. 08/358,306.

AD converter 622 serially outputs light reception data Dg of 32 lines each frame in the sequence of the arrangement of pixels g. The frame delay memories 623 through 626 are FIFO memories (first-in first-out memories) having capacities sufficient for storing 31 (i.e., 32−1) lines. The light reception data Dg of target pixel g output from AD converter 622 are compared, via comparator 626, to the maximum value of past light reception data Dg of the target pixel g stored in memory 630 in the time 2-frames are delayed. The output of the AD converter 622 and outputs of frame delay memories 623 through 626 at that moment when the delayed light reception data Dg (output from frame delay memory 624) exceeds a maximum value, are stored in memories 630A through 630E, respectively, thereby rewriting the contents of said memories 630A through 630E. At the same time, the frame numbers FN corresponding to the light reception data Dg stored in memory 630C are stored in memory 630F. The frame number FN is not the line number (pixel number in the Y direction) through the entire imaging surface S2, but rather the line number within the effective reception area Ae having a width of 32 pixels, and is a value in a range of 0 to 31. The line number in the entire imaging surface S2 can be specified by the frame number FN and the sequence (i.e., the position of the target pixel g in the Y direction) of reading the 32 lines.

When the amount of received light of target pixel g at the nth line is greatest, the data of the line (n+2) are stored in memory 630A, the data of the line (n+1) are stored in memory 630B, the data of frame n are stored in memory 630C, the data of frame (n−1) are stored in memory 630D, the data of frame (n−2) are stored in memory 630E, and n is stored in memory 630F. The aforesaid measurement data Ds transmitted to host 3 as the main measurement result are combined data of light reception data Dg stored in memories 630A through 630E, and frame number FN stored in memory 630F.

Warning discrimination circuit 631, scale generating circuit 632, and image combining circuit 633 are circuits for the monitor display (preview) of the measurement result. The light reception data Dg from memory 630C, the frame number FN from memory 630F, and scale value sc from system controller 61 are input to warning discrimination circuit 631. Warning discrimination circuit 631 outputs distance image data D21 representing the three-dimensional shape of the measurement result in achromatic variable density (grayscale), and three types of warning signals S11, S12, and S13 in accordance with the combination of the values of the three types of input. Distance image data D21 are luminance data of three colors of red (R), green (G), and blue (B) stipulating the display color of each pixel of the image. Scale generating circuit 632 generates a band-like gradation image (scale bar) 90 showing the relationship between the variable density of the distance image and the object distance. Image combining circuit 633 combines the display data of scale bar 90 with the distance image data D21.

3-3. Preview Display of Measurement Result of Three-dimensional Position

Figure 17:
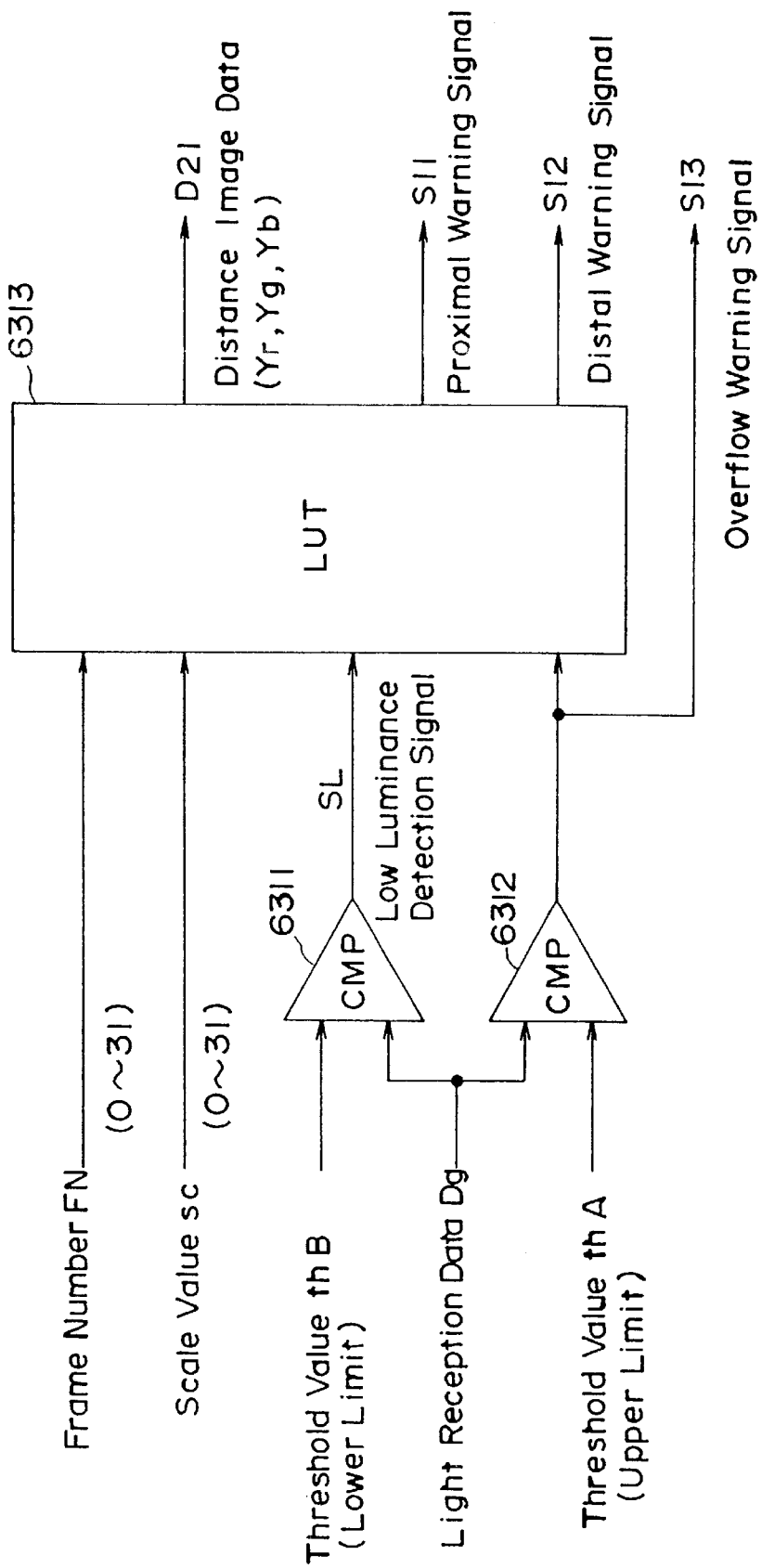
FIG. 17 is a block diagram of the warning discrimination circuit.

FIG. 17 is a block diagram of warning discrimination circuit 631. FIG. 18 shows the display format showing the relationship between the input and output of warning discrimination circuit 631.

Warning discrimination circuit 631 comprises two comparators 631 and 6312, and a look-up table (LUT) 6313. The light reception data Dg of the effective number of pixels are serially input from memory 630C to comparators 6311 and 6312 for each pixel. Comparator 6311 outputs a low luminance detection signal SL when the value of light reception data Dg expressing the maximum amount of received light of a target pixel is less than a threshold value thB which is the lower limit of permissible reception. On the other hand, comparator 5312 outputs an overflow warning signal S13 when the value of light reception data Dg exceeds an threshold value thA which is the upper limit of permissible reception. Look-up table LUT 6313 outputs distance image data D21, proximal warning signal S11, and distal warning signal S12 in accordance with the combination of values of the frame number FN, scale value sc, low luminance detection signal SL, and overflow warning signal S13.

The scale value sc expresses the position of the measurement reference surface within a measurable range stipulated by the width of the effective light reception area Ae, and is a value from 0 to 31. The default value of scale value sc is 16. In the main measurement, the measurable range is set to virtually center the position of the measurement reference surface. Frame number FN expresses the object position (i.e., strictly the position of a sampling point corresponding to a target pixel) within a measurable range. Basically, the distance image data D21 are grayscale converted data directly expressing the frame number FN. That is, the luminance Yr, Yg, and Tb of R, G, and B in the grayscale are 8×(FN−sc+16). In the present embodiment, specific pixels are intensified by the color display to facilitate visual recognition of measurement results.

As shown in FIG. 18, if the low luminance detection signal SL is active (ON), the display color of this pixel is black. That is, on the display screen, the pixels wherein the reflectivity of the object is extremely small and the pixels outside the measurable range are displayed in black. If the overflow warning signal S13 is ON, the pixel is displayed in red to alert a user that the time center Npeak cannot be accurately calculated. The pixels wherein the frame number FN and scale value sc are equal are displayed in cyan to aid recognition of the positional relationship between the measurement reference surface and the object. The image corresponding to the edge on the proximal side of the measurable range is displayed in green, and the image corresponding to the edge on the distal side is displayed in blue. A user can readily recognize whether or not a desired portion of an object is accurately measured by means of the aforesaid display.

3-4. Three-dimensional Position Measurement Sequence

The combined measurement sequences of the operations performed by the host 3 and three-dimensional camera 2 are described hereinafter. The number of effective pixels (sampling points) on imaging surface S2 of the image sensor 53 used for measurement is 244×256, i.e., 1-frame is 244× 256 pixels, and data of 2444 frames are obtained by sampling 244 times. Thus, the actual number of frames N is 244, and the number of pixels in the slit length direction on imaging surface S2 is 256.

A user determines the camera position and direction to set the angle of field while viewing a color image displayed on liquid crystal display 21. A zooming operation may be performed at this time if necessary. The three-dimensional camera 2 displays a color monitor image with exposure controlled by an electronic shutter function without aperture adjustment relative to color sensor 54. This arrangement increases as much as possible the amount of incident light reaching image sensor 53 by setting the aperture in an open state.

Figure 19:
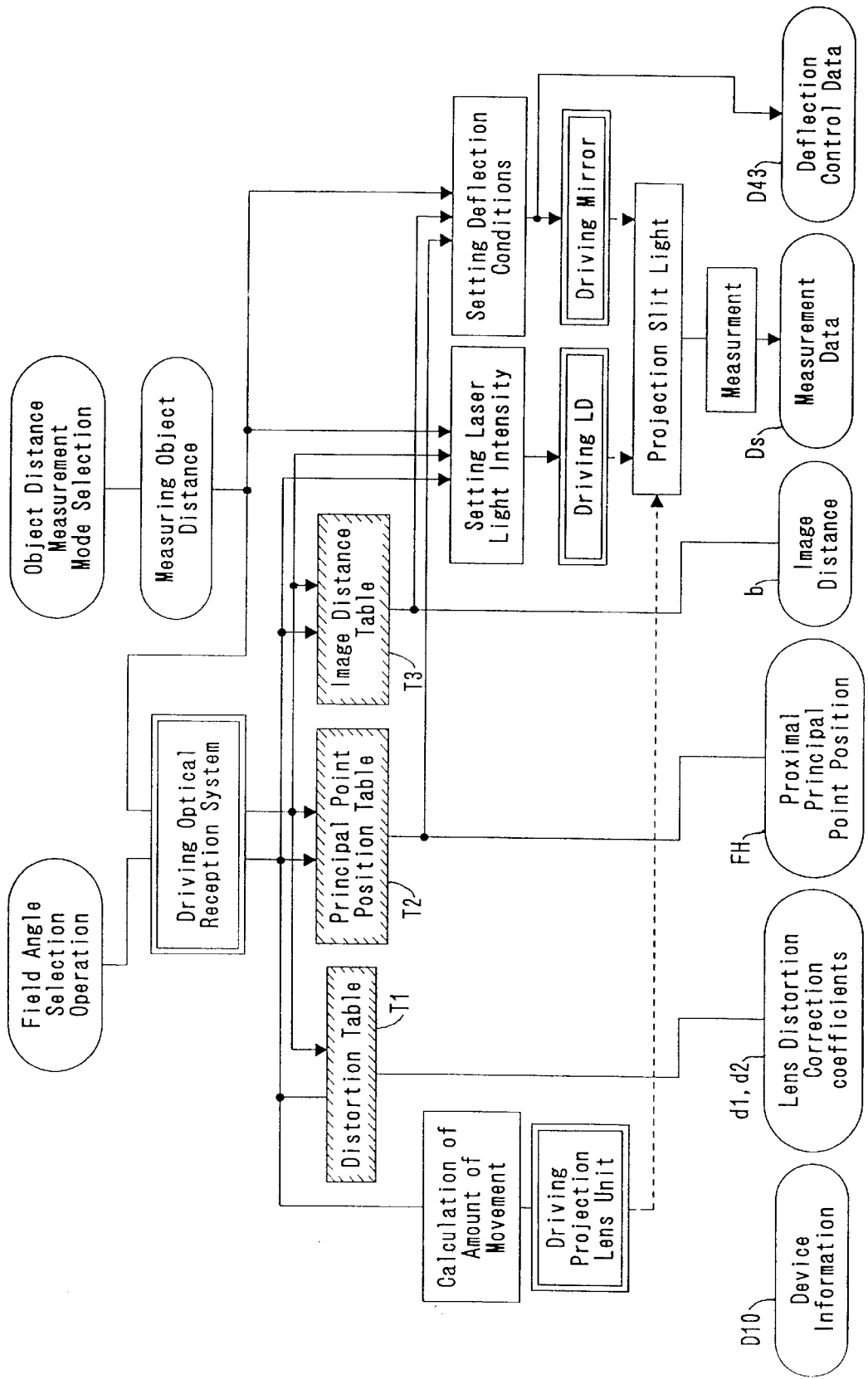
FIG. 19 shows the data flow in the three-dimensional camera.
Figure 20:
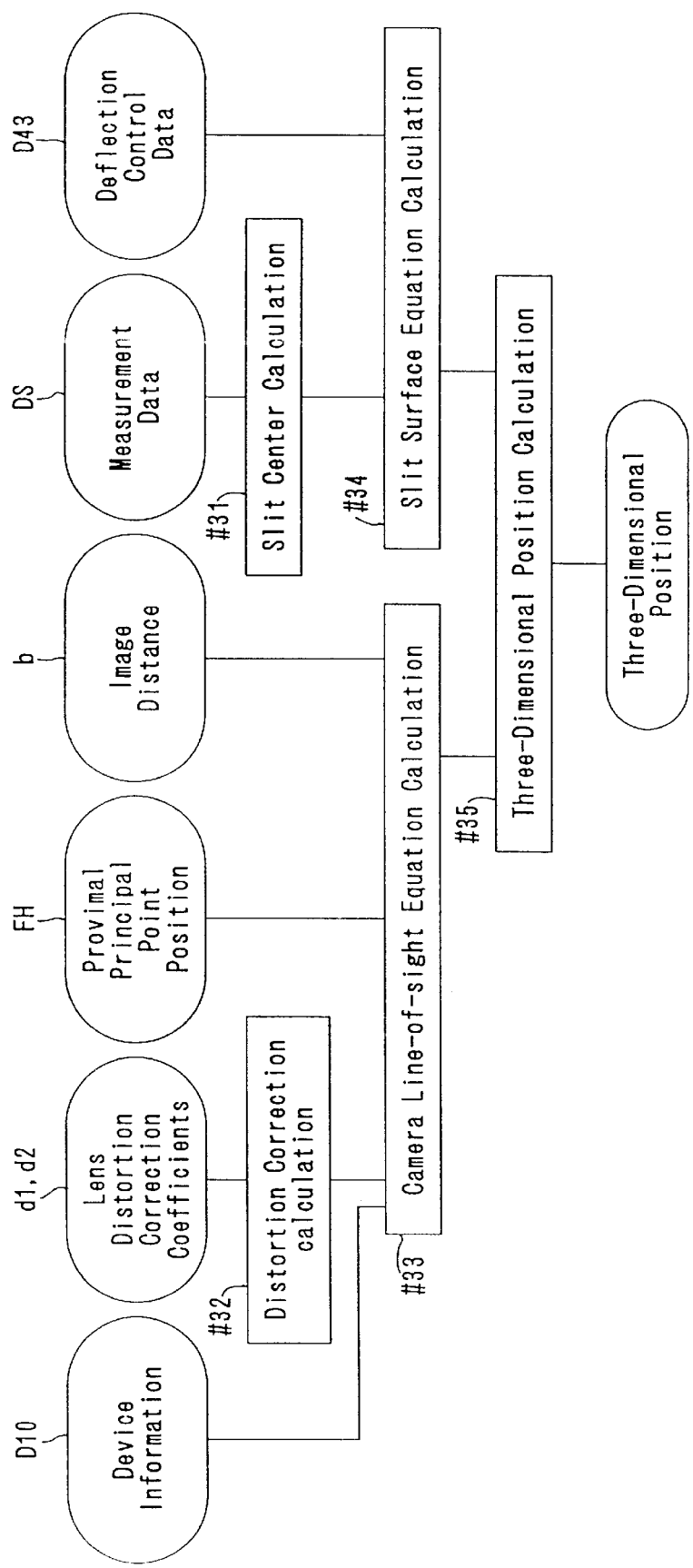
FIG. 20 shows the data flow in the host.
Figure 21:
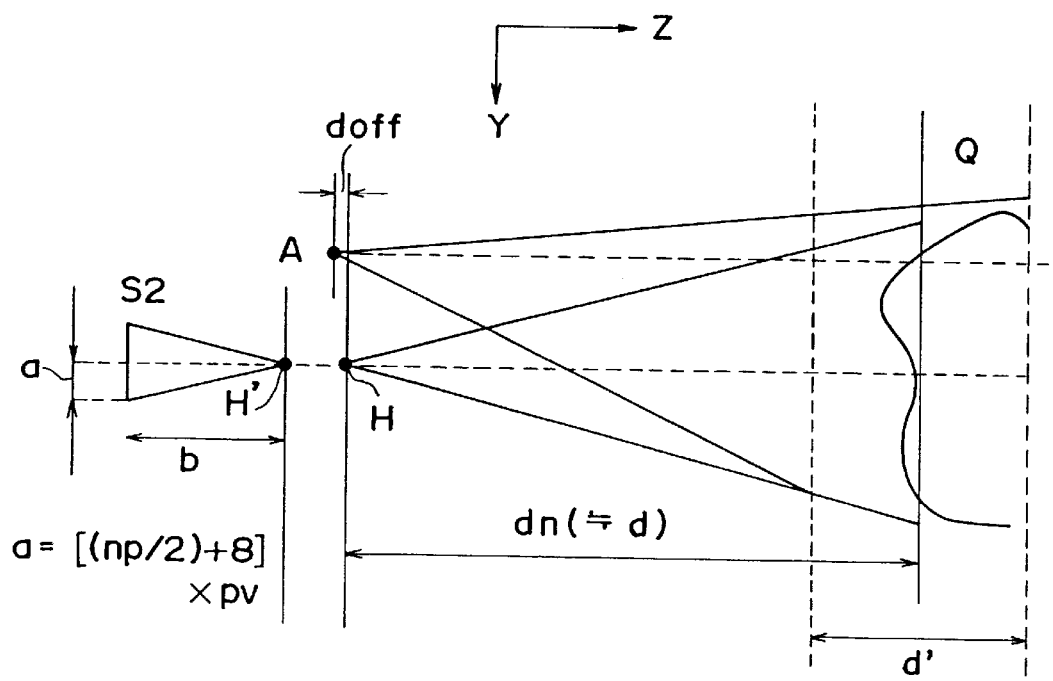
FIG. 21 shows the positional relationship between the object and each point of the optical system.

FIG. 19 shows the flow of data in three-dimensional camera 2. FIG. 20 shows the flow of data in host 3. FIG. 21 illustrates the positional relationship between the object Q and each point of the optical reception system 50.

Focusing is accomplished by moving focusing lens 512 in conjunction with the movement of variator lens 514 of zoom unit 51 in accordance with a field angle selection operation (zooming) initiated by a user activating zoom buttons 25a and 25b. The focusing process generally measures the approximate object distance d0. The amount of movement of variator lens 422 on the projection side is calculated via computation in conjunction with the driving of the lens of the optical reception system, and the movement of variator lens 422 is controlled based on said calculation. Lens control on the projection side produces a slit light U having a width of 5 pixels incident on the image sensor 53 regardless of the field angle or image sensing distance.

System controller 61 reads the encoder output (repeated amount Ed) of focusing drive system 59, and the encoder output (zoom value fp) of zooming drive system 60 via lens controller 58. An imaging parameter data corresponding to repeated amount Ed and zoom value fp are output to host 3 with reference to distortion table T1, principal point position table T2, and image distance table T3 within system controller 61. The imaging parameter data include distortion parameters (i.e., lens distortion correction coefficients d1 and d2), proximal principal point position FH, and image distance b. The proximal principal point position FH represents the distance between proximal side principal point H and proximal side end point F of zoom unit 51 (refer to FIG. 22c). Since the proximal side end point F is fixed, the proximal side principal point F can be specified by the proximal principal point position FH.

System controller 61 executed the preliminary measurement to accomplish environmental measurements affecting slit light U projected in a specific direction, determines the object distance d by a triangulation method based on imaging information obtained in said preliminary measurement, resets the repeat amount Ed and drives lenses, and sets the operation of the main measurement. Settings include the output (laser light intensity) of semiconductor laser 41, slit light U deflection conditions (i.e., projection start angle, projection end angle, angular speed of deflection) and the like.

In the preliminary measurement, the projection angle is set such that the reflected light is incident at the center of imaging surface S2, and the approximate object distance d0 assumes a flat surfaced object. The semiconductor laser 41 executes pulse emission and the amount of received light is measured, then the projection intensity is adjusted to attain a suitable amount of light reception. At this time, if a required amount of light reception is not obtained even with the projection intensity set at the upper limit permitted for the rating of the laser and human safety, the measurement is stopped, and both an audible alarm is sounded and warning message is displayed. In the calculation of object distance d, consideration is given to offset doff in the z direction of projection origin A and proximal principal point H of the optical reception system which is the measurement reference point. When calculating the deflection conditions, a measurable range d' equal to the d=center portion is maintained at the edge area in the scanning direction so as to overscan by a predetermined amount (e.g., 8 pixels). The projection start angle th1, projection end angle th2, and angular speed of deflection ω are expressed by Equations (1), (2), and (3) below.

$$th1 = \tan^{-1}\left[\frac{\beta \times pv\left(\frac{np}{2} + 8\right) + L}{d + doff}\right] \times \frac{180}{\pi} \quad (1)$$

$$th2 = \tan^{-1}\left[\frac{\beta \times pv\left(\frac{np}{2} + 8\right) + L}{d + doff}\right] \times \frac{180}{\pi} \quad (2)$$

$$\omega = \frac{th1 - th2}{np} \quad (3)$$

β: Imaging magnification (=d/effective focal length Freal)
pv: pixel pitch np: Number of effective pixels in Y direction of imaging surface S2

L: Baseline length

Thus, the main measurement is accomplished under the calculated conditions. Object Q is scanned, and measurement data Ds of 5 frames/pixel are generated by output process circuit 62. Then, the previously described distance image monitor display is accomplished. Three-dimensional camera 2 is provided with a preview function (described in detail later) to facilitate remeasurement. A user specifies remeasurement as necessary while viewing the monitor display. In remeasurement mode, when a user changes the measurement conditions, a theoretical distance image is generated in accordance with the new measurement conditions based on measurement data Ds of the previous measurement, and this theoretical image is displayed as a preview image. Since the preview image is displayed in real time in conjunction with the condition changing operation, a user can effectively accelerate optimization of the measurement conditions. When enters the end of the condition changes, remeasurement is executed, and new measurement data Ds are generated.

When a user presses the record button 28, the measurement data Ds are transmitted to host 3. At the same time, the device information D10 which includes the deflection conditions (deflection control data D43), specifications of image sensor 53 and the like are transmitted to host 3. Table 1 shows the main data transmitted to host 3 from three-dimensional camera 2.

When the reference position for calculating the object distance is set at the proximal distance (on three-dimensional camera 2 side) of the object and measurable range d' is set before and after said position, the proximal side (three-dimensional camera 2 side) of the measurable range often becomes unreasonable. Therefore, the shift amount may be set to pitchoff, and the measurable range d' may be shifted on the distal side so as to achieve a 25% proximal side and 75% distal side ratio.

When the effective light receiving area Ae is 32 pixels wide as in the present embodiment (i.e., when the CCD area sensor has a reading width of 32 pixels), the aforesaid measurable range ratio can be set by setting the shift amount pitchoff at [8]. The measurable range d" after shifting is the range shown in FIG. 22c.

As shown in FIG. 20, host 3 executes the slit center calculation, distortion correction calculation, camera line-of-sight equation calculation, slit surface equation calculation, and three-dimensional position calculation, so as to calculate the three-dimensional position (X, Y, Z coordinates) of 244×256 sampling points. The sampling points are the intersections of the camera line-of-sight (line connecting the sampling point and proximal principal point H) and the slit surface (sampling point illuminated on the optical axis plane of the slit light U).

The time center Npeak (refer to FIGS. 4a and 4b) of slit light U is obtained by Equations (4) and (4') using light reception data Dg(i) of each sampling time.

TABLE 1

|  | Data Content | Data Range |  |
| --- | --- | --- | --- |
| Measurement data | Bank F (Frame No.) | 244 × 256 × 8 bit | 0–255 |
|  | Bank A (n + 2) | 244 × 256 × 8 bit | 0–255 |
|  | Bank B (n + 1) | 244 × 256 × 8 bits | 0–255 |
|  | Bank C (n) | 244 × 256 × 8 bits | 0–255 |
|  | Bank D (n − 1) | 244 × 256 × 8 bits | 0–255 |
|  | Bank E (n − 2) | 244 × 256 × 8 bits | 0–255 |
| Imaging conditions | Image distance b |  | 0.000–200.000 |
|  | Proximal principal point position FH |  | 0.00–300.00 |
|  | Projection start angle th1 |  |  |
|  | Angular speed of deflection |  |  |
| Device Information | Measurement pixel No. (No. samples in X, Y directions) |  | 1– |
|  | Sensor pixel pitch pu, pv |  | −0.00516– |
|  | Projection posture (around X, Y, Z axes) |  | 0.00 −± 90.00 |
|  | Projection posture (X, Y, Z axes directions) |  | 0.00 −± 300.00 |
|  | Lens distortion correction coefficients d1, d2 |  |  |
|  | Sensor center pixel u0, v0 |  | 0.00–256.00 |
| Two-dimensional image | R plane 512 × 512 × 8-bits |  | 0–255 |
|  | G plane 512 × 512 × 8-bits |  | 0–255 |
|  | B plane 512 × 512 × 8-bits |  | 0–255 |

When setting the projection start angle th1 and projection end angle th2, the measurable distance range can be shifted on the optical axis if Eq. (1') and (2') below are substituted for Eq. (1) and (2).

$$th1 = \tan^{-1}\left[\frac{\beta \times pv\left(\frac{np}{2} + 8 + pitchoff\right) + L}{d + doff}\right] \times \frac{180}{\pi} \quad (1')$$

$$th2 = \tan^{-1}\left[\frac{\beta \times pv\left(\frac{np}{2} + 8 + pitchoff\right) + L}{d + doff}\right] \times \frac{180}{\pi} \quad (2')$$

pitchoff: amount of shift of measurable distance range $$Npeak = n + \Delta n \quad (4)$$

$$\Delta n = \frac{-2 \times Dg(n-2) - Dg(n-1) + Dg(n+1) + 2 \times Dg(n+2)}{\sum Dg(i)}$$

$$(i = n - 2, n - 1, n, n + 1, n + 2)$$

and $$\Delta n = \frac{-2 \times [Dg(n-2) - minDg(i)] - [Dg(n-1) - minDg(i)] + [Dg(n+1) - minDg(i)] + 2 \times [Dg(n+2) - minDg(i)]}{\sum Dg(i)} \quad (4')$$

The influence of environmental light can be slightly reduced by subtracting the minimum data minDg(i) among the five light reception data to determine the weighted mean.

The camera line-of-sight equations are Equations (5) and (6) below.

$$(u - u0) = (xp) = \frac{b}{pu} \times \frac{X}{Z - FH} \tag{5}$$

$$(v - v0) = (yp) = \frac{b}{pv} \times \frac{Y}{Z - FH} \tag{6}$$

b: image distance
F: proximal principal point position
pu: pixel pitch in a horizontal direction on the imaging surface
pv: pixel pitch perpendicular to the imaging surface
u: pixel position in a horizontal direction on the imaging surface
U0: center pixel position in the horizontal direction on the imaging surface
v: pixel position in a perpendicular direction on the imaging surface
v0: center pixel position in a perpendicular direction on the imaging surface The slit plane equation is expressed by Equation 7 below.

$$\begin{bmatrix} \cos(the3) & -\sin(the3) & 0 \\ \sin(the3) & \cos(the3) & 0 \\ 0 & 0 & 1 \end{bmatrix} \begin{bmatrix} \cos(the2) & 0 & \sin(the2) \\ 0 & 1 & 0 \\ -\sin(the2) & 0 & \cos(the2) \end{bmatrix}$$
$$\begin{bmatrix} 1 & 0 & 0 \\ 0 & \cos(the1 + the4Cnop) & -\sin(the1 + the4Cnop) \\ 0 & \sin(the1 + the4Cnop) & \cos(the1 + the4Cnop) \end{bmatrix} \begin{bmatrix} 0 \\ 1 \\ 0 \end{bmatrix} [XY - LZ - s] = 0 \tag{7}$$

Geometric distortion is dependent on the field angle. Distortion in an object centered on the center pixel. Accordingly, the amount of distortion is expressed by as a function of the distance from the center pixel. The distance approaches a cubic function. The two-dimensional correction coefficient is designated d1, and the three-dimensional correction coefficient is designated d2. The corrected pixel positions u' and v' are expressed by Equations (8) and (9) below.

$$u' = u + d1 \times t2^2 \times \frac{u - u0}{t2} + d2 \times t2^3 \times \frac{u - u0}{t2} \tag{8}$$

$$v' = v + d1 \times t2^2 \times \frac{v - v0}{t2} + d2 \times t2^3 \times \frac{v - v0}{t2} \tag{9}$$

$$t2 = (t1)^{-1}$$
$$t1 = (u - u0)^2 + (v - v0)^2$$

The three-dimensional position can be determined with consideration given to the effects of distortion by substituting u' for u and v' for v in Equations (5) and (6). Calibration has been fully described by Onodera and Kaneya in "Geometric correction of images without camera positioning," Research Committee Publication PRU91-113, The Institute of Electronics, Information and Communication Engineers, and Ueshiba, Yoshimi, Oshima et al. in "High precision calibration method for rangefinders based on three-dimensional models in optical systems," Journal of The Institute of Electronics, Information and Communication Engineers, D-II, Vol.J74-D-II, No. 9, pp. 1227–1235, September, 1991.

3-5. Preliminary Measurement of Three-dimensional Position

The auto setting function of the three-dimensional camera 2 is described below.

Three-dimensional camera 2 sets the main measurement conditions (i.e., projection angle range and laser intensity) based on the results of the preliminary measurement. Unlike the main measurement, in the preliminary measurement the slit light U is projected only unidirectionally without deflecting slit light U. The projection direction is selected in accordance with the zooming condition, and the output of a passive type distance sensor provided separately. Projection is accomplished intermittently a total of three times within a short period, and the laser intensity (projection light intensity) is decreased from a higher value to a lower value for each projection. That is, measurements are conducted using three types of slit light U of intensities A, B, and C wherein A>B>C. The imaging information obtained by image sensor 53 during projections of slit light U at each intensity A, B, and C are temporarily stored in memory 630A, and subsequently used for predetermined calculations. The reading of imaging information (light reception data Dg) from memory 630A is accomplished for only a part of the imaging surface S2 rather than the entirety of said imaging surface S2. In the present embodiment, the time required for the preliminary measurement can be shortened by limiting the projection direction and reading range of imaging information, and reliability can be increased by projecting three types of slit light U of different intensities.

Figure 23:
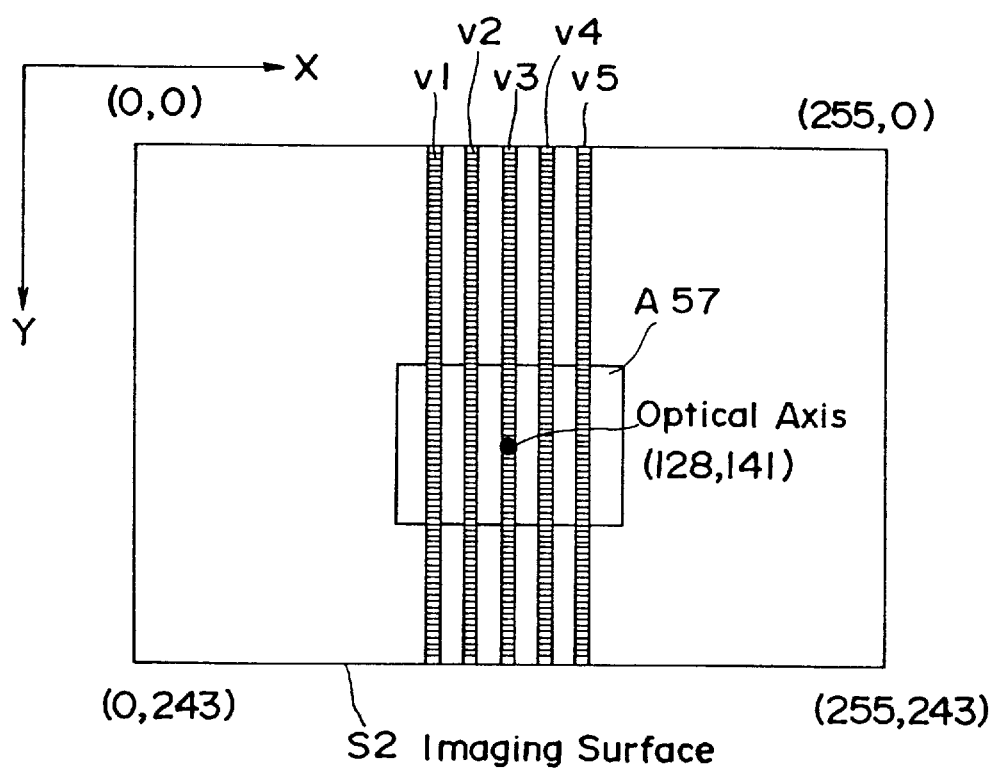
FIG. 23 shows the sampling range during preliminary measurement.

FIG. 23 shows the sampling range during the preliminary measurement.

In the preliminary measurement, the five lines v1 through v5 are targeted for sampling from among the 244×256 individual pixels comprising the imaging surface S2 of image sensor 53. Each line v1 through v5 is a row of pixels from one end to the other end in the Y direction (deflection direction of slit light U), and arrayed at equal spacing near the center in the X direction. The coordinate (pixel number) in the X direction of each line v1 through v5 is sequentially 110, 120, 128, 140, and 150, and are selected values within the measurement area A57 of AF sensor 57. Generally, the three-dimensional camera is positioned directly in front of a measurement object during the measurement operation, such that the near center of imaging surface S2 is suitable as a sampling point when obtaining effective information using the fewest number of sampling point possible.

Figure 24A:
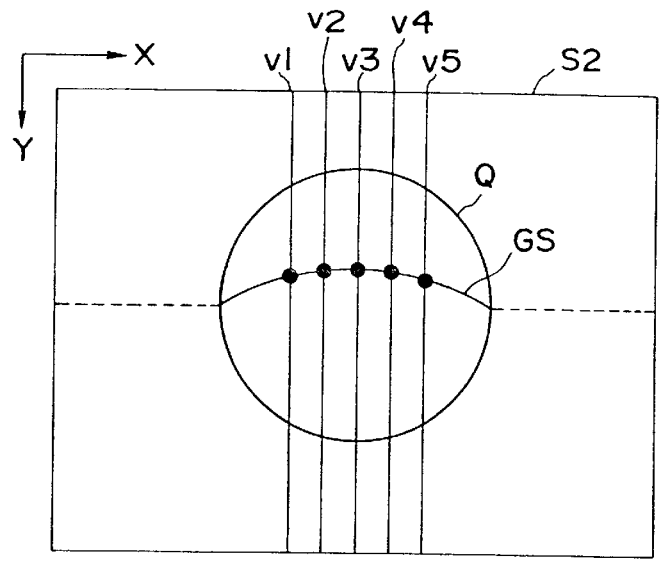
FIGS. 24a and 24b show the relationship between the slit image and the sampling point.
Figure 24B:
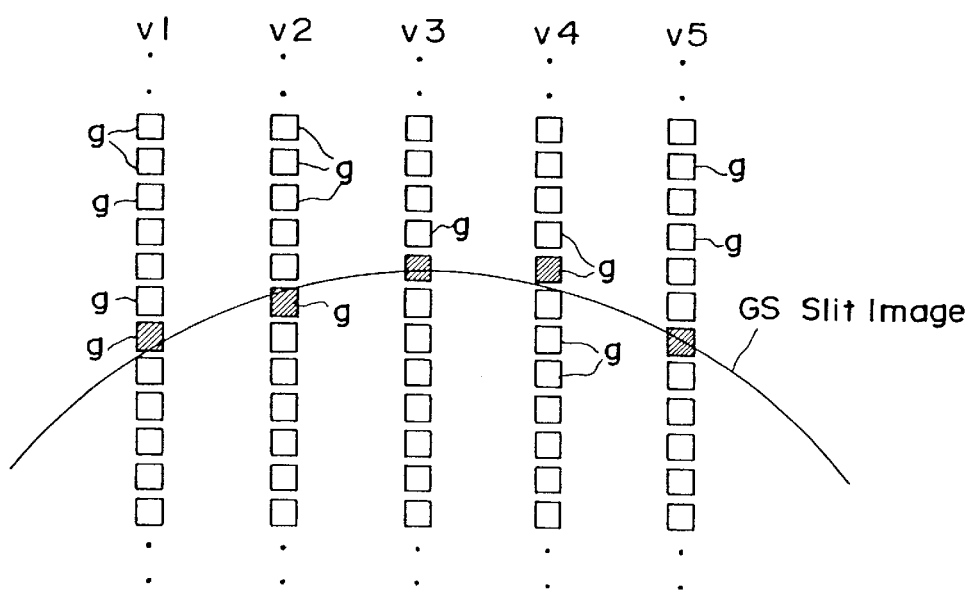

FIGS. 24a and 24b illustrate the relationship between slit images GS and sampling points.

When the object Q is spherical, for example, a curved slit image GS is imaged. During the initial projection of the preliminary measurement, the data of all pixels of lines V1 through v5 are read from memory 630A, and the coordinate (slit image position) in the Y direction corresponding to slit image GS is detected. The black circles in FIG. 24a represent the slit image position. In contrast, during the second and third projections, only data of three pixels g comprising the slit image pixel and pixels on bilateral sides thereof are read from memory 630A relative to lines v1 through v5 to save time because the slit image position has been previously detected. The pixels g which are shaded in FIG. 24b correspond to the silt image position.

FIG. 25 shows the data content of preliminary measurement table T5.

Preliminary measurement table T5 is provided in RAM (not shown in the drawing) built in system controller 61. The light reception data Dg from the projection of slit light U at each intensity A through C and predetermined data (e.g., slit image position and the like) obtained based on said data Dg are stored for each line v1 through v5 as preliminary measurement data.

Figure 26A:
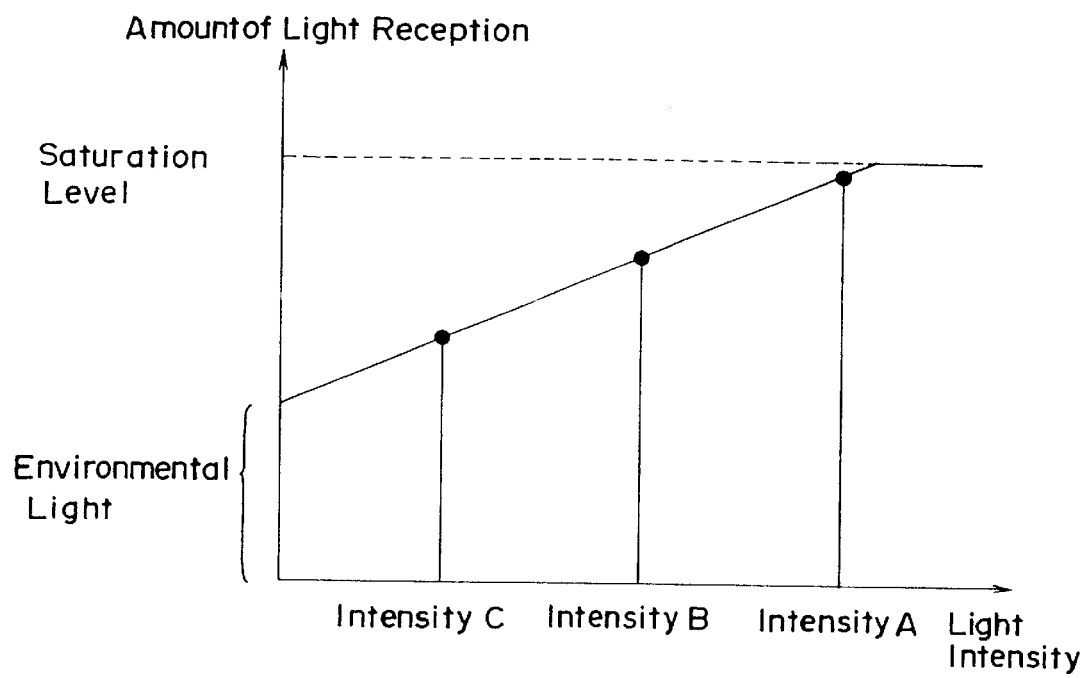
FIGS. 26a and 26b are graphs showing typical examples of the relationship between the projection light intensity and the amount of received light.
Figure 26B:
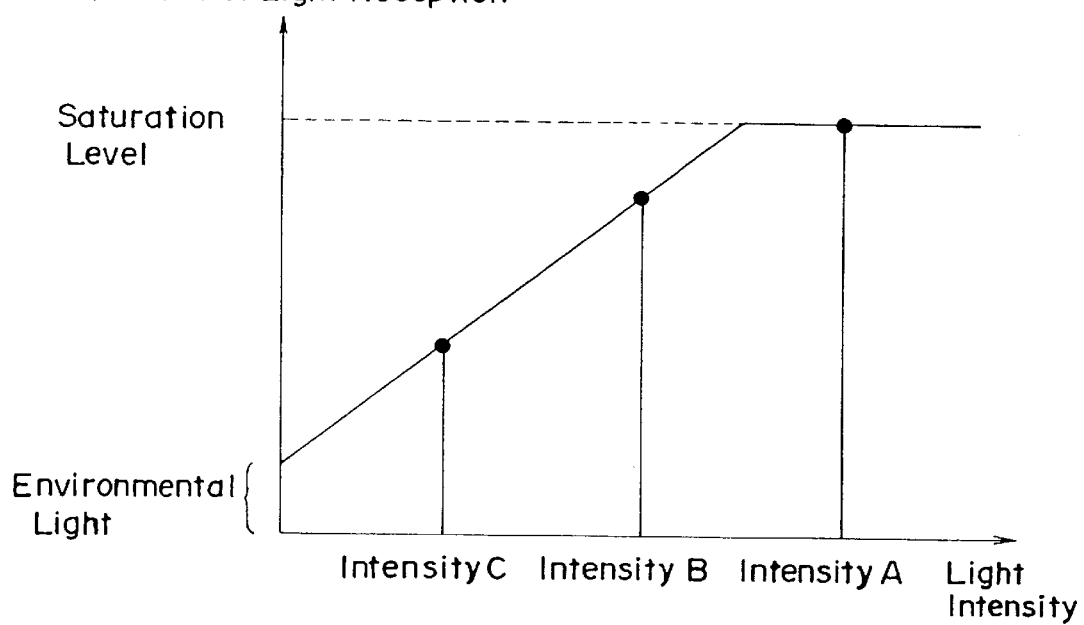

FIGS. 26a and 26b are graphs showing typical examples of the relationship between projection light intensity and the amount of light reception.

In the example of FIG. 26a, the light reception level at intensities A through C are lower than a saturation level (i.e., the upper limit of the dynamic range of light reception).

If the light reception level is within the nonsaturated range and there is no influence from environmental light or signal noise, a proportional relationship exists between the intensities A through C and reception data Dg. Accordingly, the light reception level at the optional projection intensities can be estimated from the reception data Dg of the various intensities A through C. In other words, the projection intensity obtained from the optimum light reception level can be determined by calculation. When the magnitude relationship of intensities A through C do not match the magnitude relationship of light reception data Dg, there is a problem with reliability of light reception data Dg. The results of suitability discrimination of lines v1 through v5 are stored in the previously mentioned preliminary measurement table T5.

System controller 61 determines the object distance via a triangulation method based on the slit image position of lines selected by the criteria described later from among the five lines v1 through v5, and sets the lens position conditions for the main measurement. Thus, the measurement range is determined. Thereafter, system controller 61 optimizes the projection light intensity of the main measurement based on preliminary measurement data of lines within the measurable range among the five lines v1 through v5.

Figure 22A:
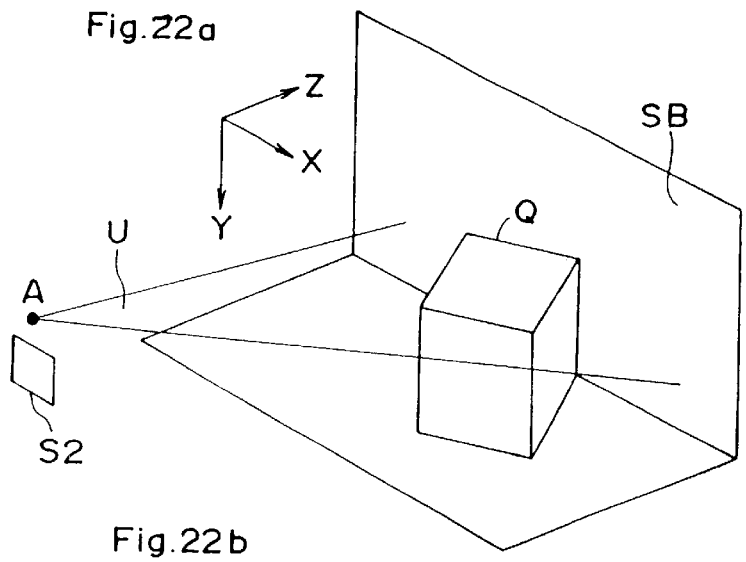
FIGS. 22a, 22b, and 22c illustrate the sequence of optimizing the projection light intensity.
Figure 22B:
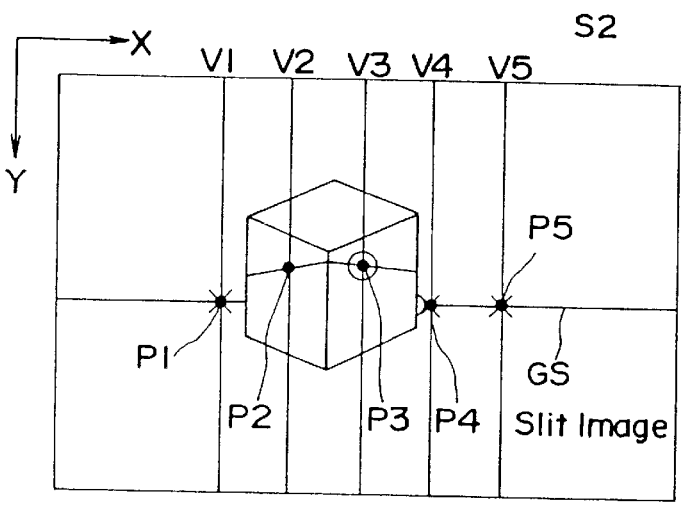
Figure 22C:
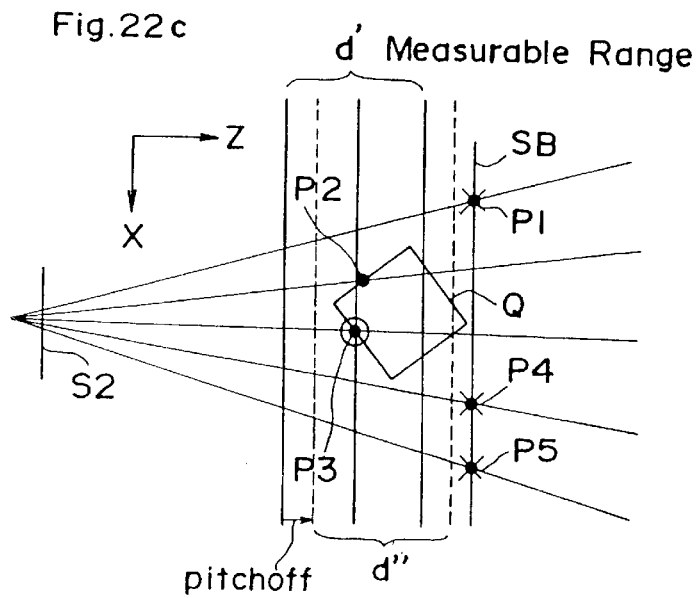
Figure 27:
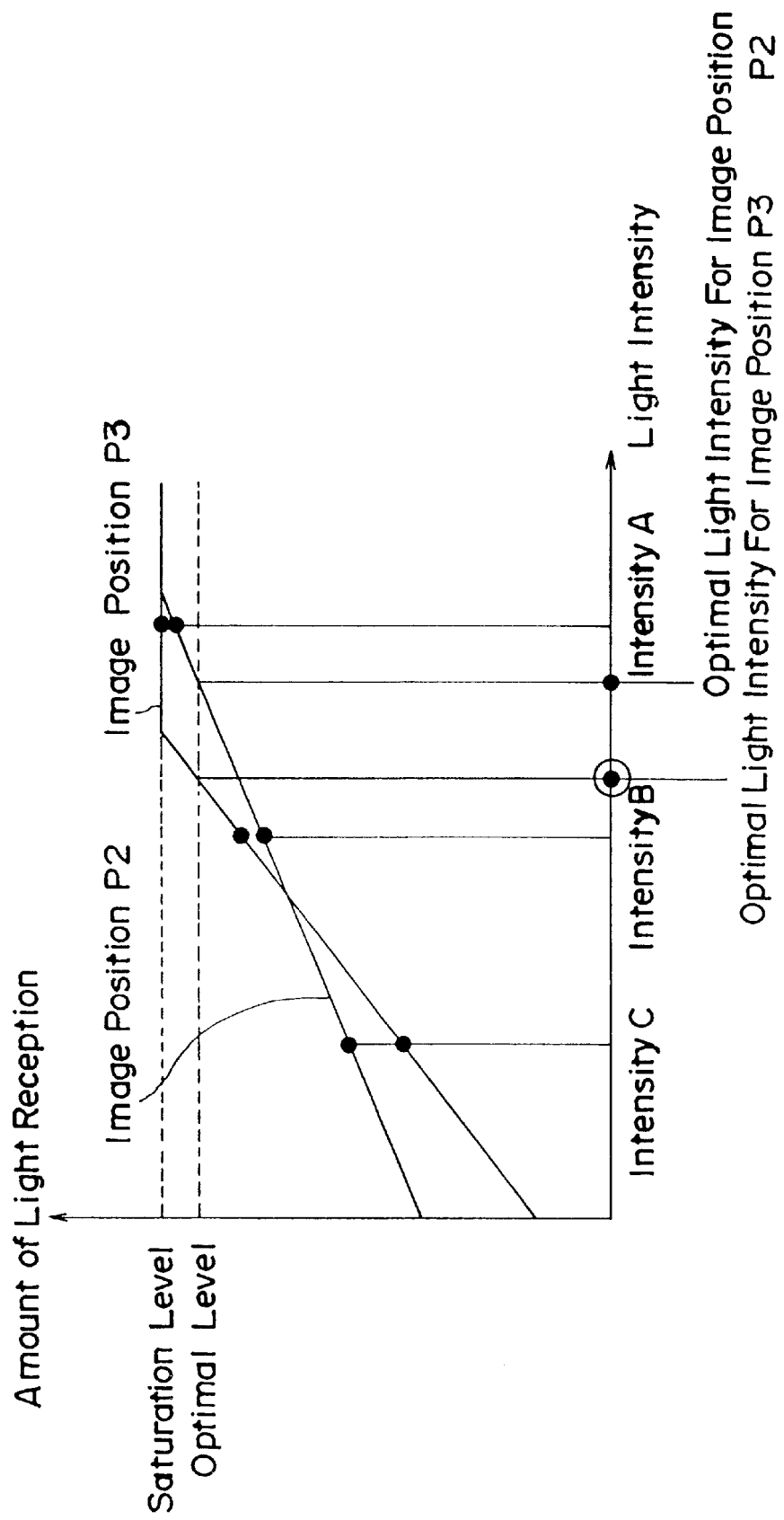
FIG. 27 is a graph showing the optimum intensities relative to FIGS. 26a and 26b.

FIGS. 22a, 22b, and 22c illustrate the sequence of optimization of projection light intensity. FIG. 27 is a graph showing the optimized intensity corresponding to FIG. 22.

In FIG. 22a, a cube-like object Q is disposed on the front side of background surface SB. FIG. 22b shows slit image GS when slit light U is projected toward object Q. The slit image positions of lines v1 through v5 on imaging surface S2 are designated P1 through P5. FIG. 22c is a plan view showing the positional relationship between object Q and each slit image position P1 through P5. As shown in FIGS. 22b and 22c, slit image positions P2 and P3 correspond to the object Q, whereas the other three slit image positions P1, P4, and P5 correspond to the background surface SB.

Slit image position P3 is designated the reference position (focus point position) for calculation of the object distance. The black dot circumscribed by a circle indicates the reference position. The measurable range d' is determined by selection of the reference position. As shown in FIG. 22c, slit image positions P2 and P3 are inside of measurable range d', whereas the other three slit image positions P1, P4, and P5 are outside of measurable range d', and are not be image during the main measurement. The X marks in the drawings indicate positions outside the object in the main measurement. The projection light intensity of the main measurement is set based on preliminary measurement data of lines v2 and v3 which include slit image positions P2 and P3 corresponding to the imaging subject during the main measurement.

As shown in FIG. 27, the optimum level projection light intensity is determined for each slit image position P2 and P3 from actual measurement values of the amount of light reception of lines v2 and v3 at each intensity A through C. The smallest value among the two obtained projection light intensities is used as the set value of the main measurement. If there are three or more slit image positions within the measurable range d', the minimum value among the determined optimum projection light intensities is used. The use of the minimum value avoids reception light saturation.

3-6. Preview Function in Measurement of a Three-dimensional Position

Figure 28:
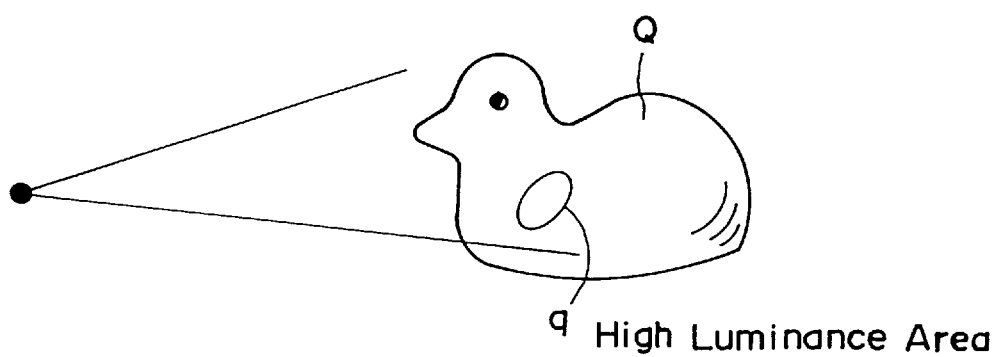
FIG. 28 shows a measurement example illustrating the preview function.
Figure 29A:
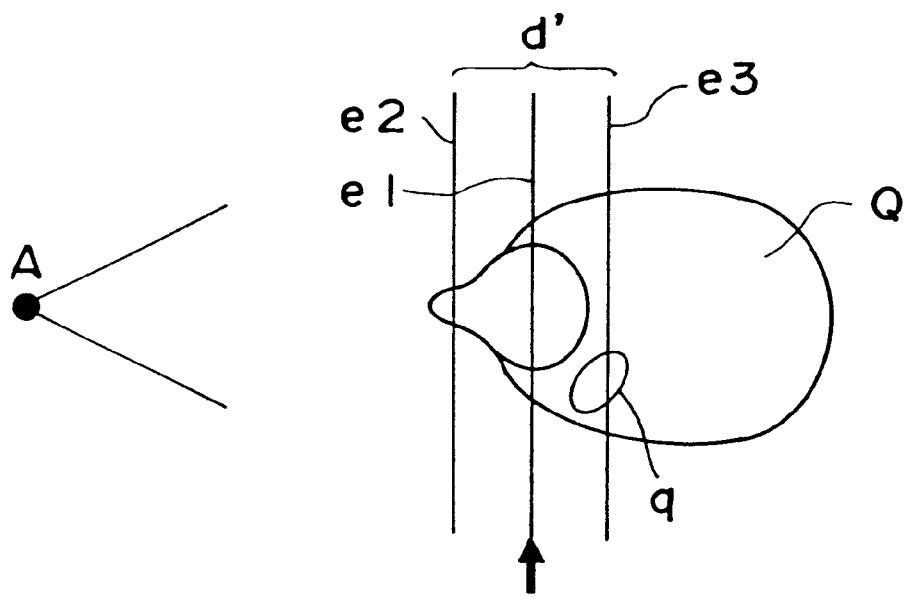
FIGS. 29a and 29b show modifications of the measurement conditions.
Figure 29B:
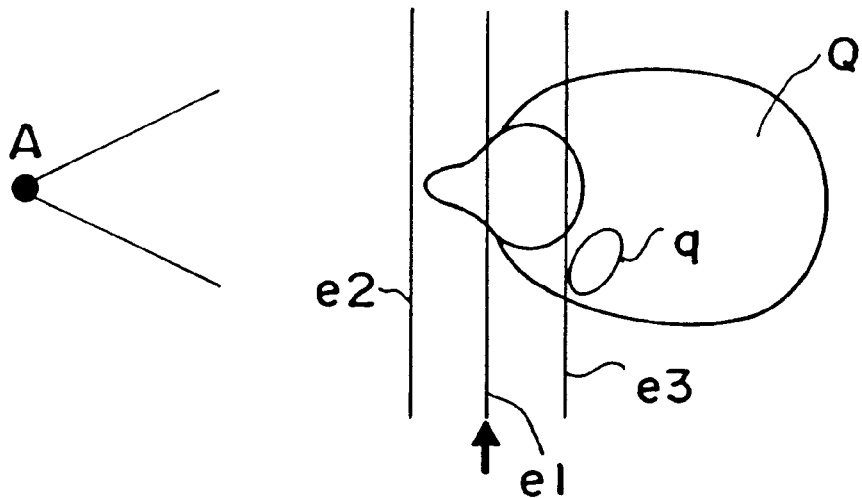
Figure 30A:
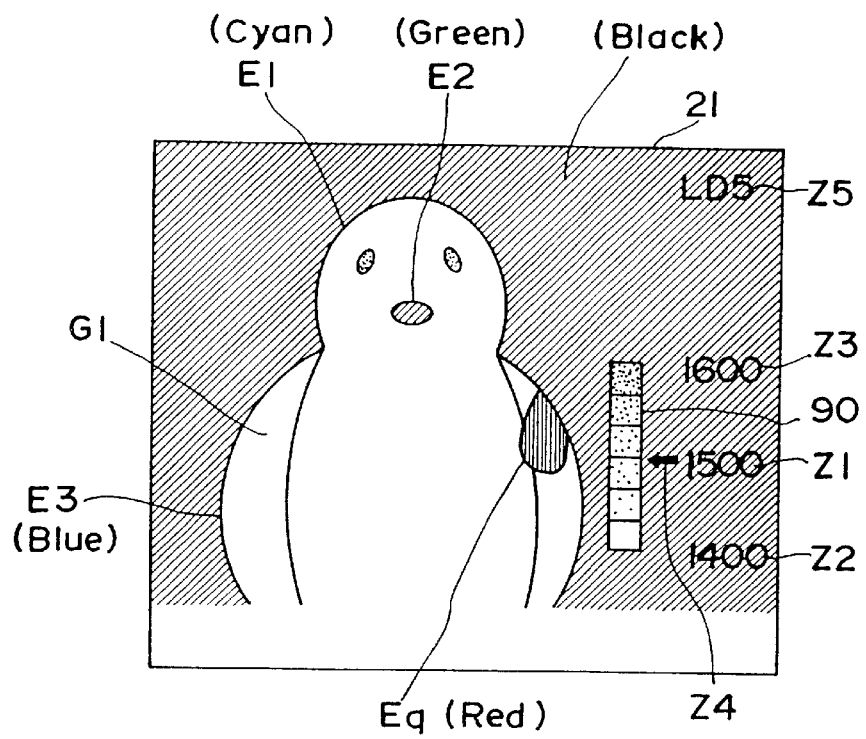
FIGS. 30a and 30b show contents of the monitor display relative to FIGS. 29a and 29b.
Figure 30B:
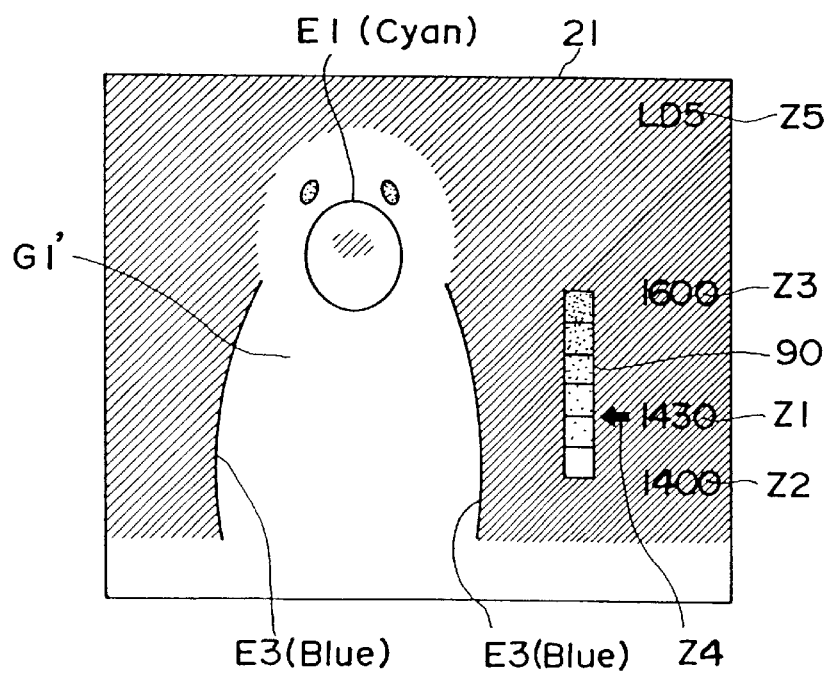

FIG. 28 shows a measurement example illustrating the preview function. FIGS. 29a and 29b show examples of modified measurement conditions. FIGS. 30a and 30b show the contents of the monitor display corresponding to FIGS. 29a and 29b, respectively.

A Figurine of a bird is used as object Q used as a measurement subject, and measurement was conducted from the apparent frontal surface corresponding to the face of the bird. As shown in FIG. 28, a high luminance area q exists on the front torso of the bird. FIG. 29a shows the set condition of measurable range d' during initial measurement, and FIG. 29b shows the set condition of measurable range d' during remeasurement. FIG. 30a corresponds to FIG. 29a, and FIG. 30b corresponds to FIG. 29b.

At the stage at which the initial measurement ends, the screen of liquid crystal display 21 displays the distance image G1, scale bar 90, numerical value z1 expressing the object distance (units: mm) of measurement reference position e1, numerical values z2 and z3 expressing the object distance at both edges e2 and e3 of the measurable range d', arrow z4 indicating the display luminance corresponding to measurement reference position e1 on scale bar 90, and numerical value z5 expressing the set value of projection light intensity. In practice, the shaded regions in FIGS. 30a and 30b are displayed in black, and the whiteout areas are displayed in achromatic colors of densities (brightness) corresponding to measurement values illustrated in FIG. 18. Normally, the entirety of the whiteout areas have the same densities.

In FIG. 29a, the measurement reference position e1 is set near the center of the head of the bird, and the tip of the beak protrudes from the proximal side of measurable range d'. In distance image G1 of FIG. 30a, the green area (continuous or intermittent linear pixel groups) E2 corresponding to the proximal side edge e2 of measurable range d' is discriminated. Furthermore, distance image G1 includes blue area E3 corresponding to the distal edge e3, and red area Eq corresponding to the high luminance area q.

A user shifts the measurable range d' further forward on the proximal side. This operation may be accomplished by pressing the down cursor button 22 (refer to FIG. 2b) a required number of times. Each time cursor button 22 is pressed, the arrow mark 24 moves downward on the display screen, and numerical value z1 is updated. The monitor image can be rewritten in real time in conjunction with this condition modification operation. In the state of FIG. 29b, the entire beak is put within the measurable range d'. The absence of the green area representing a proximity warning in the preview image G1 of FIG. 30b is thus recognized. Since preview image G1 is generated based on the previous measurement data Dg, the missing beak in distance image G1 is not actually measured, and that area in preview image G1' is displayed in black. Furthermore, the areas outside the new measurable range are displayed in black in accordance with the modification of the measurable range d'.

4. Control Flow Chart of the Measurement Operation of the Three-dimensional Camera

4-1. Main Control Flow

Figure 31:
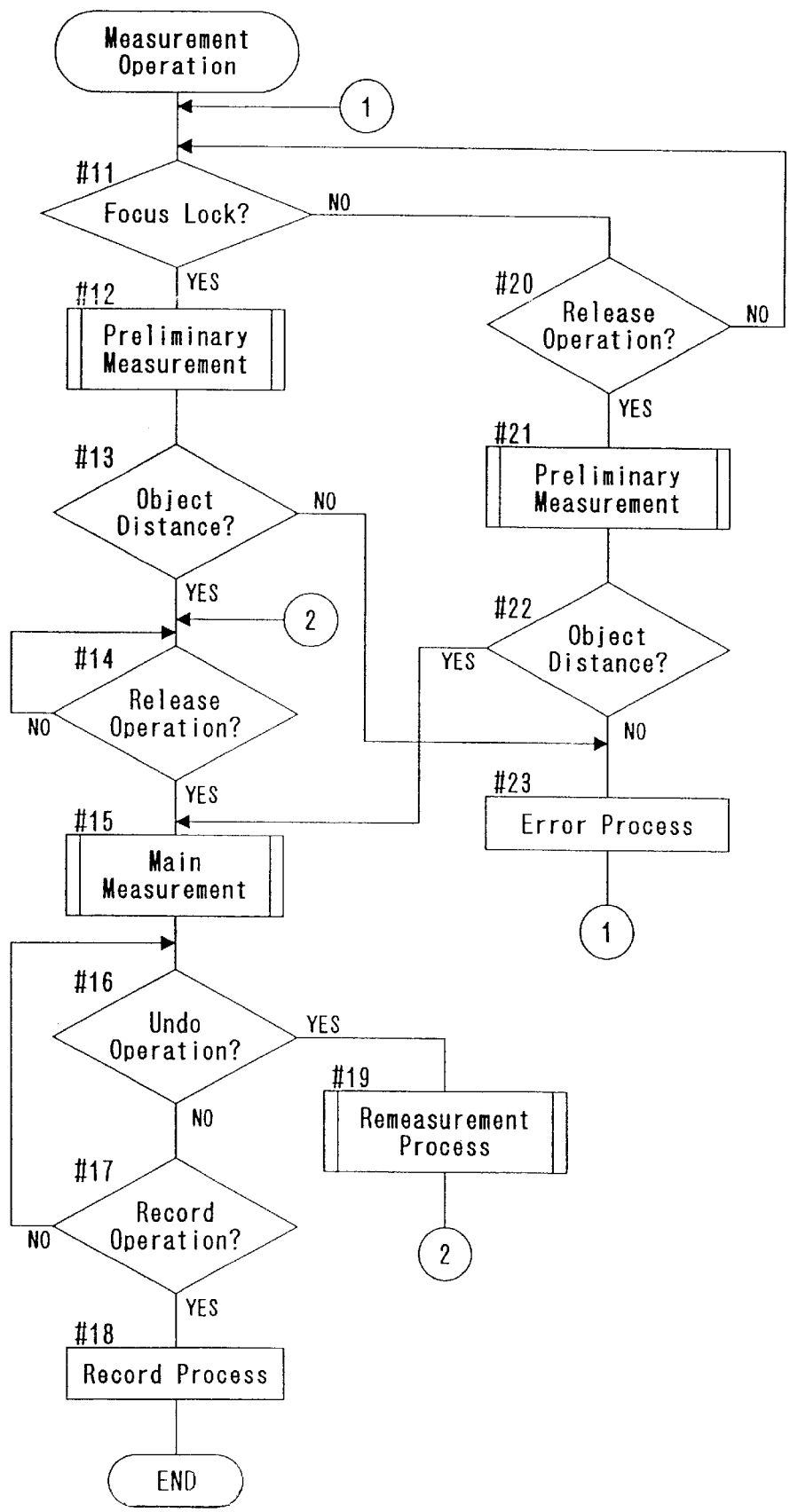
FIG. 31 is a main flow chart showing the sequence of controls executed by the system controller.

FIG. 31 is a flow chart of the control sequence of the measurement operation of the three-dimensional camera 2.

An active type "preliminary measurement" is executed in conjunction with the focus locking operation of record button 28 (#11 and #12). When the measured object distance d is outside the imaging distance range determined by specifications, an error process is executed (#13, #23). In the error process, a predetermined message is displayed on liquid crystal display 21, and a buzzer 75 is sounded. If the object distance d is within the measurable range, subsequently, an image sensing process is executed to obtain measurement data Ds in conjunction with a release operation of release button 27 process (#14, #15). On the other hand, a preliminary measurement is accomplished to determine the suitability of object distance d even when the release operation is executed without a focus locking operation (#20 to #22). If the object distance and amount of light reception are suitable, the routine continues to the "main measurement," whereas the error process is executed if the object distance and light reception are unsuitable (#15, #23).

When an undo operation is executed by undo button 29 after the image sensing is completed, the "remeasurement process" is executed (#16, #19). When the record operation is executed by record button 28, a record process is executed to output measurement data Ds to host 3 or recording medium 4 (#17, #18). The display of FIG. 30a is displayed in the image sensing routine (#15), an operator verifies areas which cannot be measured, and can selectively use these measurement results or

4-2. Preliminary Measurement Process

The specific sequences of the "preliminary measurement" of steps #12 and #21 of the flow chart in FIG. 30 are fully described hereinafter with reference to the flow chart.

Figure 32:
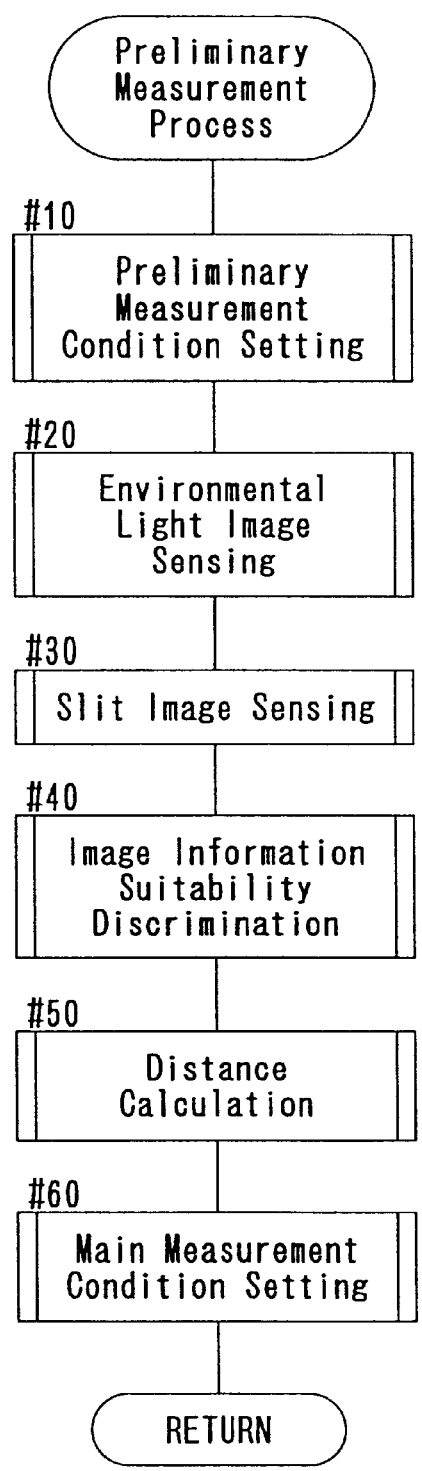
FIG. 32 is a flow chart showing a subroutine of preliminary measurement of FIG. 31.

FIG. 32 is a flow chart of the "preliminary measurement" executed by system controller 61.

System controller 61 sequentially executes various processes including the "preliminary measurement condition setting" process which determines the projection direction of slit light U (#10), "environmental light image sensing" process to obtain environmental information when slit light U is projected at three intensities A, B, and C (#30), "Imaging information suitability discrimination" process which increases preliminary measurement reliability (#40), "distance calculation" process to determine the object distance (#50), and "main measurement condition setting" process to set the main measurement operations conditions in accordance with the result of preliminary measurement (#60).

Figure 33:
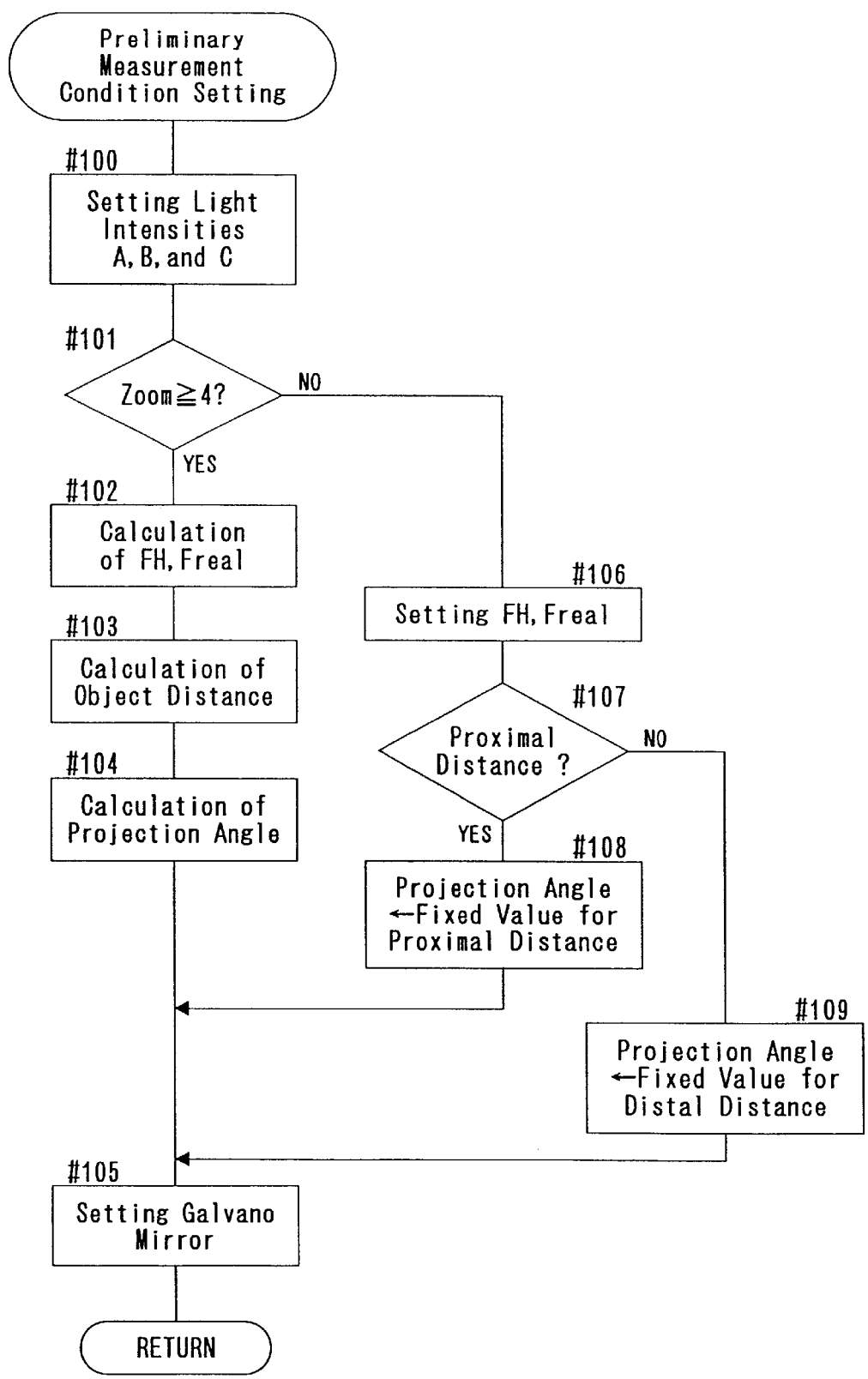
FIG. 33 is a flow chart showing a subroutine of setting the conditions for preliminary measurement of FIG. 32.

FIG. 33 is a flow chart of the "preliminary measurement conditions setting" process of step #10 of the flow chart of FIG. 32.

First, the values are set for the three projection light intensities A, B, and C in accordance with the zoom value at that time (#100). The number of zoom levels is, for example, 19, and specified by the zoom value fp. The effective measurement results can be readily obtained by varying the intensities A, B, and C.

Then, the zoom state is checked (#100). When the zoom level is 4 or higher, the measurement results can be used because the passive type measurement of AF sensor 57 has relatively high precision. Therefore, proximal principal point position FH, effective focal length Freal, and object distance d0 are calculated from feed-out amount Ed and the zoom level (#102, #103), and thereafter the projection angle is calculated so that the slit light U is incident at the intersection of the object surface and the light reception axis (#104). Then, the galvano mirror 43 is set at a rotation angle position corresponding to the calculated projection angle (#150).

On the other hand, since passive type measurement accuracy is low and the field of the reception system is broad in the wide telephoto state, slit light U reflected by an object can be received if the projection direction is switched between distal and proximal. After fixed value are set as the proximal principal point position FH and effective focal length Freal in accordance with the zoom level, the predetermined angle corresponding to the feed-out Ed is set as the projection angle (#106 to #109). Then, the galvano mirror 43 is set at the rotation angle position corresponding to the projection angle identical to the telephoto state (#105).

Figure 34:
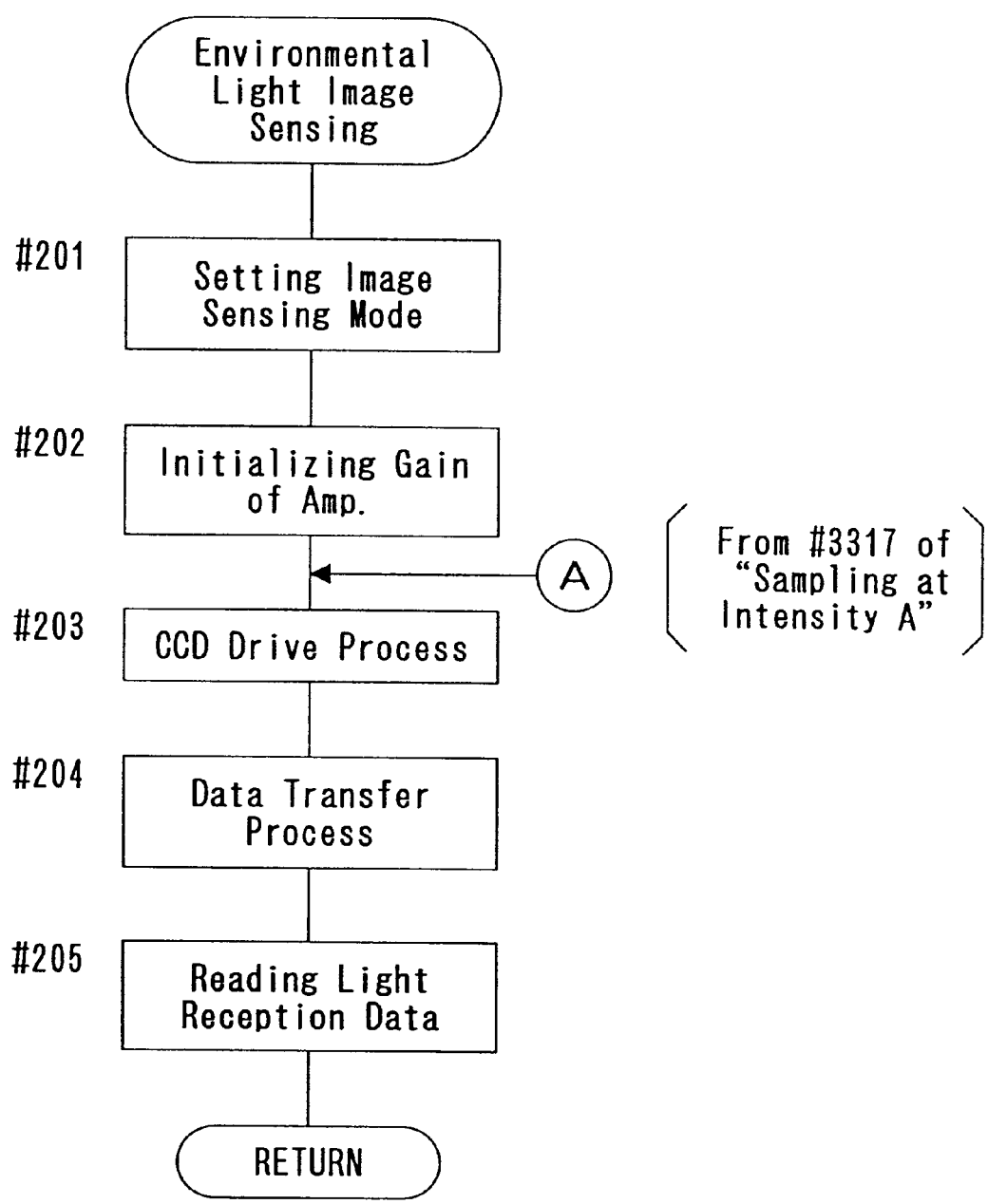
FIG. 34 is a flow chart showing a subroutine of environmental light image sensing of FIG. 32.

FIG. 34 is a flow chart of the "environmental light image sensing" of step #20 of FIG. 32.

The image sensing mode is set to the mode for preliminary measurement (#201). That is, regarding image sensor 53, the mode is set to read photoelectric conversion signals of all pixels of imaging surface S2, and input is selected for multiplexor 629 of output process circuit 62 such that the write signal of memory 630A becomes the clock signal CK. Thus, imaging information of 1 screen (i.e., entire area of imaging surface S2) of image sensor 53 for each image sensing operation is stored in memory 630A.

The gain of amplifier 621 of output process circuit 62 is set at an initial value [1] (#202), and the CCD drive process is executed to control image sensor 53 (#203). Specifically, the start and end integral (load accumulation) is specified for drive 55. Then, A data transfer process is executed to store the imaging information (light reception data Dg) in memory 630A (#204), and the light reception data Dg of the five lines v1 through v5 are read from memory 630A (#205).

Figure 35:
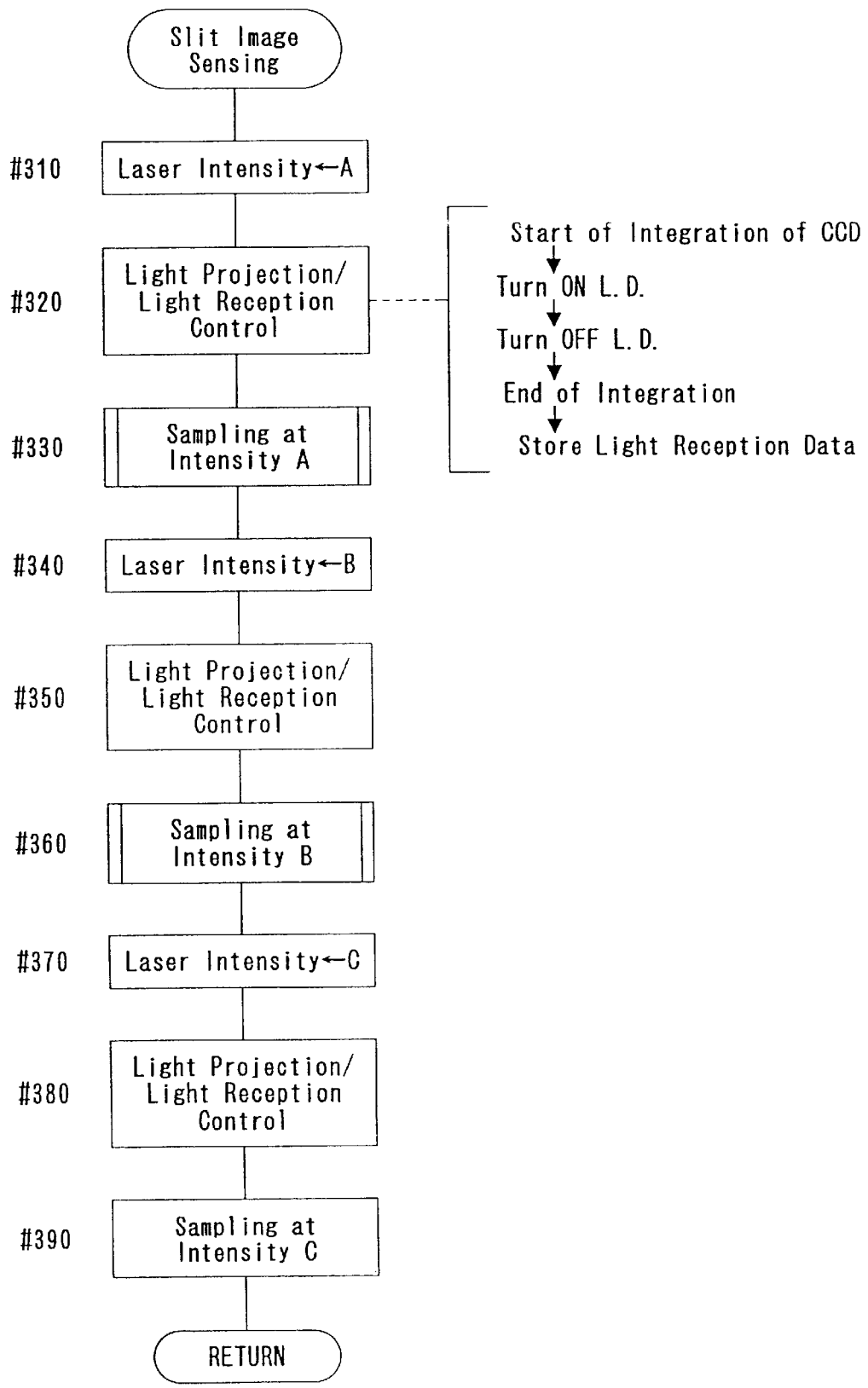
FIG. 35 is a flow chart showing a subroutine slit image sensing of FIG. 32.

FIG. 35 is a flow chart of the "slit image imaging" process of step #30 of FIG. 32.

In this routine, image sensing is accomplished a total of three times while semiconductor laser 41 emits pulse bursts. As described by FIG. 24a, the imaging information of the first cycle is particularly important in the detection of the slit image position. The greater the laser light intensity (projection light intensity), the lower is the influence of noise. Accordingly, the laser intensity of imaging in the first cycle is set at intensity A (#310). Then, light projection/light reception controls (#320), and "sampling at intensity A" (#330) are sequentially executed. The light projection/light reception controls comprise the following processes (1) through (4) below.

(1) LD driver 44 in instructed to turn ON the laser 41.
(2) Instruct LD driver 44 to turn OFF the laser 41 after a predetermined time has elapsed.
(3) The end of integration is specified.
(4) Light reception data Dg of 1 screen is stored in memory 630A.

The routine then moves to the second imaging cycle, and laser light intensity is set at intensity B (#340). After projection/reception controls identical to the first cycle are executed (#350), the "sampling at intensity B" process is executed (#360).

During the imaging of the third cycle, laser light intensity is set at intensity C (#370), and after projection/reception controls identical to the first cycle are executed (#380), the "sampling at intensity C" process is executed (#390). The content of the "sampling at intensity C" process is identical to the content of the "sampling at intensity B" process (#360).

Figure 36:
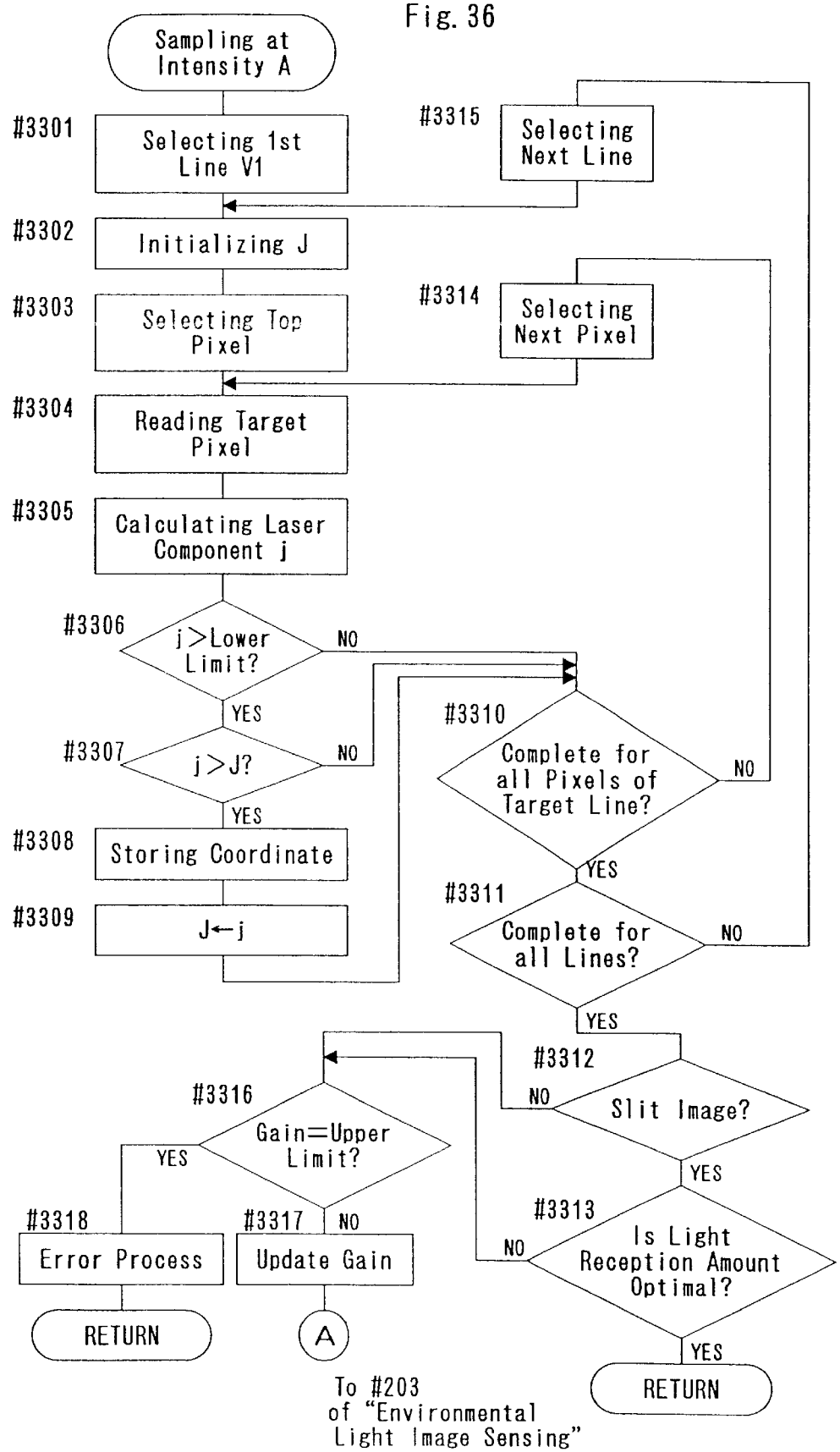
FIG. 36 is a flow chart showing a subroutine of sampling with intensity A of FIG. 35.

FIG. 36 is a flow chart of the "sampling at intensity A" process of step #330 of FIG. 35.

The first line v1 is selected as a target line from among five lines v1 through v5 of the sampling object (#3301).

The laser measurement value J of the target line stored in preliminary measurement table T5 is set as a minimum value at initialization (#3302). The top pixel of the target line is selected as the target pixel, and the light reception data Dg of the target pixel is read from memory 630A (#3304). The light reception data (environmental light component) of the target pixel read in the aforesaid "environmental light imaging" process is culled from the read reception data Dg, and the laser component j is calculated (#3305). When the laser component j is greater than the lower limit reception level (lower limit of slit light U), i.e., when greater than the laser measurement value J (#3306, #3307), the Y coordinate of the target pixel is written to preliminary measurement table T5 as the slit image position (#3308), and laser component j is written to table T5 as the laser measurement value J of intensity A (#3309). Thereafter, the next pixel is targeted (#3314, #3315). If the reply to the query of steps #3306 or #3307 is NO, the next pixel is targeted without updating the preliminary measurement table T5. The brightest pixel of the target line can be detected by sequentially targeting all pixels of a target line, and comparing the laser component j and laser measurement value J. The brightest pixel corresponds to the slit image position. Since the laser component j of each pixel is compared, there is few errors in position detection in comparison with when the light reception data Dg including an environmental light component are compared.

If the comparison process if completed for all pixels of the target line, the next line is targeted and the same process is required (#3311, #3315). If the comparison process is completed for five lines v1 through v5, a check is made to determine whether or not a slit light position has been detected in at least one line, i.e., whether or not a pixel brighter than a predetermined value is present (#3312). If the maximum value of the laser component j in each line v1 through v5 attains a predetermined reference value (i.e., a slit image position is found), the routine returns, whereas if said predetermined value is not attained, the gain of amplifier 621 of output process circuit 62 is updated to a value one step higher (#3316, #3317). After the gain is updated, the routine returns to the "environmental light imaging" process to correct imaging. If the gain attains an upper limit in step #3316, an error process is executed to display a suitable message (#3318). Even when a slit image position is not found, the gain of amplifier 621 is increased one level (#3316, #3317), the routine returns to the "environmental light imaging" process to correct imaging.

Figure 37:
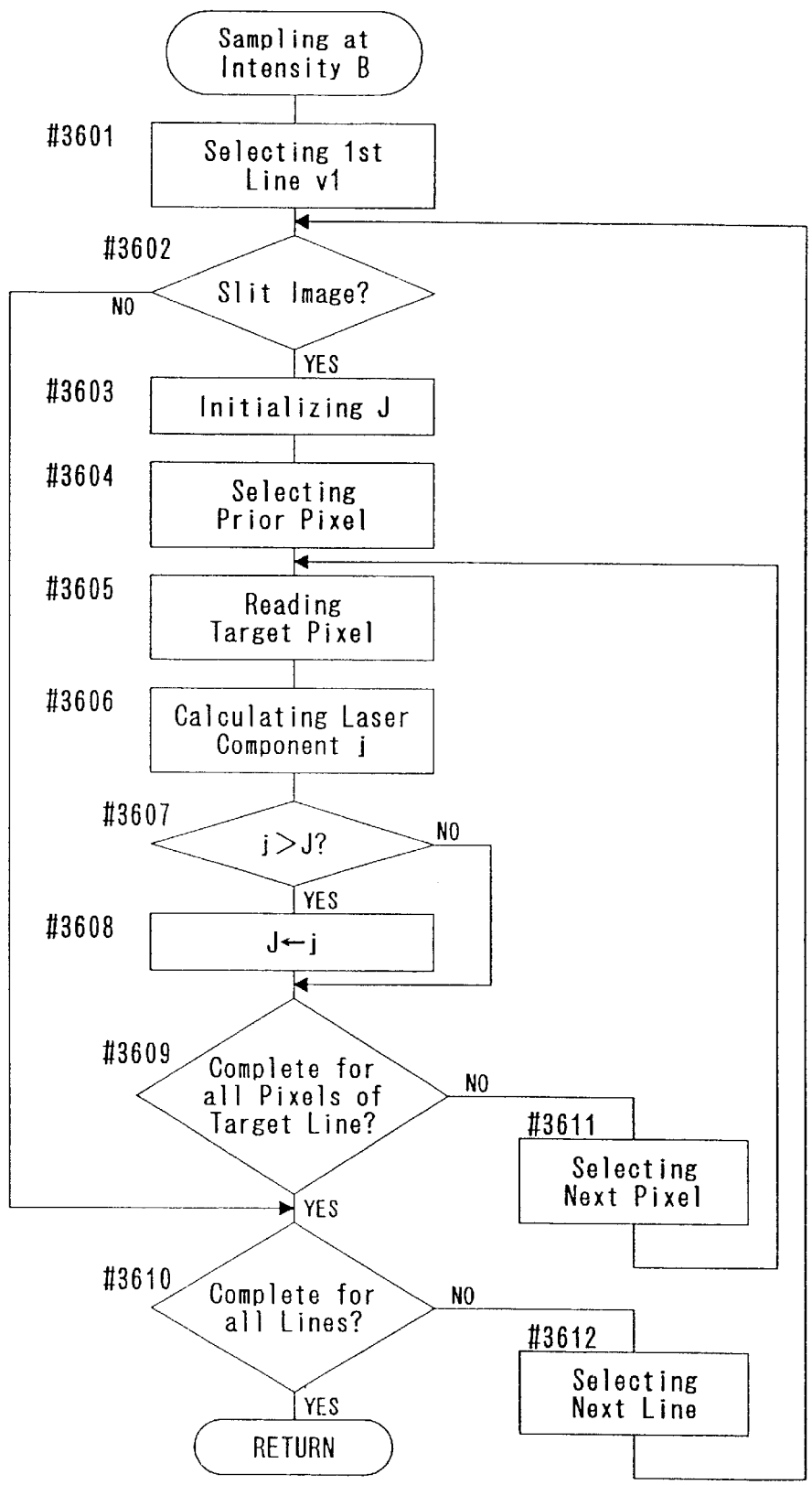
FIG. 37 is a flow chart showing a subroutine of sampling with intensity B of FIG. 35.

FIG. 37 is a flow chart of the "sampling at intensity B" process of step #360 of FIG. 35.

The first line v1 is selected as the target line from among the five lines v1 through v5 of the sampling target (#3601). A check is made to verify whether or not the slit image position in the target line is stored in preliminary measurement table T5 (#3602). When the slit image position is not stored in table T5, the next line is targeted.

When the slit image position is stored in table T5, the pixel immediately prior to the slit image position is targeted after the laser measurement value J of the target line is initialized at a minimum value (#3603, #3604). The light reception data Dg of the target pixel is read from memory 630A (#3605), and the laser component j, from which the environmental light component has been subtracted, is calculated as previously described (#3606). When the laser component j is greater than the laser measurement value j at that moment, the laser component j is written to preliminary measurement table T5 as the laser measurement data j at intensity B (#3607, #3608). Then, the next pixel is targeted, and the same process is executed (#3609, #3611). That is, the laser component j of each pixel is compared, and the maximum value of laser component j in the target line is stored. If the processing is completed for a total of three pixels including the slit image position and pixels on bilateral sides thereof, the next line is targeted, and the maximum value of laser component j of three pixels is stored in the same manner as for the previous line (#3610, #3612). When processing is completed for the five lines v1 through v5, the routine returns to the flow of FIG. 35.

Figure 38:
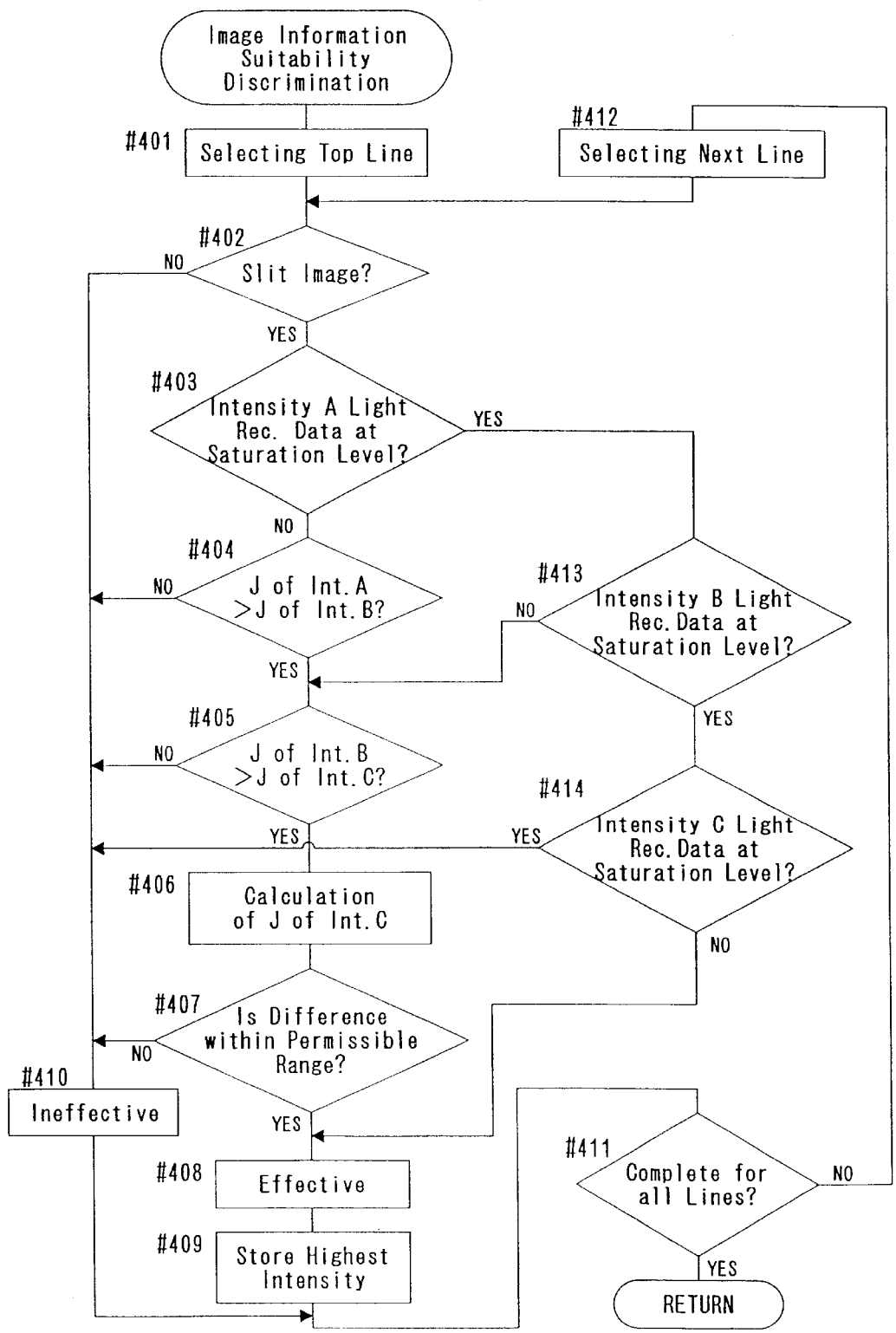
FIG. 38 is a flow chart showing a subroutine of imaging information discriminated as unsuitable of FIG. 32.

FIG. 38 is a flow chart of the "imaging information suitability discrimination" process of step #40 of FIG. 32.

The first line v1 is selected as the target line from among the five lines v1 through v5 of the sampling target (#401), and a check is made to verify whether or not the slit image position of the target line is stored in preliminary measurement table T5 (#402). When the slit image position is not stored in table T5, the preliminary measurement data of the target line is discriminated as ineffective, and a flag indicating this status is set in preliminary measurement table T5 (#410). Then, the next line is targeted (#411, #412).

When the slit image position is stored in table T5, the suitability of the preliminary measurement data is discriminated by the following criteria.

First, a check is made to determined whether or not the intensity A light reception data Dg (environmental light component+laser component) at the slit image position is at saturation level (#403). If the reception data Dg at intensity A are at saturation level, a check is made to determine whether or not the reception data Dg at intensity B are at saturation level (#413). If the reception data Dg of intensity B are at saturation level, a check is made to determine whether or not the reception data Dg of intensity C are at saturation level (#414). If all reception data Dg at intensities A, B, and C are at saturation level, the preliminary measurement data of the target line is discriminated as unsuitable (#410).

If the reception data Dg of intensity A is not at saturation level in step #403, a check is made to determine whether or not the relationship between intensity and light reception is correct. That is, a check is made to verify whether or not the laser measurement value J of the laser component at intensity A is greater than the laser measurement value J at intensity B (#404), and a check is made to determine whether or not the laser measurement value J of intensity B is greater than the laser measurement value J of intensity C (#405). A check of step #405 is executed when the reply to the query of step #403 is NO. When the relationship of the magnitude of the intensity and the magnitude of the laser measurement value J is reversed, the preliminary measurement data of the target line are discriminated as ineffective because the anomaly is obvious (#410). If the magnitude of the intensity and the magnitude of the laser measurement value J is suitable, the slope of the graphs described in FIGS. 26a and 26b can be determined from the environmental light component which is the measured light value when the intensity and laser measurement value can be calculated for the laser component at intensity C (#406). At this time, the laser measurement value J at intensity B is only used when the reception data at intensity A is at saturation level. The use of the higher laser measurement value J is beneficial in minimizing errors of the slope of the graph.

Regarding the laser component at intensity C, if the difference between the actual measurement value and the estimated value is within the permissible range (#407), the preliminary measurement data of the target line are discriminated as effective (#408), and the preliminary measurement data of the highest nonsaturated intensity among the reception data Dg of intensities A, B, and C are stored as the measurement conditions for the main measurement (#409). Then the next line is targeted, and same process is repeated for the top line. Thus, the optimum data are selected for setting the parameters of the main measurement from among the five lines v1 through v5. When difference between the actual measured value and the estimated value exceeds the permissible range, the preliminary measurement data of the target line are deemed ineffective.

Figure 39:
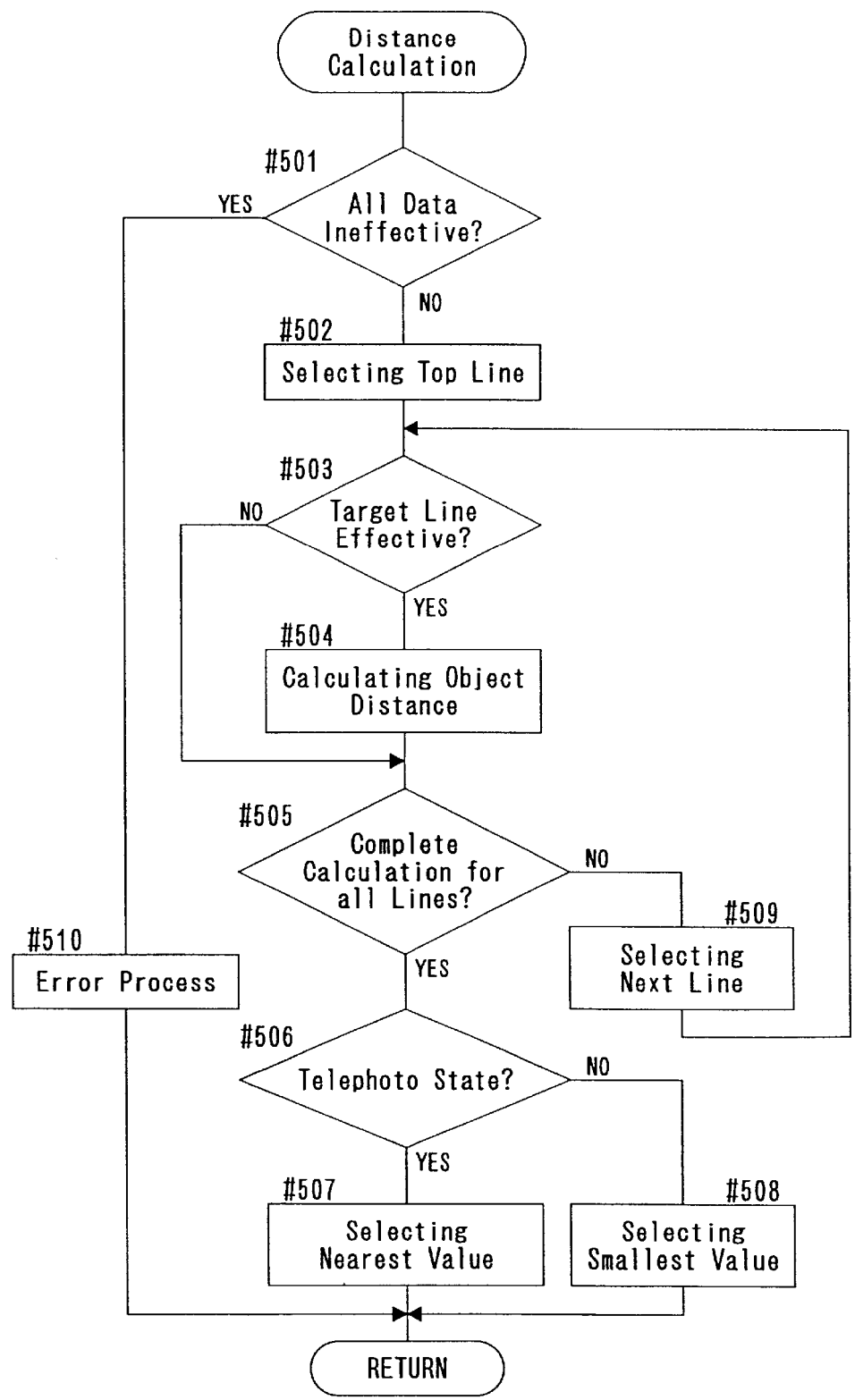
FIG. 39 is a flow chart showing a subroutine of distance calculation of FIG. 32.

FIG. 39 is a flow chart of the "distance calculation" process of step #50 of FIG. 32.

When the reliability of the preliminary measurement data is low among all five lines v1 through v5, i.e., when the preliminary measurement data of all five lines v1 through v5 are deemed ineffective, and an error process is executed, and the routine returns to the main routine (#501, #510).

If at least one line contains effective preliminary measurement data, the first line v1 is targeted (#502). If the target line contains effective preliminary measurement data, the object distance is calculated using a suitable triangulation method based on the slit image position (#503, #504). Then, the next line is targeted (#505, #509). If the target line contains ineffective preliminary measurement data, the next line is processed without calculating the object distance d.

At the moment the processing ends relative to the five lines v1 through v5, the maximum five calculated values of object distance d are stored. If the zoom level is the telephoto state, the calculated value of object distance d nearest the result of passive measurement is selected as the object distance measurement value because the passive measurement of the aforesaid AF sensor 57 has a high degree of accuracy (#506, #507). On the other hand, if the zoom condition is wide telephoto, the smallest value among the calculated values of object distance d is selected as the measurement value (#508). This selection is made because, typically, the background assumes a distant position as the object Q approaches the three-dimensional camera 2.

Figure 40:
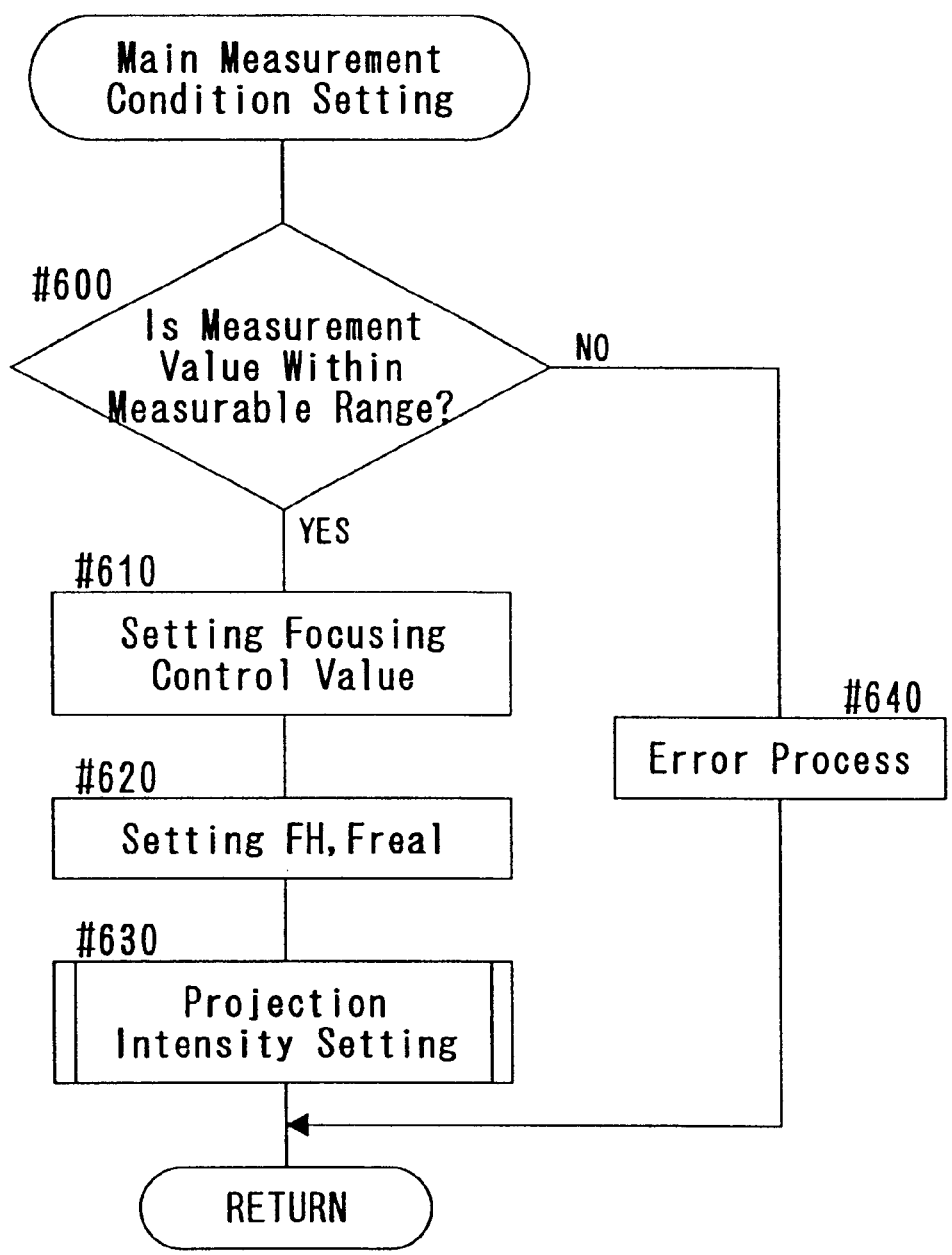
FIG. 40 is a flow chart showing a subroutine of setting the conditions for main measurement of FIG. 32.

FIG. 40 is a flow chart of the "main measurement conditions setting" process of step #60 of FIG. 32.

If the object position indicated by object distance d selected as the measurement value is within the measurable range, the following three setting processes are executed.

First, the feed-out amount Ed suitable for the zoom level and the selected object distance d is calculated, and set as the focusing control value (#610). Then, the proximal principal point position FH and effective focal length Freal suitable for the zoom level and calculated feed-out Ed is calculated, and set as lens information (#620). The lens information is used in the calculation of the projection angle range and coordinate calculations by host 3. Finally, the "projection intensity setting" process is executed (#630).

Figure 41:
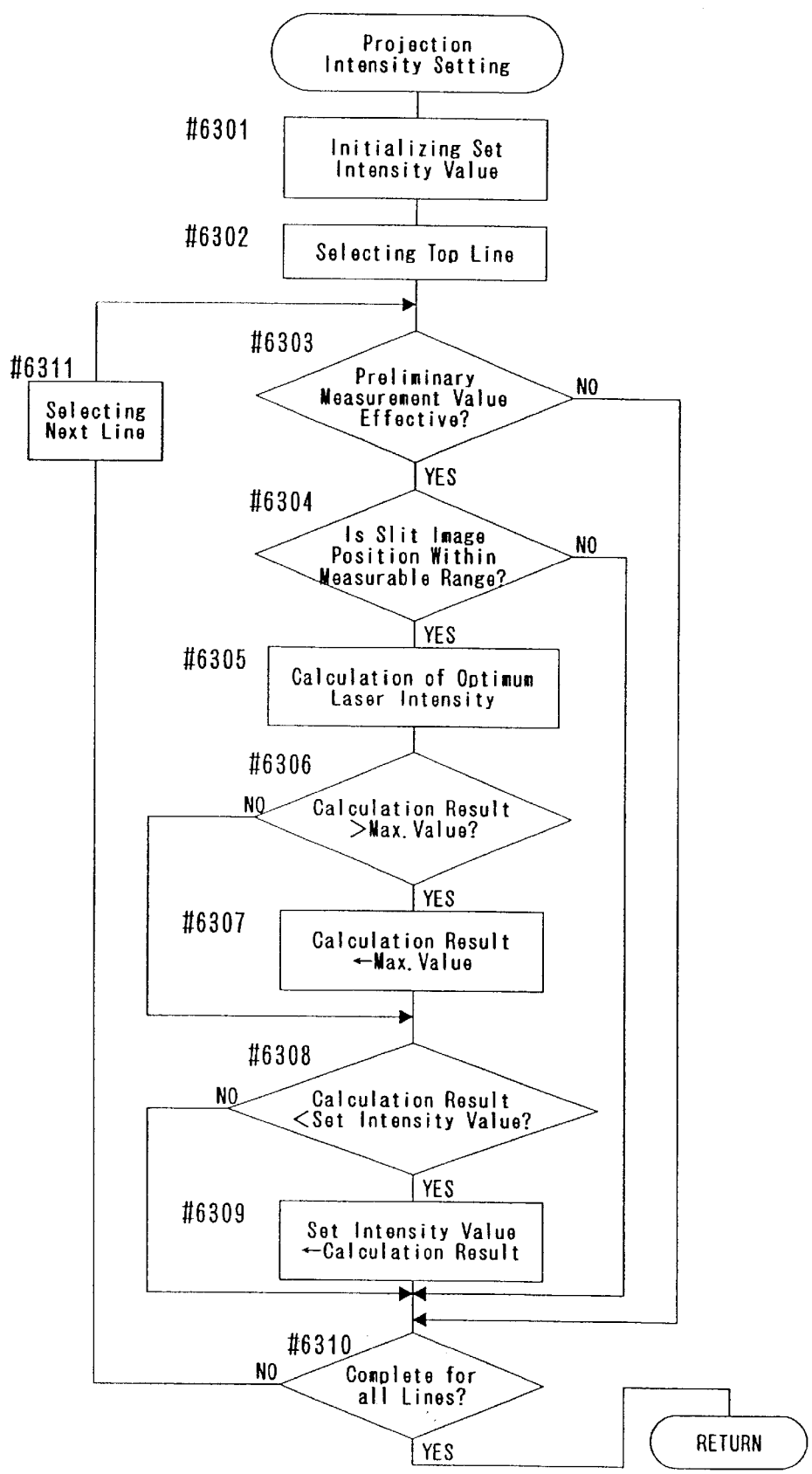
FIG. 41 is a flow chart showing a subroutine of setting the intensity of the projection light of FIG. 40.

FIG. 41 is a flow chart of the "projection intensity setting" process of step #630 of FIG. 40.

The functions of FIGS. 22 and 27 are realized by executing the following routine. The set intensity value of projection in the main measurement is initialized as the upper limit value in consideration of human safety (#6301), and the top line v1 is targeted (#6302). If the preliminary measurement data of the target line are effective, a check is made to determine whether or not the position on the object corresponding to the slit image position of the target line is within the measurable range (image sensing range of the main measurement) set at standard object distance d (#6304).

When the slit image position pertains to the sensed image during the main measurement, the data previously stored during the "imaging information suitability" routine are used to calculated the optimum value of laser intensity at the slit image position (line) (#6305). If the calculation result is greater than the permitted maximum value, the permissible maximum value is used as the calculation result (#6306, #6307). When the calculation result is less than the set intensity value at that time, the set intensity value is changed to the calculation result (#6309). the processes of steps #6303 through #6309 are executed for each of the five lines (#6310, #6311). thus, among the optimized values corresponding to each slit image position of the sensed object of the main measurement, the smallest value becomes the intensity for the main measurement.

4-3. Main Measurement Process

Figure 42:
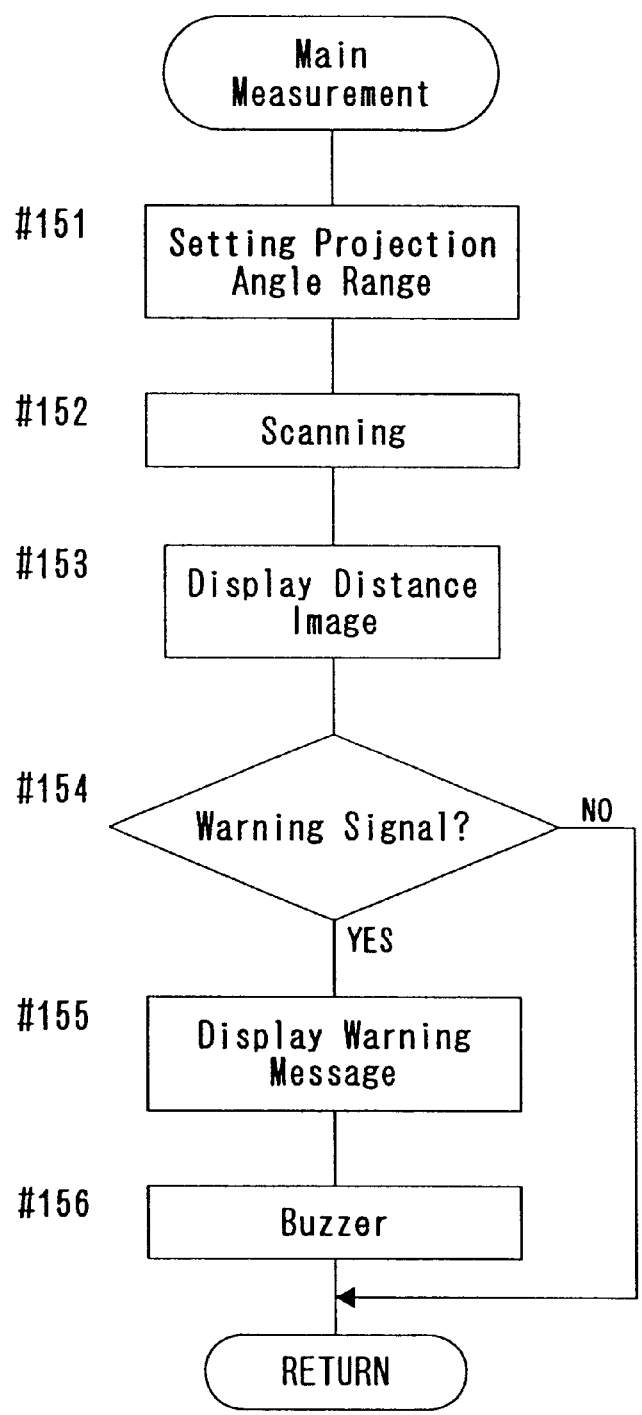
FIG. 42 is a flow chart showing a subroutine of the main measurement of FIG. 31.

FIG. 42 is a flow chart of the "main measurement" process of step #15 of FIG. 31.

The projection angle range corresponding to the object distance d is set (#151), and scanning is executed (#152). The distance image obtained by scanning is displayed on the monitor (#153), and a check is made for the presence of a warning a signal output from output process circuit 62 (#154). When any signal among the proximity warning signal S11, digital warning signal S12, or overflow warning signal S13 is output, a message is displayed in accordance with the output warning, and the buzzer 75 is sounded (#155, #156). Suitability discrimination is accomplished for the part (e.g., the center area) of the sensed image so as to reduce the time required for the preliminary measurement. Thus, errors may be detected in the main sensed image outside said discrimination area.

4-4. Remeasurement Process

Figure 43:
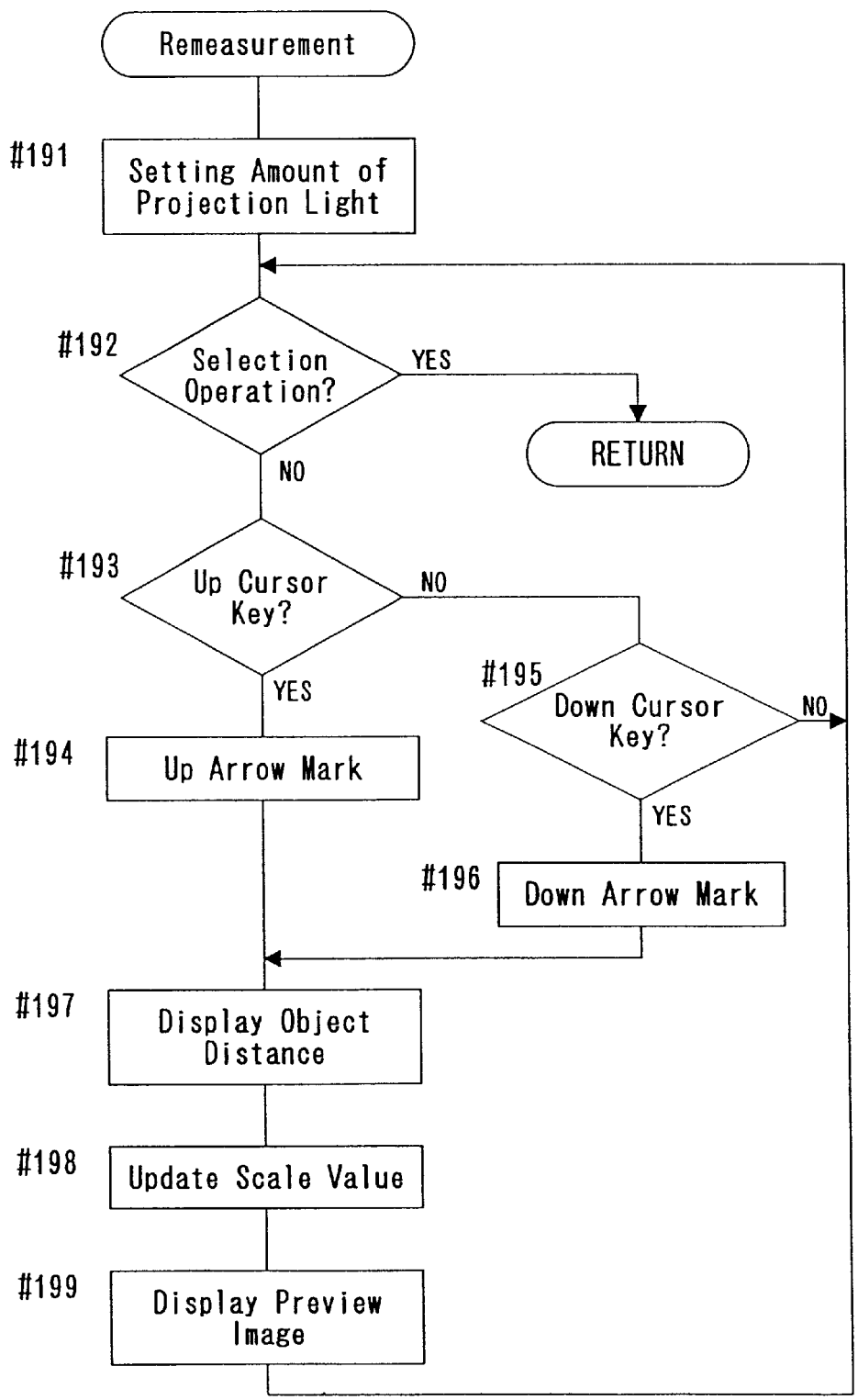
FIG. 43 is a flow chart showing a subroutine of the remeasurement process of FIG. 31.

FIG. 43 is a flow chart of the "remeasurement" process of step #19 of FIG. 31.

The amount of projection light is set (#191), and thereafter the routine returns to the flow of FIG. 31 of the selection operation (#192). When the up or down cursor key is pressed before the selection button 23 is pressed, the arrow mark z4 on the monitor display is moved upward or downward (#193, #194, #198, #199).

The object distance d, which corresponds to the arrow mark z4 position after the aforesaid movement, is calculated, and the display of numeric value z1 is updated (#197). The value corresponding to the position of arrow mark z4 and scale value sc are updated (#198), and a preview image is displayed (#199). The operator can modify settings while estimating imaging results after changing said setting via the preview image. When the selection button 28 is pressed, the setting at that time are stored immediately and the routine returns. Thereafter, image sensing is accomplished at the aforesaid set conditions via the release operation of step #14.

Figure 44:
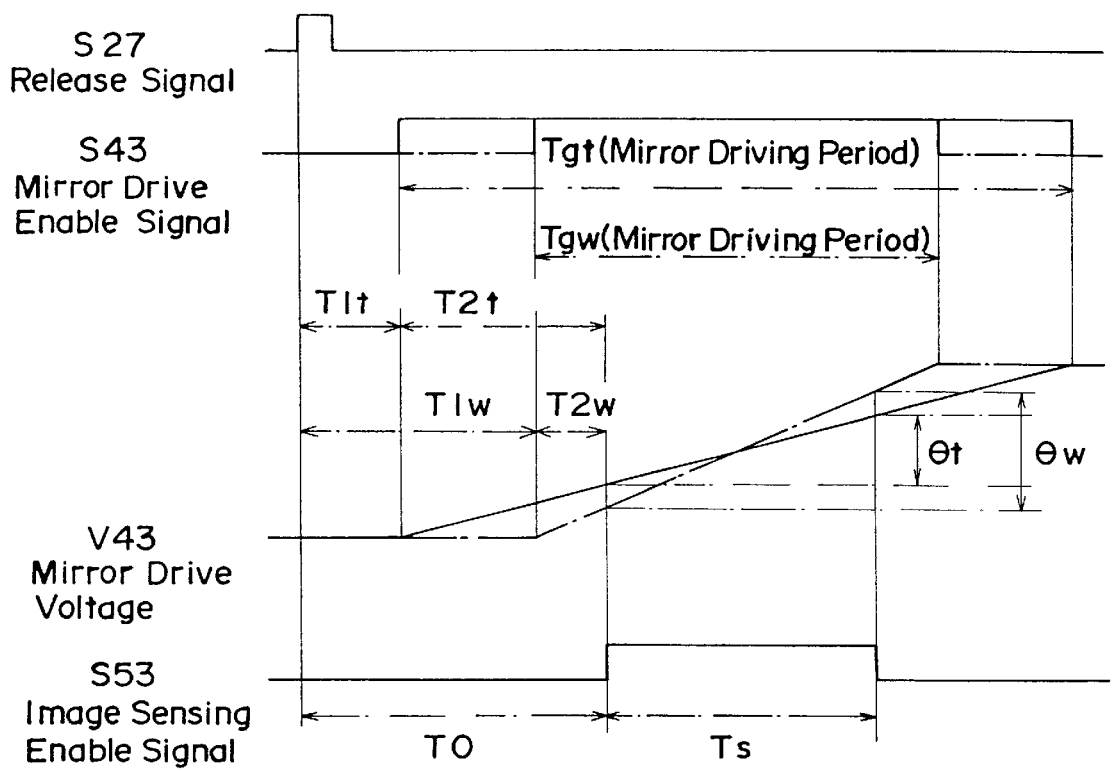
FIG. 44 is a timing chart showing an example of synchronous control of the galvano mirror and image sensor.
Figure 45:
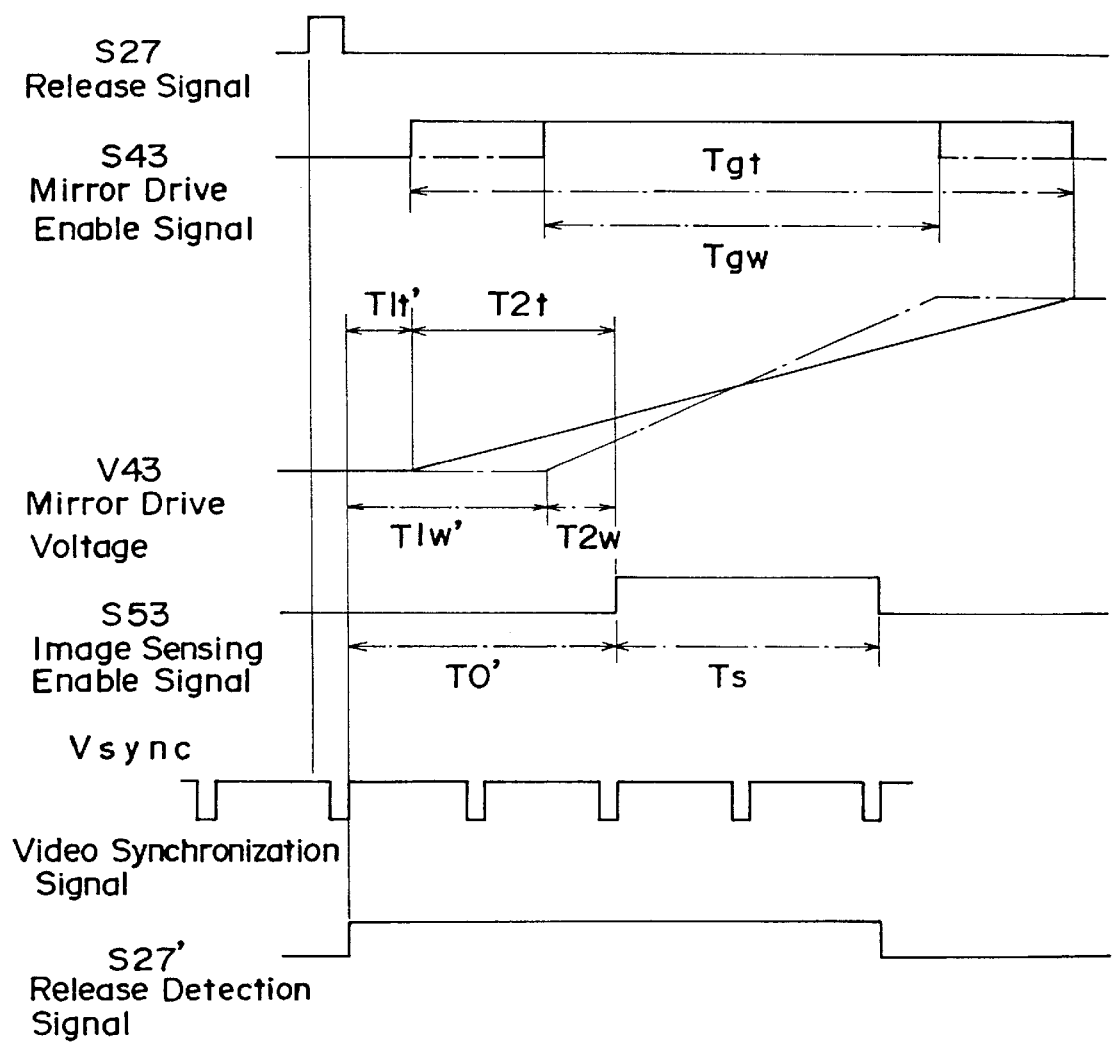
FIG. 45 is a timing chart showing another example of synchronous control of the galvano mirror and image sensor.
Figure 46A:
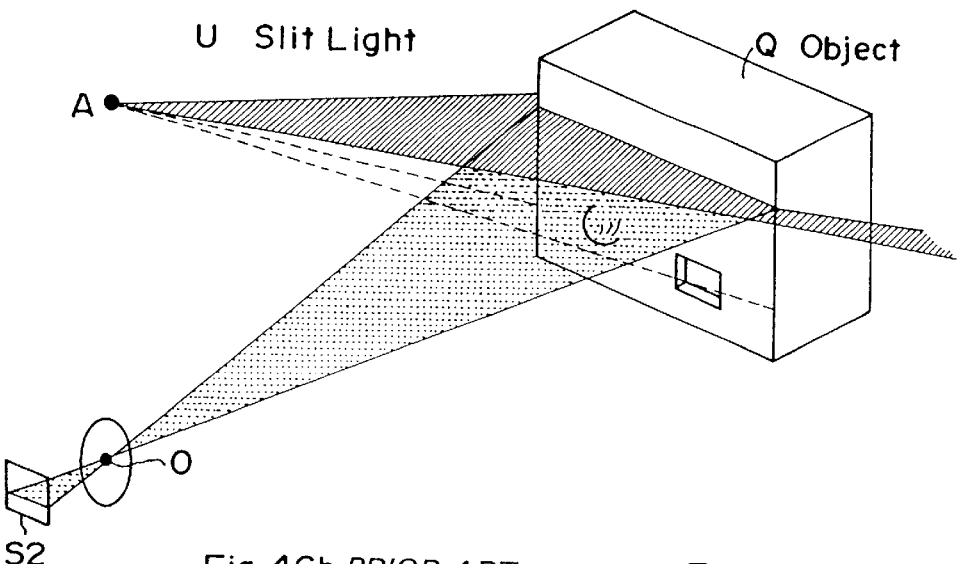
FIGS. 46a, 46b, 46c, and 46d briefly show the slit projection method.
Figure 46B:
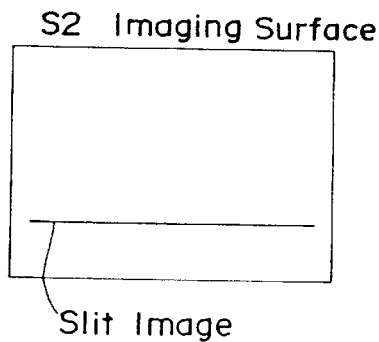
Figure 46C:
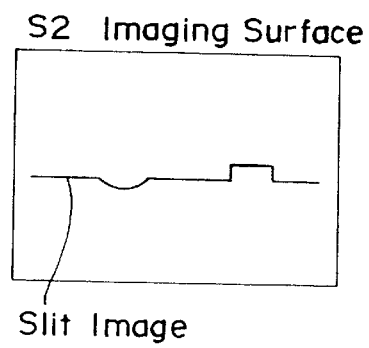
Figure 46D:
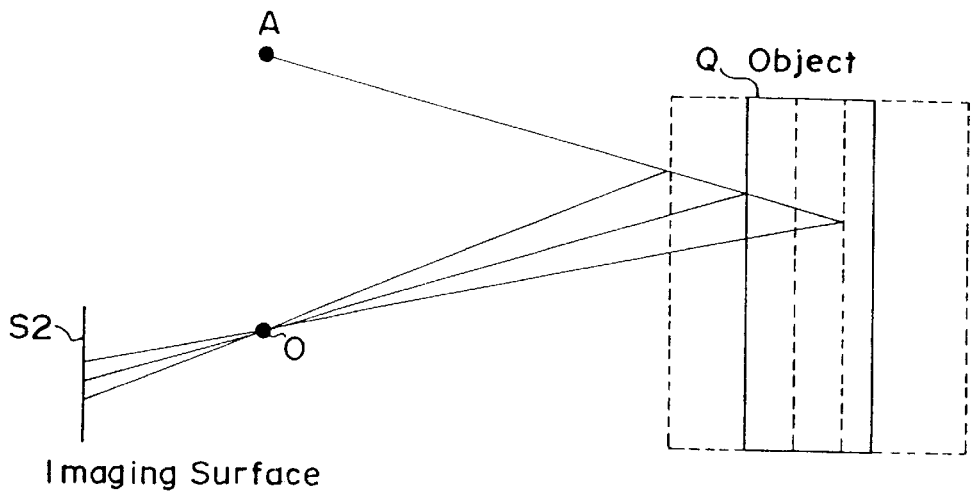
Figure 47A:
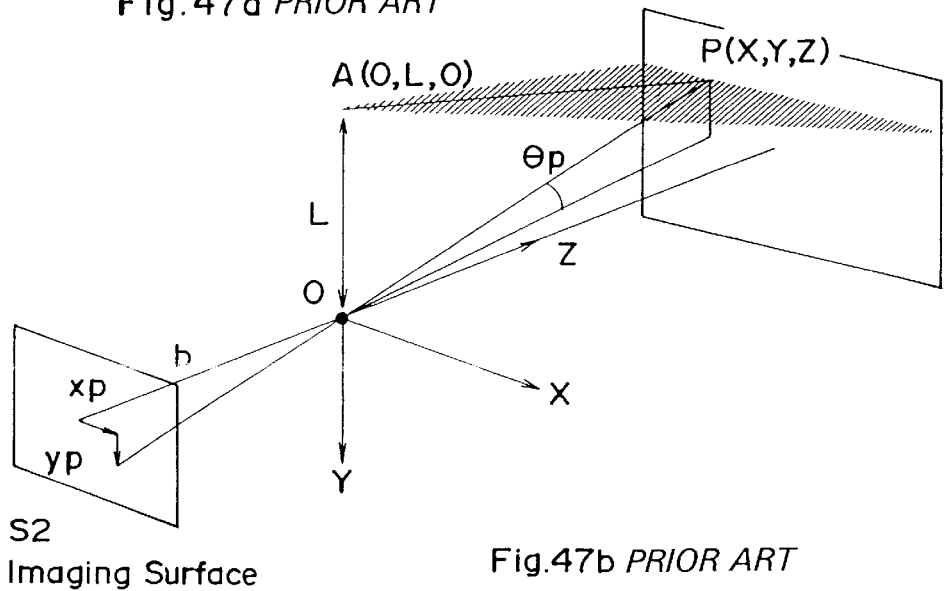
FIGS. 47a, 47b, and 47c illustrate the principles of measurement via the slit projection method.
Figure 47B:
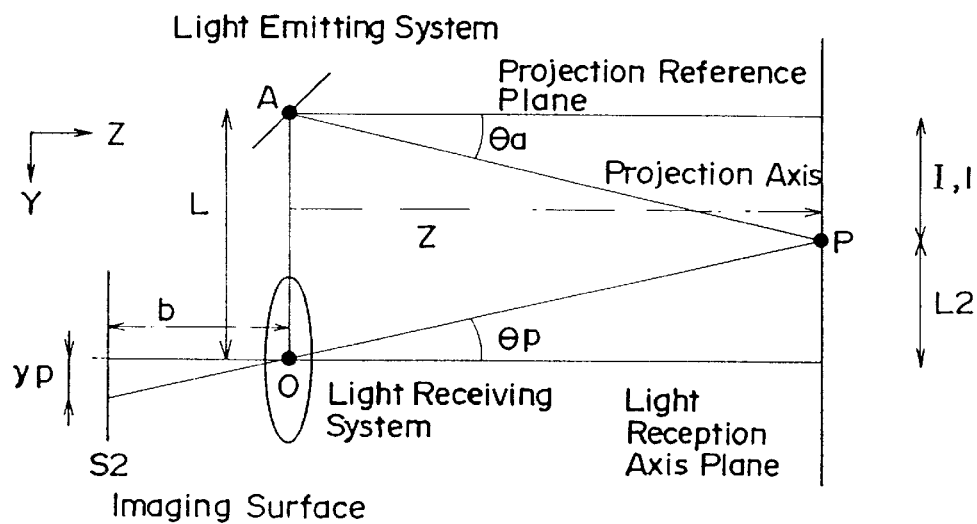
Figure 47C:
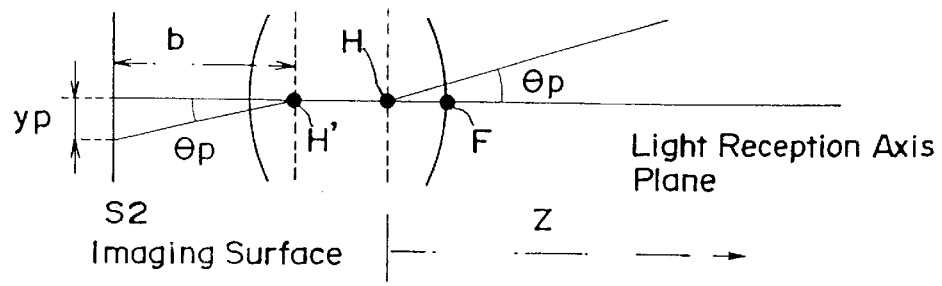
Figure 48:
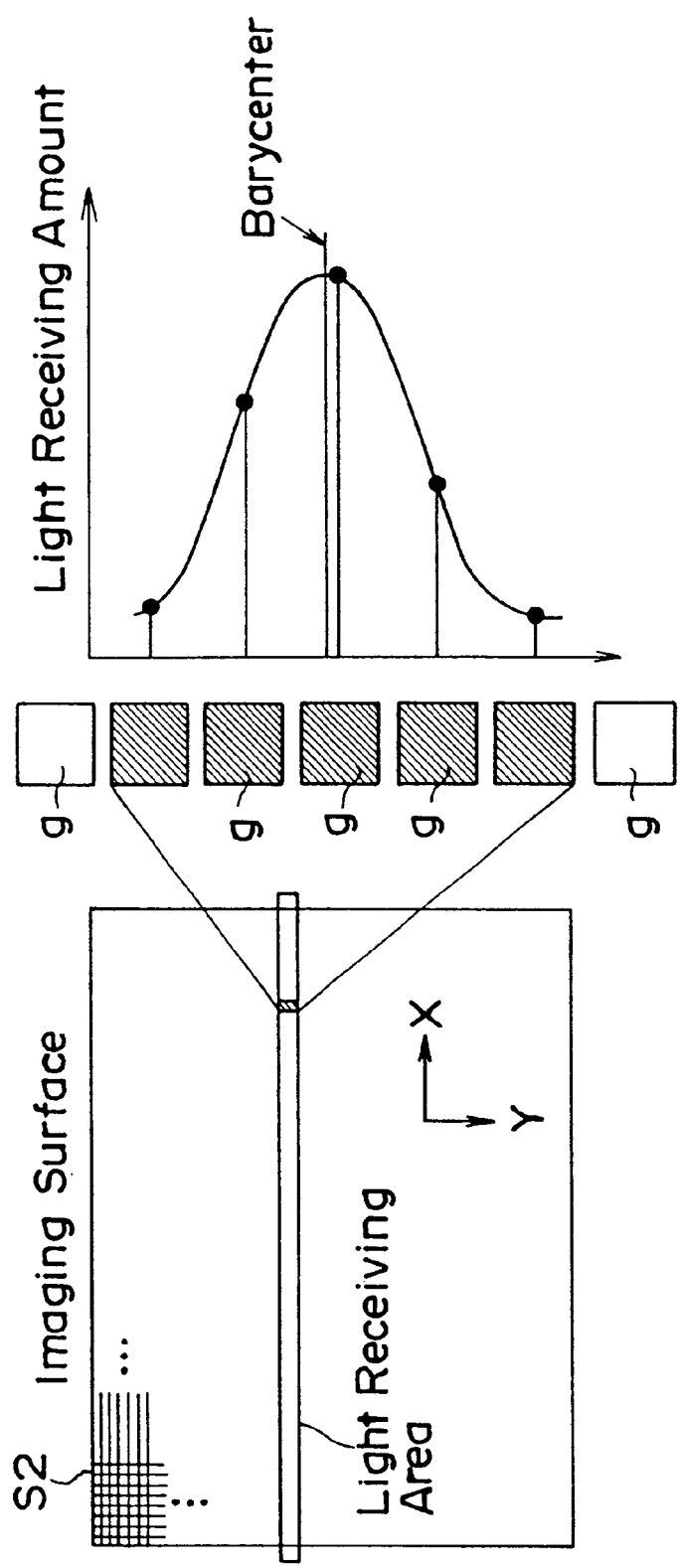
FIG. 48 illustrates the principle of a conventional measurement method.

FIG. 44 is a timing chart showing an example of synchronous control of galvano mirror 43 and image sensor 53. FIG. 45 is a timing chart showing an example of another synchronous control of galvano mirror 43 and image sensor 53. In these drawings, the letter "t" of the symbols represents a value of the telephoto state, and the letter "w" represents a value of the wide telephoto state.

Since the field angle is deflected via zoom magnification in three-dimensional camera 2, the deflection angle $\theta w$ during low magnification can be greater than the deflection angle θt at high magnification. When system controller 61 detects a release signal S27 release button 27, the time T2 after galvano mirror starts rotating until imaging starts, i.e., the time required for galvano mirror 43 to rotate from the stop position to a predetermined angle position, is calculated based on the zoom magnification and the object distance. At this time, the deflection angular speed at time T2 is set at the same value at the angular speed ω at sensor actuation time Ts. The angular speed ω is stable. After the calculation of time T2 is completed, the rotational drive of galvano mirror 43 starts, and the drive of image sensor 53 starts after a time T2 has elapsed.

In the state wherein the system controller 61 directly controls both the galvano mirror 43 and image sensor 53, system controller 61 galvano high speed processing to accurately align the drive timings. On the other hand, it is possible to reduce the load of control by having system controller 61 control galvano mirror 43 only by using a commercial video timing generator or special hardware to drive the sensor.

That is, in FIG. 45, the driver 55 (refer to FIG. 3) standardizes release signal S27 via the rising edge of video synchronizing signal Vsync, and generates a release warning signal S27'. Driver 55 starts the sensor actuation at the moment a time T0' has elapsed after the rise of the release warning signal S27'. The release warning signal S27' is input to system controller 61 as an interrupt signal. System controller 61 calculates the aforesaid time T2 at the start f the release operation, and a time T1' (=T0'−T2) from the rise of release warning signal S27' until the start of mirror rotation. When the interrupt of release warning signal S27' is received, the galvano mirror rotation starts at the moment time T1' has elapsed thereafter.

Although the present invention has been described by way of examples of measurement via the light section method in the above embodiment, the measurement method is not limited to light section methods, inasmuch as, for example, pattern imaging methods may be used. In pattern imaging methods, The measurable distance range is determined by the relationship between the pattern projection direction and the field of light reception. Furthermore, it may happen the that the reflected light of the pattern cannot be detected, or an overflow may occur in the light reception system due to the reflectivity of the object similar to that in the light section methods; in such cases, warning may be implemented.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A three-dimensional measuring device comprising:
   an optical projection system which illuminates an object with light beam;
   an image sensor which outputs image signals corresponding to the amount of light impinging the image sensing surface;
   an optical reception system which forms an optical image of the object on the image sensing surface of said image sensor, the optical reception system employing a zooming function; and
   a calculator for calculating a three-dimensional position of the object based on a front principal point position of said optical reception system and the image signals of the object obtained by said image sensor, the front principal piont position being applied for reducing an accident error arising from the zooming function of said optical reception system.

2. The three-dimensional measuring device as claimed in claim 1 wherein said optical projection system includes an adjusting means for adjusting size of said light beam in accordance with the detection result of the detection means.

3. The three-dimensional measuring device as claimed in claim 2 wherein said adjusting means includes a variator lens for varying the diameter of the laser beam.

4. The three-dimensional measuring device as claimed in claim 1 wherein said optical reception system includes a zooming mechanism for varying the size of the optical image of the object on the image sensing surface.

5. The three-dimensional measuring device as claimed in claim 4 wherein said optical reception system includes an adjusting means for adjusting size of said light beam in accordance with the detection result of the detection means, and said zoom mechanism determines a magnification ration in response to said adjusted size of the light beam.

6. The three-dimensional measuring device as claimed in claim 1, further comprising:
   a detector for detecting for front principal point position of said optical reception means.

7. A three-dimensional measuring method comprising steps of:
   illuminating an object with light beam;
   forming an optical image of the object on an image sensing surface of an image sensor by an optical reception system;
   outputting image signals corresponding to the amount of light impinging the image sensing surface;
   detecting the principal point position of said optical reception system; and
   calculating a three-dimensional position of the object based on the detected principal point position and the image signals.

8. The three-dimensional measuring method as claimed in claim 7 further comprising a step of a adjusting size of said light beam in accordance with the detected principal point position.

9. The three-dimensional measuring device as claimed in claim 8 wherein said adjustment of the light beam size is executed by a variator lens for varying the diameter of the laser beam.

10. A three-dimensional measuring device which projects light on an object and senses the light reflected by said object under variable measurement conditions of the object to obtain three-dimensional positions of the object, said three-dimensional measuring device comprising;
    a judging means for judging whether said measurement conditions of the object are acceptable or not; and
    a warning means for warning if said judging means judges that said measurement conditions of the object are not acceptable.

11. The three-dimensional measuring device as claimed in claim 10 further comprising a detection means for detecting a distance to the object as the measurement condition, wherein said judging means judges whether the detected distance is acceptable or not.

12. The three-dimensional measuring device as claimed in claim 11 wherein said a detection means detects the distance by executing preliminary measurement prior to an actual measurement.

13. The three-dimensional measuring device as claimed in claim 10 wherein said measuring conditions include an amount of the light reflected by the object, and said judging means judges whether said light amount is acceptable or not.

* * * * *

UNITED STATES PATENT AND TRADEMARK OFFICE
CERTIFICATE OF CORRECTION

PATENT NO.    : 6,529,280 B1  
DATED         : March 4, 2003  
INVENTOR(S)   : Akira Yahashi et al.

It is certified that error appears in the above-identified patent and that said Letters Patent is hereby corrected as shown below:

<u>Title page,</u>  
Item [75], Inventors, delete "Fumiya Yagi, Toyonaka (JP); Satoru Hirose, Kyoto (JP); and Tadashi Fukumoto, Ibaraki (JP);" therefor  
Item [75], Inventors, should appear as below:  
-- Akira Yahashi, Kobe (JP); Toshio Norita, Osaka (JP); Eiro Fujii, Takatsuki (JP); Takuto Joko, Kyoto (JP); Makoto Miyazaki, Ibaraki (JP); Hideki Tanabe, Ibaraki (JP); Yoshiko Sakagawa, Ibaraki (JP) --  
Insert Item [30] as below:  
-- [30]             Foreign Application Priority Data

| Date | Country | Number |
|---|---|---|
| Nov. 17, 1995 | (JP) | 7-299920 |
| Nov. 17, 1995 | (JP) | 7-299921 |
| Nov. 17, 1995 | (JP) | 7-299922 |
| Nov. 17, 1995 | (JP) | 7-299923 |
| Nov. 17, 1995 | (JP) | 7-299924 |
| Jun. 18, 1996 | (JP) | 8-157068 |
| Jun. 18, 1996 | (JP) | 8-157069 |
| Oct. 17, 1996 | (JP) | 8-274579 |
| Oct. 17, 1996 | (JP) | 8-274993 -- |

Signed and Sealed this

Thirtieth Day of December, 2003

JAMES E. ROGAN  
*Director of the United States Patent and Trademark Office*